(12) United States Patent
Brown et al.

(10) Patent No.: US 12,182,386 B2
(45) Date of Patent: Dec. 31, 2024

(54) SYSTEM AND METHOD FOR ESTABLISHING RELATIVE PREFERENCE BETWEEN ITEMS

(71) Applicant: OptionLab Inc., Portland, OR (US)

(72) Inventors: Ethan R. Brown, Portland, OR (US); Robert B. Stewart, Amherst, NH (US)

(73) Assignee: OptionLab Inc., Portland, OR (US)

( * ) Notice: Subject to any disclaimer, the term of this patent is extended or adjusted under 35 U.S.C. 154(b) by 0 days.

(21) Appl. No.: 18/100,888

(22) Filed: Jan. 24, 2023

(65) Prior Publication Data

US 2024/0248591 A1 Jul. 25, 2024

(51) Int. Cl.
*G06F 3/04845* (2022.01)
*G06F 3/04817* (2022.01)
*G06F 3/0482* (2013.01)

(52) U.S. Cl.
CPC ...... *G06F 3/04845* (2013.01); *G06F 3/04817* (2013.01); *G06F 3/0482* (2013.01)

(58) Field of Classification Search
CPC . G06F 3/04845; G06F 3/0482; G06F 3/04817
See application file for complete search history.

(56) References Cited

U.S. PATENT DOCUMENTS

| 6,067,719 | A | 5/2000 | Forman |
| 8,065,699 | B2 | 11/2011 | Repasi et al. |
| 9,342,577 | B2 * | 5/2016 | Nemery De Bellevaux ............... G06F 16/904 |
| 9,983,854 | B2 * | 5/2018 | Parker ................... G06F 3/1454 |
| 11,157,135 | B2 * | 10/2021 | Kocienda .............. G06F 3/0482 |
| 2005/0138564 | A1 * | 6/2005 | Fogg .................... G06F 16/9038 715/848 |
| 2014/0149903 | A1 * | 5/2014 | Ahn ...................... G06F 3/0484 715/765 |
| 2014/0282266 | A1 * | 9/2014 | Brown ................. G06F 3/04817 715/848 |
| 2014/0380214 | A1 * | 12/2014 | Huang .................. G06F 16/903 715/769 |
| 2015/0091813 | A1 * | 4/2015 | Agostini ............... G06F 3/0488 345/173 |
| 2021/0241290 | A1 | 8/2021 | Cohen |

* cited by examiner

*Primary Examiner* — Beau D Spratt
(74) *Attorney, Agent, or Firm* — Lempia Summerfield Katz LLC

(57) ABSTRACT

A method and system for inputting a user rating in an electronically-presented space is disclosed. A user may position icons, which represent items for rating, in the electronically-presented space. For example, the user may position, using a mouse, the icons on a 2-D area on a display screen in order to rate the icons. Responsive to the positioning, the system may identify the positions of the icons, such as the positions of the icon within the 2-D area on the display screen, in order to determine the rating, such as a relative rating or an absolute rating. In this way, the method and system disclose a straightforward and simple way for users to input user preference in the electronically-presented space.

27 Claims, 39 Drawing Sheets

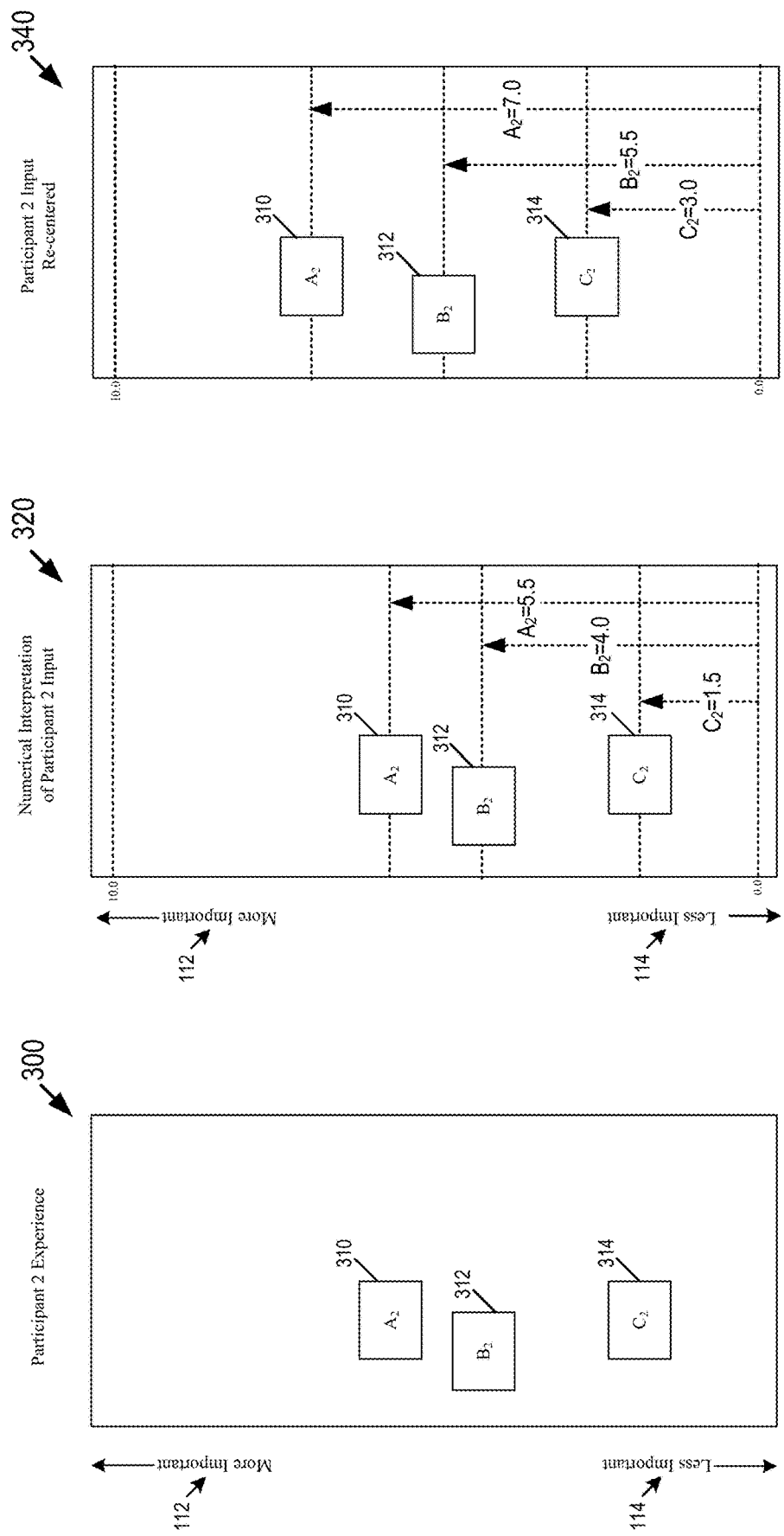

500

Performance
    Mainline operations
    Maintainability
    Construction impacts
    Local operations
        West-Side impacts
        East-Side impacts
    Environmental impacts
        Groundwater contamination
        Noise pollution
        Habitat loss
        Air pollution
    Active transportation
    Equity & Inclusion

FIG. 5A

| Decision Goal | Example Criteria | Example Options & Outcomes |
|---|---|---|
| Purchase a new car for a family with two pre-teens. | • Reliability<br>• Aesthetics<br>• Features (roof rack, entertainment system, etc.)<br>• Brand Preference | • Toyota Sienna<br>• Kia Carnival<br>• Honda Odyssey<br>• Honda Civic<br>• Toyota Prius |
| City-dwelling young adult deciding whether or not to purchase a car | • Parking Convenience<br>• Risk of Theft / Break-ins<br>• Environmental Impact<br>• Ability to take Day Trips<br>• Need to Transport Cargo (groceries, large purchase) | Buy car:<br>• Great outcome: enhances quality of life; parking not too difficult, enjoy taking road trips.<br>• Acceptable outcome: quality of life unchanged.<br>• Poor outcome: quality of life reduced: too costly, too much work, didn't take as many trips as expected.<br>Don't buy car:<br>• Acceptable outcome: no impact on quality of life.<br>• Poor outcome: quality of life reduced; want to get out of town, transport things, etc. |

FIG. 17

| Decision Goal | Example Criteria | Example Options |
|---|---|---|
| Choose a university for a 15-year-old honors student with excellent grades | <ul><li>Good opportunity for connections?</li><li>Ranking of University in Desired Program</li><li>Distance from Family</li><li>Desirability of Location (for student)</li><li>Features (health/athletic facilities, desirable clubs, extracurricular activities)</li></ul> | <ul><li>Harvard</li><li>MIT</li><li>Stanford</li><li>Princeton</li><li>UC Berkeley</li><li>University of Chicago</li></ul> |
| Go to university after high school or take a gap year | <ul><li>Impact on Getting First Job</li><li>Unique Opportunities</li><li>Educational Benefit</li><li>Impact on Happiness</li></ul> | University:<ul><li>Great outcome: program is interesting and engaging, enjoying college experience.</li><li>Acceptable outcome: program is mostly enjoyable, little to no wishing for gap year.</li><li>Poor outcome: unhappy with college or program; burnt out from education, yearning for gap year.</li></ul>Gap Year:<ul><li>Great outcome: refreshing experience, gained clarity and direction and had fun.</li><li>Acceptable outcome: relaxing year break from studies but didn't utilize it to fullest extent.</li><li>Poor outcome: listless, bored, bad experiences, feeling like it was wasted time.</li></ul> |

FIG. 18

| Decision Goal | Example Criteria | Example Options |
|---|---|---|
| Choose a Destination for a 10-day vacation for a family of 4 | • Cultural Experiences<br>• Art Museums<br>• Children's Activities<br>• Amenities (full meals, guided tours, etc.)<br>• Excitement<br>• Relaxation | • Morocco<br>• Paris<br>• Singapore<br>• Costa Rica |

FIG. 19

| Decision Goal | Example Criteria | Example Options |
|---|---|---|
| Choose a location for a large family reunion in six months | • Geographic Convenience<br>• Children's Activities<br>• Bars and Restaurants<br>• Hiking / Boating<br>• Accessibility | • Yosemite National Park<br>• Saguaro National Park<br>• Camp Wandawega<br>• Winvian Farm |

FIG. 20

SYSTEM AND METHOD FOR ESTABLISHING RELATIVE PREFERENCE BETWEEN ITEMS

FIELD OF THE INVENTION

The present application relates generally to the field of establishing preferences for items, and more specifically relates to a user interface that visually enables establishing relative preference between the items.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Decision-making, at its core, is comparing different options and selecting one of the different options. As such, establishing preferences (such as relative preferences) between items is central to the decision-making processes. Decision-making spans a variety of types of decisions and may have associated decision criteria. Example decisions include: (i) service selection (e.g., vender selection criteria in a business-making decision where comprehensiveness of vendor services is significantly more important than reputation of vendor and responsiveness, which are approximately equal in importance); (ii) personnel decisions (e.g., hiring criteria where applicant experience and demonstrated communication skills are most important followed closely by technical skills; education and location are significantly less important); (iii) education selection (e.g., choosing a college whereby Stanford and Harvard are considered best, with Princeton a close second; Ohio State University and Northwestern University are an acceptable third place, and University of Georgia is fallback); (iv) product selection (e.g., choosing a vehicle wherein aesthetics, price, and fuel efficiency are each considered).

There are various approaches to the decision-making process. One approach is simple ranking, such as by arranging items from "best" to "worst." However, simple ranking may not provide insight on the magnitude of difference between any two items on the list. Another approach is to score each item individually on a common scale (such as 0 to 10, where 0 is "worst" and 10 is "best"). This approach may work well, but suffers from two problems:
 (i) unless participants are given instructions to score one item at the top of the scale and one item at the bottom (which may make the participant experience more complicated), it becomes difficult to meaningfully aggregate the relative preference of multiple participants; and
 (ii) since the objective is relative preference among a set of items, scoring each item individually against an absolute scale (instead of with respect to the other items) uses an artificial basis of measurement, and may lead to lower-quality judgements.

A technique that addresses the drawbacks to scoring each item individually on a common scale is the analytic hierarchy process (AHP). AHP asks participants to do multiple pairwise comparisons (relative comparisons between two items in the set), and then uses the results of those pairwise comparisons to establish relative preference by mathematical algorithm.

SUMMARY OF THE INVENTION

In one or some embodiments, a method for inputting a user rating in an electronically-presented space is disclosed. The method includes: accessing a plurality of icons, a respective icon of the plurality of icons indicative of a respective item for rating; electronically presenting the plurality of icons and electronically presenting a space that enables a user to at least partly position the plurality of icons within or relative to the space; responsive to the user at least partly positioning the plurality of icons within the space, receiving one or more indications of the positioning of the plurality of icons within the space; and rating the plurality of icons based on the one or more indication of the positioning of the plurality of icons within the space.

In one or some embodiments, an apparatus configured to input a user rating in an electronically-presented space is disclosed. The apparatus includes: hardware configured to generate the electronically-presented space; one or more input devices; and at least one processor in communication with the hardware configured to generate the electronically-presented space and the one or more input devices. The at least one processor configured to: access a plurality of icons, a respective icon of the plurality of icons indicative of a respective item for rating; electronically present, via the hardware, the plurality of icons and electronically present, via the hardware, a space that enables a user to at least partly position the plurality of icons within or relative to the space; responsive to the user at least partly positioning the plurality of icons within the space, receive one or more indications of the positioning of the plurality of icons within the space; and rate the plurality of icons based on the one or more indication of the positioning of the plurality of icons within the space.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIGS. 3A-C are illustrations of a display for a second participant (different from the first participant), including FIG. 3A of a display showing placement of icons by the second participant, FIG. 3B of a display showing numeric interpretations of the placement of icons by the second participant, and FIG. 3C of a display showing re-centering of the icons previously placed by the second participant.

FIG. 5A is a table illustrating a three-tier hierarchy of criteria.

FIG. 17 is a table related to a car buying decision.

FIG. 18 is a table related to a college choice decision.

FIG. 19 is a table related to a vacation destination decision.

FIG. 20 is a table related to an event location decision.

DETAILED DESCRIPTION OF THE INVENTION

Figure 1A:
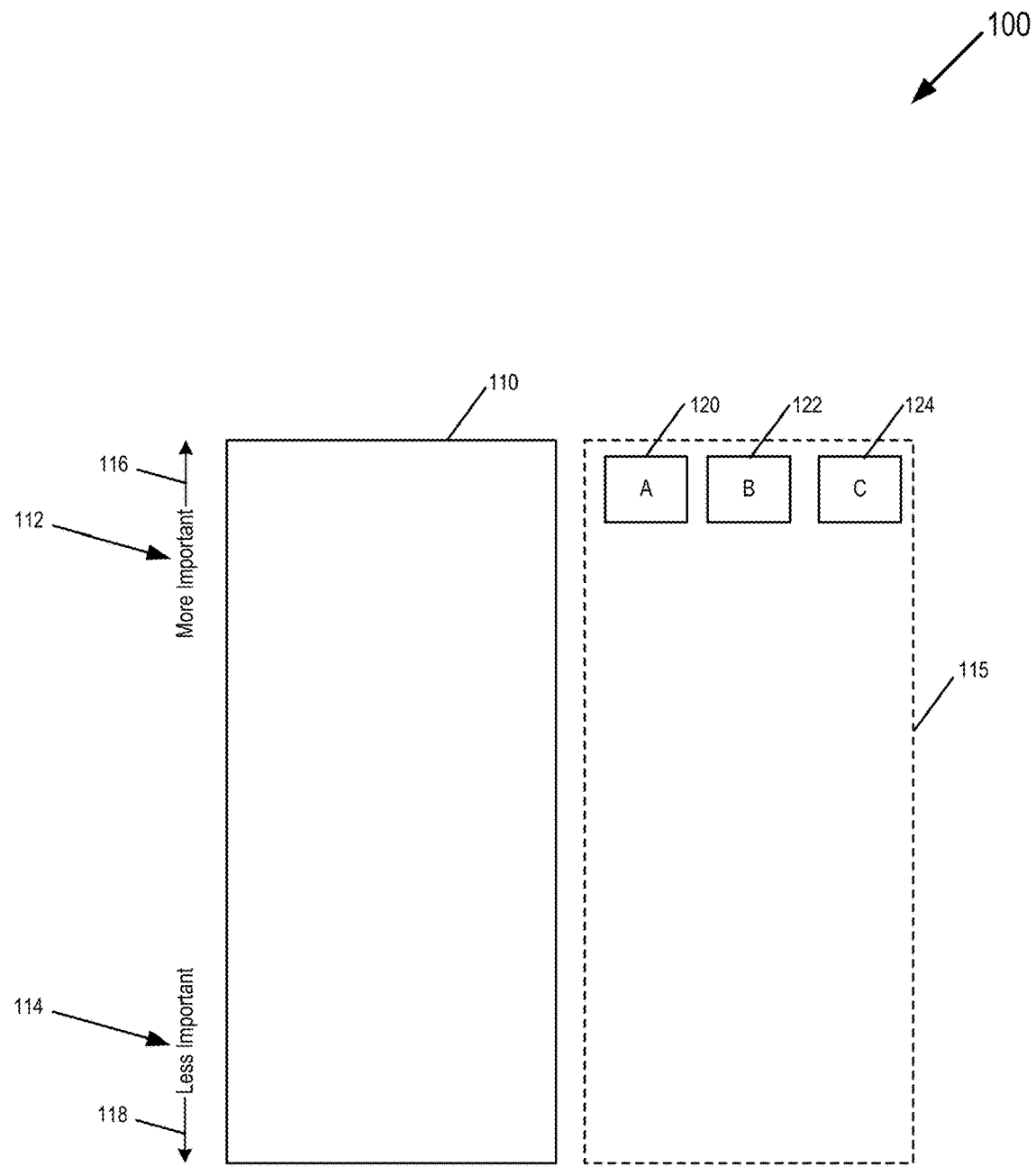
FIG. 1A is an illustration of a display of a first example that includes a rating canvas with 1-axis rating and a staging area, which includes a plurality of icons and prior to the user taking any action.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

As discussed in the background, there are various approaches to the decision-making process. One such approach is AHP, in which participants do multiple pairwise comparisons. While AHP may address the problems of scoring each item on a common scale, it introduces its own problems including: (i) the number of pairwise comparisons grows exponentially with the number of items being prioritized, which places practical limitations on the number of items that can be reasonably compared with this method; and (ii) participants may do comparisons in a way that can introduce logical inconsistencies (e.g., a participant may prefer A to B and B to C, and then prefer C to A).

Thus, in one or some embodiments, a system and a method are disclosed that use an electronically-presented space in order to input user preference. In one or some embodiments, user preference may include any one, any combination, or all of: relative preference (e.g., relative to other items or relative to a defined metric); priority; importance; performance; appeal; approval; probability (e.g., outcome probability); or other metric (e.g., other qualitative and/or quantitative metric). Specifically, the user may provide input, such as manual input and/or vocal input, to place or position one or more icons within or relative to the electronically-presented space. Responsive to the placement, the system may determine an indication of position of the one or more icons. For example, the indication of the position of the icons may be determined by one or both of: (i) relative, such as at least one icon determined relative to one or more other icons (e.g., a distance calculated between respective positions of two or more icons); or (ii) absolute, such as relative to a predefined scale (e.g., the position of each of the one or more icons may be measured relative to a scale associated, included or part of the electronic space, whether visually presented or not). Thus, the position (absolute and/or relative) of a respective icon may indicate rating, including any one, any combination, or all of: prioritization; assigned importance; assigned probability; or assigned preference, with the system determining the position and the associated indication. Further, in one or some embodiments, absolute rating may include the predefined scale (e.g., the rating scale) along with, in conjunction with, or integrated with the rating canvas. In one or some embodiments, relative rating need not include a rating scale. Rather, the rating may be based on the relative positioning of items, discussed further below, on the rating canvas. Alternatively, a rating scale may be included as a measure of the relative nature with respect to positioning of the items on the rating canvas (e.g., the rating scale may provide a metric as to the relative distance between items on the rating canvas).

In this regard, rating may include a relative rating and/or an absolute rating. Examples of relative rating (interchangeably termed relative interpretation) may include prioritization rating or probability rating. Other examples of relative rating are contemplated. Thus, by way of example, prioritization rating or probability rating may be determined based on a distance between icons on the rating canvas. Examples of absolute rating (interchangeably termed absolute interpretation) may include scoring. Other examples of absolute rating are contemplated. By way of example, scoring may be determined based on a distance, measured using a scale, from a predetermined point or section of the rating canvas (such as the bottom of the rating canvas). In one or some embodiments, rating may generally be based on a scale, such as a relative rating determined based on a relative scale or an absolute rating based on an absolute scale. In this regard, rating may include any one, any combination, or all of: prioritizing; assigning importance; or assigning preference. As discussed below, the rating canvas may have an associated scale (e.g., a relative scale and/or an absolute scale). Further, in one embodiment, the associated scale may be displayed along with the rating canvas. Alternatively, the associated scale is not displayed along with the rating canvas.

In one or some embodiments, the electronically-presented space comprises a rating canvas by which a user may rate one or more items via placement of icons in, on, or with respect to the rating canvas. The rating canvas may comprise a 2-D electronically presented space, such as a section of a display screen, that is electronically presented (e.g., with the assistance of one or more electronic devices). Alternatively, or in addition, the rating canvas may comprise a 3-D electronically presented space, such as based on a projection in holographic space and/or based on one or more sensors that sense at least a part of a user (such as a user's movements) in space (e.g., in 2-D space or 3-D space).

In practice, icon(s) representing respective item(s) may be positioned on the rating canvas in order to rate the respective items. In this way, the positioning of the icon(s), either manually (e.g., moving the icon on a display screen or physically in a virtual-reality 2-D or 3-D rating canvas) or vocally (e.g., using voice recognition in order to interpret vocal commands), may be indicative of rating the items. In one or some embodiments, the icon may be a visual or non-visual representation (such as text and/or non-text). By way of example, the icon may perform one or both of the following functions: (i) indicate the item subject for rating; or (ii) be manipulable by a user (e.g., for placement on the 1-axis or 2-axis rating canvas (in 2-D space) or for placement on the 1-axis, 2-axis, or 3-axis rating canvas in 3-D space).

In this way, the icon(s) for rating may comprise a representation, such as an electronically-generated representation. In this regard, the icon may comprise any one, any combination, or all of: user-designable (e.g., indicating a user has elected or designated it), user-alterable (e.g., indicating a user has changed at least a part of it, such as shape or color), user-manipulable, or user-movable in the electronically-presented space. The icon may comprise any one, any combination, or all of: an image (e.g., a 2-D image or a 3-D image), a video clip, an animation, a visual representation of an audio clip, text, or the like that is associated or represents, for purposes of indicating user preference, an item. Merely as one example, a user may, using an electronic mouse, drag or move an icon in order to position the icon in or within the 2-D electronically presented space. As another example, a user may provide vocal input in order to designate a placement of the icon. As still another example, the user may provide hand and/or arm movements in order to place or position the icon in 2-D or 3-D space.

Various items (and in turn icons representing the items) for rating are contemplated. In one embodiment, the icon(s) may represent criteria (e.g., a respective icon represents a respective criterion item). In this instance, rating the icons may represent rating (e.g., prioritizing) the criteria.

In another embodiment, the icon(s) may represent non-criterion item(s). Various non-criterion items are contemplated, and include, merely by way of example, physical items (e.g., items for sale or purchase), conceptual items (e.g., ideas for consideration), or the like. In a specific embodiment, the icon(s) associated with non-criterion item(s) may be ranked for one or more criteria. For example, a non-criterion item may be tangible (e.g., an item for purchase, such as a vehicle, a smartphone, etc.) or may be intangible (e.g., a concept, an idea, a decision option, etc.). In this regard, items are to be interpreted broadly to include anything subject to evaluation or have an associated user preference. Further, any one, any combination, or all of images, iconography, colors, or a media player may be used to describe the items.

In practice, icons associated with a physical item (e.g., a vehicle) may be positioned on the rating canvas with an associated 1-axis criterion scale for the respective criterion (e.g., one of aesthetics, value, reliability, safety, or the like), with the positioning indicating an absolute or relative ranking on the 1-axis criterion scale. As another example, icons associated with the physical item may be positioned on the rating canvas with an associated 2-axis criterion scale (e.g., a first axis may have a first associated criterion scale for a first criterion and a second axis may have a second associated criterion scale for a second criterion; in one instance, the second criterion is independent of the first criterion; in another instance, the second criterion (such as sureness) is dependent on the first criterion). In this way, the icons representing items may be ranked, whether the item is a criterion item or a non-criterion item.

As discussed in more detail below, criteria may comprise any type of metric used for rating. In one or some embodiments, the criteria may be a single level hierarchy. Alternatively, the criteria may form a multi-level hierarchy (e.g., parent-child-grandchild criteria). Further, any use of the term criteria may be interpreted as a single criterion. For example, the user may place or position icons on the rating canvas to represent the ranking of the criterion items relative to one another or in absolute terms (e.g., a first icon representing a first criterion being ranked higher than a second icon representing a second criterion), as discussed below. In one or some embodiments, the criterion/criteria for rating (see below) may be qualitative (e.g., appearance, brand affinity, social status signal, etc.) or quantitative (e.g., cost, fuel efficiency, etc.). In particular, an example qualitative criterion may comprise a performance attribute. For example, in a car buying decision, "appearance" is a qualitative and subjective measure. An example quantitative criterion (interchangeably term an objective criterion) may comprise anything that may be quantifiable and knowable about each option under consideration. Examples in the car-buying context may include fuel efficiency (e.g., in miles-per-gallon (mpg) or miles-per-gallon gasoline equivalent (MPGe), passenger capacity, price, etc.). Further, in one or some embodiments, a quantitative property may be modeled as a qualitative property, in effect integrating the objective and the subjective. For example, part or all of a quantitative criterion may be modeled as qualitative (e.g., designating an objective criterion for preference, such as the user designating or ranking the magnitude or quantity of cost or fuel efficiency).

In one or some embodiments, the rating canvas may be generated or controlled by a rating canvas application, which may comprise software and/or hardware for performing the rating functions described herein. Example functions include, but are not limited to, any one, any combination, or all of: determining criteria for rating (e.g., based on any one, any combination, or all of user input, predetermined criteria, or receiving the criteria from a calling application); prioritizing criteria (e.g., using the rating canvas); determining item(s) for rating; rating the item(s) (e.g., placing icons or item icons on the rating canvas); analyzing the rating of the item(s); outputting the analysis of the rating of the item(s); or transmitting any one, any combination, or all of the rating, the analysis of the rating, or the output of the analysis for use by another software program (e.g., a calling application).

In one or some embodiments, a calling application comprises software and/or hardware that interacts with the rating canvas application. The calling application may interact with the rating canvas application for any of the functions ascribed to the rating canvas application. By way of example only, the calling application may perform any one, any combination, or all of: providing criteria to the rating canvas application; providing prioritization of criteria; receiving rating or prioritization of the criteria (e.g., as generated by the rating canvas application); provide item(s) for rating;

receiving any one, any combination, or all of ratings of the item(s), analysis of the ratings of the item(s), or the output of the analysis of the ratings of the item(s).

In one or some embodiments, scale may comprise any type of metric to assist in the rating. By way of examples, the scale may comprise a relative scale that may be used in the relative rating or may comprise an absolute scale that may be used in the absolute rating. In one embodiment, the scale is electronically presented along with the electronically presented space, as discussed below (e.g., the scale may be presented when performing an absolute rating). Alternatively, the scale is not electronically presented along with the electronically presented space.

If there is any conflict in the usages of a word or term in this specification and one or more patent or other documents that may be incorporated herein by reference, the definitions that are consistent with this specification should be adopted for the purposes of understanding this disclosure.

Thus, in practice, various electronically-presented spaces are contemplated, including a 2-D electronically-presented space which may take one or more forms (e.g., a rectangular form or a non-rectangular form (such as a circular form) displayed on a display screen) or a 3-D space which may take one or more forms (e.g., virtual reality space). Further, in practice, the user may provide the input in one of several forms, such as by: directly manipulating an electronic device to provide a manual input using a part of the user's body (e.g., the user moving an electronic mouse using his/her hand; the user touching a touch-sensitive touch-screen display); generating a user movement that is sensed by an electronic device proximate to (but not physically connected to) the user (e.g., a camera or other imaging device records user-generated hand movements in a video stream, with an electronic device sensing the user-generated hand movements by analyzing and interpreting the video stream; the user in virtual reality space performs the action of point or grabbing an object and manipulating the object, such as by moving the object or indicating its movement); or providing a vocal input indicative of placement or movement of the icon within the electronically-presented space (e.g., a user may speak keyword(s), such as "Hey Sin" or "Alexa", followed by a placement command, such as move RAV4 icon up by 10%).

Various sequences of determining user preferences are contemplated. One example sequence comprises: (1) enumerating criterion/criteria; (2) prioritizing the criteria; (3) determining items for inputting user preference; (4) receiving user input indicative of user preference; (5) analyzing the user input indicative of user preference; and (6) generating an output based on the analysis and/or sending the analysis to another application for further use.

As discussed above, various criterion/criteria are contemplated. In one or some embodiments, the criterion/criteria are predefined and not dependent on the specific user (e.g., not determined based on user input and/or not determined based on automatic analysis of one or more aspects of the specific user). As one example, in one embodiment, the rating canvas itself has predefined criteria. As another example, the calling application, which may call the rating canvas in order to receive user input, may define the criterion/criteria. Alternatively, the selection of the criterion/criteria may be dependent at least in part on the specific user providing the user preference. In one implementation, the user may be presented with a list of potential criteria from which to select. In turn, the user may select a criterion/criteria from the presented list. In this regard, in one or some embodiments, the user selection may be integrated or be performed in conjunction with the rating canvas. For example, the system may present the list of potential criteria (e.g., in text form, in icon form, etc.) as part of one or both of the rating canvas and the staging area, discussed further below. The user may then select the criterion/criteria with a user movement or user input with regard to the rating canvas and/or the staging area (e.g., move a selected icon to the staging area or directly to the rating canvas as indicating the selection of the criterion/criteria). Alternatively, or in addition, the system may analyze one or more aspects of the specific user in order to suggest the criterion/criteria. As one example, the system may analyze previous decisions made by the specific user in order to automatically select, without explicit user input, the criterion/criteria. As another example, the system may analyze previous decisions made by the specific user in order to a select a subset list of potential criteria (e.g., the subset list of potential criteria being fewer than the entire list of potential criteria), with the system presenting the subset list of potential criteria to the specific user for selection.

Further, in one or some embodiments, the criteria are prioritized (e.g., criteria are weighted differently in terms of importance). Prioritization of criteria may be performed in one of several ways. In one or some embodiments, the criteria may be prioritized using the disclosed methodology. For example, in one iteration of using the rating canvas, the criteria (which may have been selected with or without user input) may be represented as criteria-icons. As such, the user may place the criteria-icons in the rating canvas in order to indicate priority. In a subsequent iteration, items may be represented as item icons, with the user placing the item icons on the rating canvas that is for indicating user preference for one or more criteria. In this regard, in one or some embodiments, the electronically presented space may be used to select criteria and/or to prioritize the criteria, with the electronically presented space being used iteratively. Alternatively, in one or some embodiments, the system may automatically assign priority of the criteria, such as dependent on analysis of one or more attributes of the specific user. Still alternatively, in hierarchical criteria, the rating canvas may be used to prioritize different hierarchies of criteria, such as discussed below. Yet still alternatively, the criteria are not prioritized, with the criteria being weighted equally.

Further, the items subject to rating may be selected in one of several ways. In one way, the user may determine, either via the rating canvas or via the calling application, the items subject to rating. As one example, the user may select items to drag and drop into the rating canvas for rating. As another example, a plurality of users may select items (such as via the rating canvas) with the system then selecting the items (e.g., the system may select the top 5 requested items, based on the selections of the plurality of users for rating). As still another example, the user may perform one or more actions in a calling application that designates the items. In one particular example, the user may perform a search, either through the rating canvas or through the calling application, with the results of the search being used to designate one or more items for ratings. As discussed in more detail below, the search may generate a list of items for purchase, such as vehicles. In one or some embodiments, the system may automatically designate the items for rating (e.g., the top 10 items resulting from the search are automatically designated as items for rating, with respective icons automatically generated indicative of the top 10 items). Alternatively, the user may select from the resulting search to indicate the items for rating (e.g., right click of a mouse to indicate a respective search hit to be used as an item for rating). In another particular example, the criterion/criteria may be designated (e.g., as discussed above, the criterion/criteria may be selected by the user, may be designed by the user using the rating canvas, or may be automatically selected). The designated criterion/criteria may then be used by the calling application in order to select the items. For example, for a calling application that comprises a search engine, the designated criteria for a search of refrigerators performed by the search engine may include price and quality. The calling application may use the designated criteria in order to perform a search that selects the top 10 items that may be scored against the designated criteria. (e.g., the top 10 refrigerators that meet the criteria threshold of price and quality). After which, the user may be presented with the top 10 items for use with the rating canvas. In one embodiment, the user may rank the top 10 items with the rating canvas using a different criterion or criteria (e.g., ranking the top 10 items based on aesthetics (such as "do I like this item or not" or "is it aesthetically pleasing") whereas price and quality were used to select by the search engine to select the top 10 items). Alternatively, the user may rank the top 10 items with the rating canvas using at least one common criterion or common criteria. Alternatively, the items for rating are selected independently of the user. As one example, in conducting surveys or the like, a user (or a plurality of users) are presented with the same set of items for ratings.

In this regard, the rating canvas may be used to perform one or more of the functions listed above. Merely by way of example, the rating canvas may be used for one or for both (e.g., iteratively) to: (i) prioritize criteria (e.g., the icons represent criteria items for prioritizing); and (ii) rating items (e.g., the icons represent non-criteria items for prioritizing relative to one or more criteria). In one instance, the user may use the rating canvas to perform both in terms of prioritizing the criteria and thereafter rating the items. As one example, the user may prioritize the criteria, which may be used to generate the items for rating. The user may then rate the items using the rating canvas, with the same or different criteria that was previously prioritized, as discussed above. In another instance, the user may use the rating canvas in order to perform the prioritizing of the criteria, which may then be used by the calling application to generate a ranked list, which may be reviewed by the user without using the rating canvas.

As discussed above, multiple users may provide input on item(s) subject to rating. In one or some embodiments, the at least some (or all) of the items subject to rating are identical across the multiple users. In one or some embodiments, one or more aspects of the ratings, including any one, any combination, or all of: the interpretation of the user ratings across users may be performed in combination; the presentation of the user ratings across users may be performed in combination; or the use of the ratings across users may be performed in combination.

As one example, in one or some embodiments, the interpretation of the ratings may be performed across users in combination. In a first embodiment, the interpretation of the ratings across users may be performed with a predicate step prior to combination of the ratings across the users. In particular, the predicate step may be used to process and/or aggregate the data obtained from a plurality of users. As one example, the predicate step may focus on one or more consistency metrics across the multiple users (e.g., recentering) and/or within a specific user. In particular, the predicate step may comprise manipulating the user ratings by recentering the user ratings in the ratings canvas (with the recentering being independent of the specific user). After which, the recentered user ratings for the plurality of users may be combined. Another example predicate step comprises recentering (or performing another predicate step) dependent on analysis of the specific user, such as analyzing ratings of the specific user for his/her history of ratings in order to determine whether (and how) to perform the recentering. In a particular example, a specific user may typically use the top ⅔ of the rating canvas. As such, the recentering of the ratings may be based on an analysis of the specific user's previous ratings inputs (e.g., in the given example in which the specific user typically uses the top ⅔ of the rating canvas, the ratings may shift so that if the current user rating inputs are in the top ⅔ of the rating canvas, they are recentered so that the ratings are across the entire rating canvas. Thus, in one or some embodiments, various processes, such as normalization, may be performed. In a second embodiment, the interpretation of the ratings across users may be performed without any predicate step(s) such as normalization.

Normalizing may include accessing data from multiple sources and performing at least one process to increase uniformity of the data. One example of normalizing comprises recentering. Another example comprises using ratios in order to increase the uniformity. In one or some embodiments, the normalizing may be directed to ameliorating the constraints in presenting the data. In particular, the rating canvas provides the means by which users may position icons in an abstract space, with the system determining the relative positioning of the icons (either relative to one another or to an absolute scale). In some respects, the rating canvas is an artificial constraint, either by drawing a box on a 2-D display or a volume in 3-D space. In such a system, the normalization may better present the determined relative positioning within this artificial constraint.

As another example, the presentation of the ratings across users may be performed across users in combination. In a first embodiment, the presentation of the ratings may reflect performing the predicate step prior to combination of the ratings across the users. In a second embodiment, the presentation of the ratings may reflect the combining of the ratings across the users without performing the predicate step. As still another example, the use of the ratings across users may be performed in combination.

Further, in one or some embodiments, the rating canvas may be used as a standalone application. Alternatively, the rating canvas may be used in combination, with one or more applications, such as one or more calling applications. In particular, in one or some embodiments, the calling applications may be integrated with the rating canvas in one or more ways, such as any one, any combination, or all of: determining which criterion/criteria to use; prioritizing of criteria; input of user ratings; output of user ratings; use of user ratings. Further, the rating canvas may be used iteratively in any of the above or all combinations. In this way, the rating canvas may represent a consistent user experience for disparate activities that is simple, effective and intuitive.

Thus, in one or some embodiments, a method and system are disclosed that enables one or more users to prioritize a collection of items in such a way that multiple users' judgements may be aggregated in a meaningful way in order to reach consensus about the relative importance of the items. In one or some embodiments, users may position shapes (which may be labeled) on a plane. Each shape may represent an item to be prioritized, and the distance (such as the distance between the items) is indicative of preference (such as relative preference) among the items. More specifically, in one or some embodiments, positions of the items with respect to each other and the rating canvas may be used to measure various attributes (e.g., preference, performance, probability). Further, aggregation may be performed for various types of ratings, including relative rating and/or absolute rating. As one example, when the item positions are only relevant in relation to each other (as opposed to an absolute measurement), multiple users' positions may be meaningfully aggregated by performing additional processing post-positioning, such as by performing any one, any combination, or all of: recentering each user's cluster of items; performing normalization; or considering how the user input the rating (e.g., various metrics of the user input, such as the time it took for the user to place a respective icon, the speed at which the user placed the respective icon, whether the user adjusted the placement of the respective icon, the number of times the user adjusted the placement of the respective icon, may be used to infer sentiment, such as certainty, as to the placement of the icon). Likewise, aggregation may be performed with absolute rating (e.g., all are rated on a common scale).

In one or some embodiments, the disclosed methodology may be intuitive for users; positioning shapes in accordance with their relative importance involves spatial reasoning, which may be more natural than assigning numbers. The methodology may also allow for the prioritization of a large number of items (e.g., 20 or more), which may be impractical with other methods, such as AHP.

Referring to the figures, FIG. 1A is an illustration 100 of a display of a first example that includes a rating canvas 110 with 1-axis rating canvas and a staging area 115, which includes a plurality of icons 120, 122, 124 and prior to the user taking any action. Any discussion of the rating canvas (e.g., rating canvas 110), though implying a 2-D space, may equally apply to a 3-D space. The 1-axis rating may be associated with a criterion and an associated scale, seen as 112 ("more important") and 114 ("less important") with associated arrows 116, 118. FIG. 1A illustrates the 1-axis rating in the y-direction. Alternatively, the 1-axis rating may be in the x-direction, or in any straight line direction (e.g., a line at a 45° angle). For example, the 1-axis rating may comprise distance from a point (e.g. the center of a circle) to the icon. Thus, use of either axis on the rating canvas 110 may be used to indicate priority, importance, or preference.

In one or some embodiments, only a single associated scale is used. In this regard, in one or some embodiments, only one axis is used to establish user preference. In this way, the user may use the other axis to arrange items, making it easier to indicate equal or nearly equal preference between items (e.g., in a y-axis scale, equal preference may be indicated by positioning icons side-by-side; in an x-axis scale, equal preference may be indicated by positioning icons in line with one another).

As discussed above, the items, such as represented by icons 120, 122, 124, may be selected in one of several ways. In one way, a user who wishes to establish the relative importance (e.g., the priority) of some number of like items may begin by first enumerating the items. In one or some embodiments, this may be done by one user alone, or may involve other actors to establish the list of items. For example, when a ground of users wishes to prioritize a set of items, one, some, or each user may select his/her items for establishing relative importance, based on which the system may select the items for establishing relative importance. For example, in one or some embodiments, the users may each select items for importance, with the system compiling each of the items selected by the users for ranking via the rating canvas 110. As another example, the users may each select items for importance, with the system only selecting those items that are common to some or all users for ranking via the rating canvas 110. Alternatively, the system may select the items for ranking, as discussed above.

Once the list of items is complete, in one or some embodiments, the user may then determine what person or persons are to be involved in the prioritization of the items. These people (interchangeably termed "participants," even if it is only one person) may be experts in the category to which the items belong, people impacted by the outcome of the prioritization, or any other relevant party. In one or some embodiments, the user may also be a participant.

Each participant may then be presented with an interface, such as illustrated in FIG. 1A. The items being prioritized may be represented by icons 120, 122, 124. In one or some embodiments, the icons may be labeled meaningfully, or may be labeled with numbers or letters requiring a key to distinguish.

In the initial state of the interface for each participant as illustrated in FIG. 1A, in one or some embodiments, each item to be prioritized is in the staging area 115. Each participant may then drag an icon 120, 122, 124 from the staging area 115 to the rating canvas 110 via an input that is at least partly user directed. In one embodiment, the user direction may comprise manually controlling a device, such as a pointing device (e.g., a mouse) or a touch device such as a tablet. Alternatively, the user direction may comprise a voice-input (e.g., voice recognition indicative of user input as to placement of one or more icons). In either instance, the participant decides where to place or position the item on the rating canvas 110 according to his/her personal judgement about that specific item and the directions provided by the associated scale 112, 114 attached to the rating canvas 110, which establish where more important items and less important items are to be placed. Various definitions of importance are contemplated. In one embodiment, importance comprises any one, any combination, or all of quality, value, personal preference, or any other quality that can be evaluated. The text of the associated scales 112, 114 may be configured to best inform the participants about how to position the items.

The icons 120, 122, 124 may be presented in staging area 115 in one of several ways. In one way, the icons 120, 122, 124 may be presented based on at least one aspect associated with the underlying items (e.g., in alphabetical order according to the name of each item). Alternatively, the icons 120, 122, 124 may be presented independently of the underlying items. For example, the icons 120, 122, 124 may be randomly presented in staging area 115 in order to reduce primacy effect with a plurality of participants. In an alternate embodiment, instead of (or in addition to) presenting staging area 115, the icons for items not yet rated may be displayed one-by-one instead of being presented in a staging area.

Thus, FIG. 1A shows staging area 115 as part of the display. In an alternative embodiment, staging area 115 is not present. Rather, by way of example, the icons 120, 122, 124 (whether icons associated with items, icons associated with criteria, etc.) may appear directly on the rating canvas 110, and may be distinguished in one or more aspects prior to the user placing them. For example, the user may be provided one or more visual cues that are indicative to the user to place the icons. The visual cues may include one or both of the positioning of the icons (e.g., positioning the icons in the staging area or the introduction of the icon to the rating canvas 110, which may indicate that the icon is to be placed on the rating canvas 110), the movement of the icons (e.g., having the icon fall from the top of the display (e.g., outside of the rating canvas 110) to inside of the rating canvas), or one or more aspects of the icons. Aspect include, but are not limited to, any one, any combination, or all of: the color of the icon (e.g., a first color for the icon prior to placement and a second color for the icon after placement; the icon pulsating prior to placement, and not pulsating after placement, etc.). As such, in one or some embodiments, the icons, whether initially placed in the staging area 115 and/or being initially placed somewhere (e.g., on the rating canvas 110), one or more aspects of the icon (e.g., the appearance of the icon, such as the falling of the icon into the staging area, the sudden appearance of the icon in the staging area, the "fading" into the canvas; the pulsating of the icon, etc.) may indicate to the user that the respective icon is to be placed by the user. In this regard, aspect(s) of the icon itself (e.g., the color, the pulsating, etc.) and/or the positioning or movement of the icon (e.g., positioning in the staging area 115, movement of the icon from outside of the rating canvas 110 to inside of the rating canvas 110, the sudden appearance of the icon within the rating canvas 110; etc.) may indicate to the user to place the icon on the rating canvas 110.

Figure 1B:
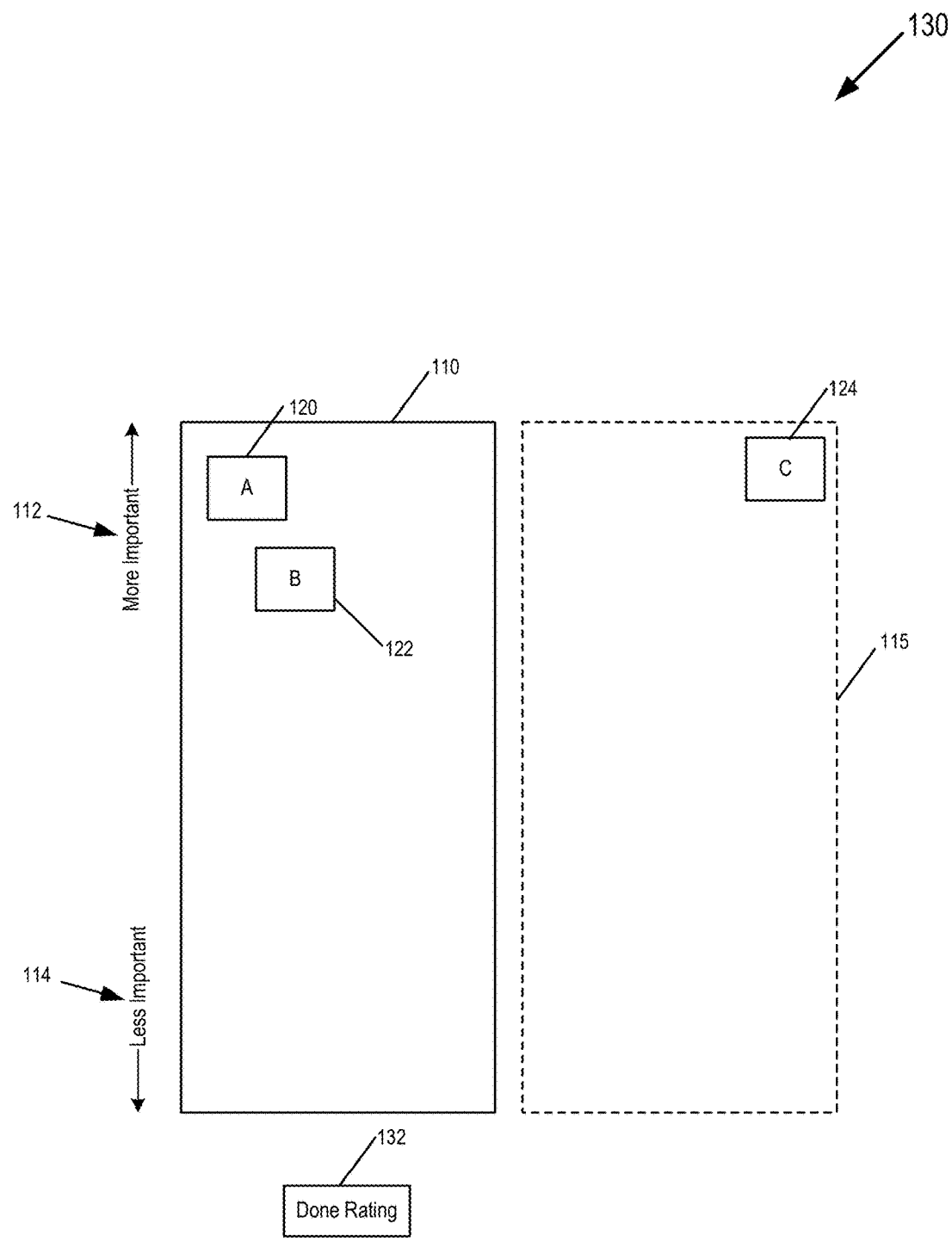
FIG. 1B is an illustration of a display of a first example that includes the rating canvas with 1-axis rating, which includes a plurality of icons placed therein by a user indicating priority, and the staging area, which includes one icon.

FIG. 1B is an illustration 130 of a display of a first example that includes the rating canvas 110 with 1-axis rating, which includes a plurality of icons 120, 122 placed therein by a user indicating priority, and the staging area 115, which includes one icon 124. As the participants begin to locate items on the rating canvas 110 as shown in FIG. 1B, the participants may position items in relation to icons associated with other items. As shown in FIG. 1B, the participant has placed item B (icon 122 associated with item B) close to item A (icon 120 associated with item A), indicating that they are close in importance. In one or some embodiments, participants need not place all icons associated with the items for rating to occur. Rather, participants may rank fewer than all of the icons presented in the staging area, such as illustrated in FIG. 1B, which may represent a complete prioritization, where the participants have abstained from prioritizing item C (icon 124 associated with item C). In order to indicate completion of the ranking, in one or some embodiments, the participants may provide an input, such as by clicking on "Done Rating" icon 132. Other indications for completion of the ranking are contemplated.

Figure 1C:
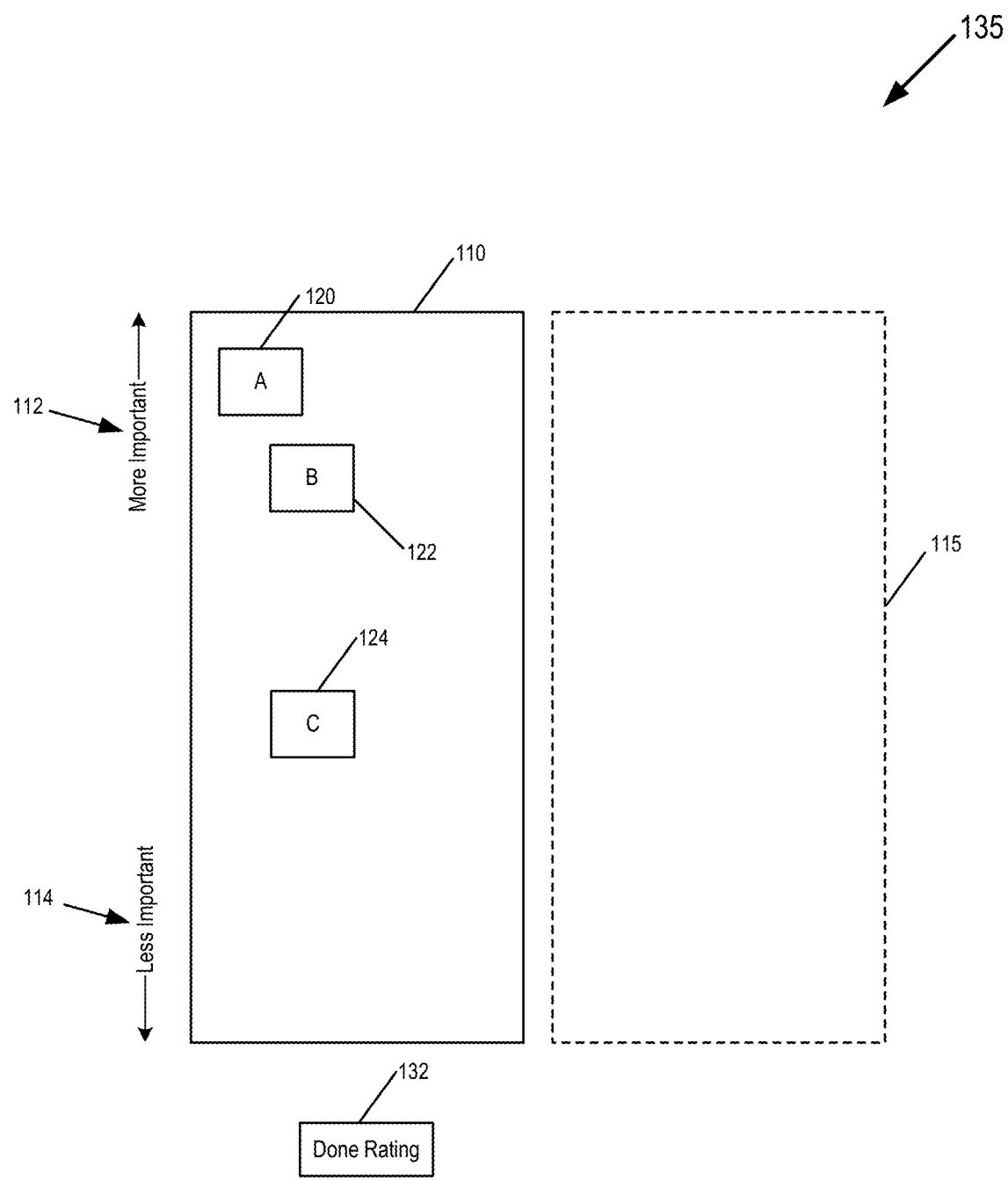
FIG. 1C is an illustration of a display of a first example that includes the rating canvas with 1-axis rating, which includes each of the plurality of icons placed therein by a user indicating priority, and the staging area.

FIG. 1C is an illustration 135 of a display of a first example that includes the rating canvas 110 with 1-axis rating, which includes each of the plurality of icons 120, 122, 124 placed therein by a user indicating priority, and the staging area 115. In the example depicted, the participant has indicated that item C (icon 124 associated with item C) is less important than item A (icon 120 associated with item A) and item B (icon 122 associated with item B). Furthermore, the positioning of the icons indicates that item C (icon 124 associated with item C) is less important than item B (icon 122 associated with item B) to a greater extent than item B (icon 122 associated with item B) is less important than item A (icon 120 associated with item A).

Figure 1D:
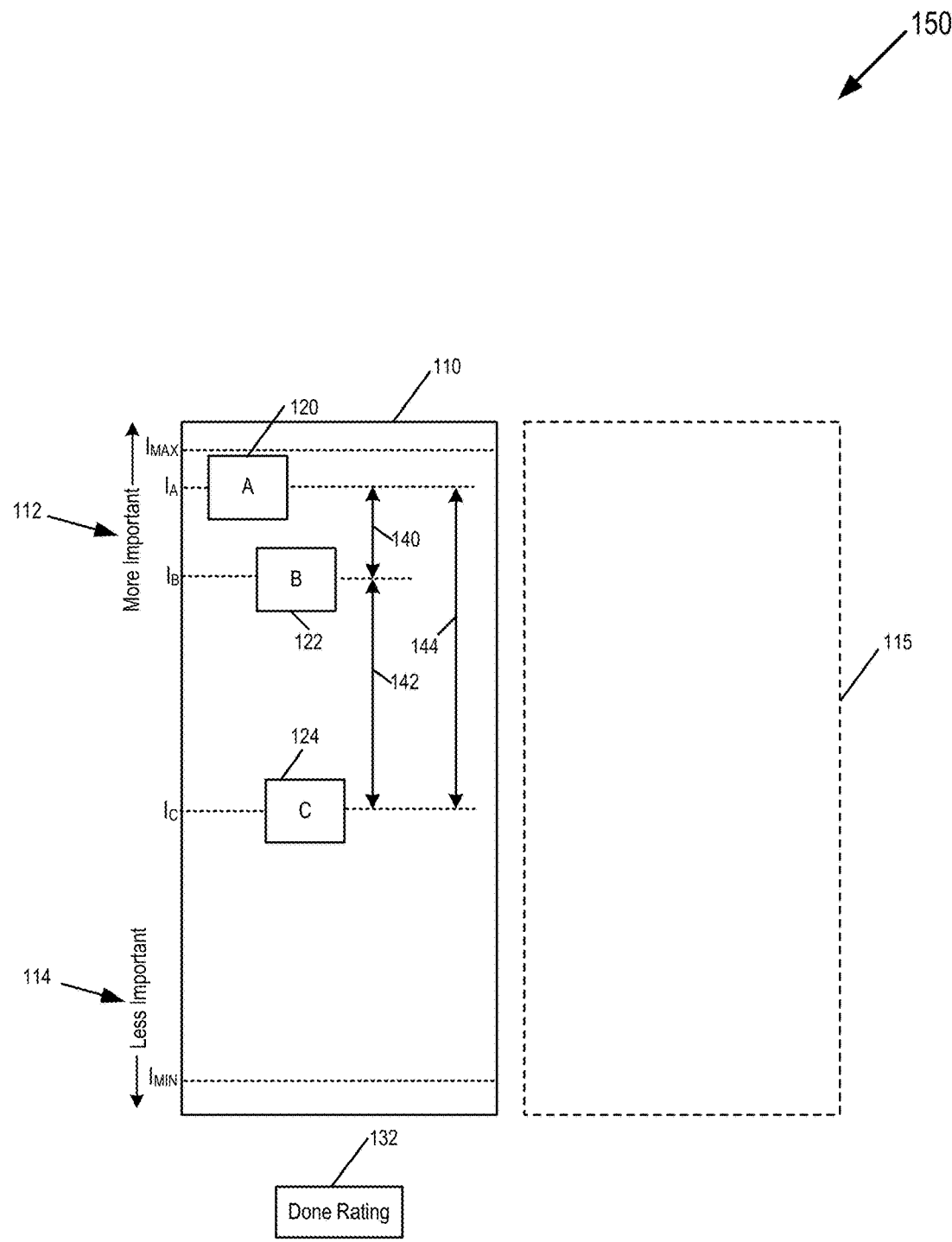
FIG. 1D is an illustration of a display of a first example that includes the rating canvas with 1-axis rating, which includes each of the plurality of icons placed therein by a user, the staging area, and notations for indicating interpretation (such as numeric interpretation) of user preferences based on the user placement of the icons in the rating canvas.
Figure 8:
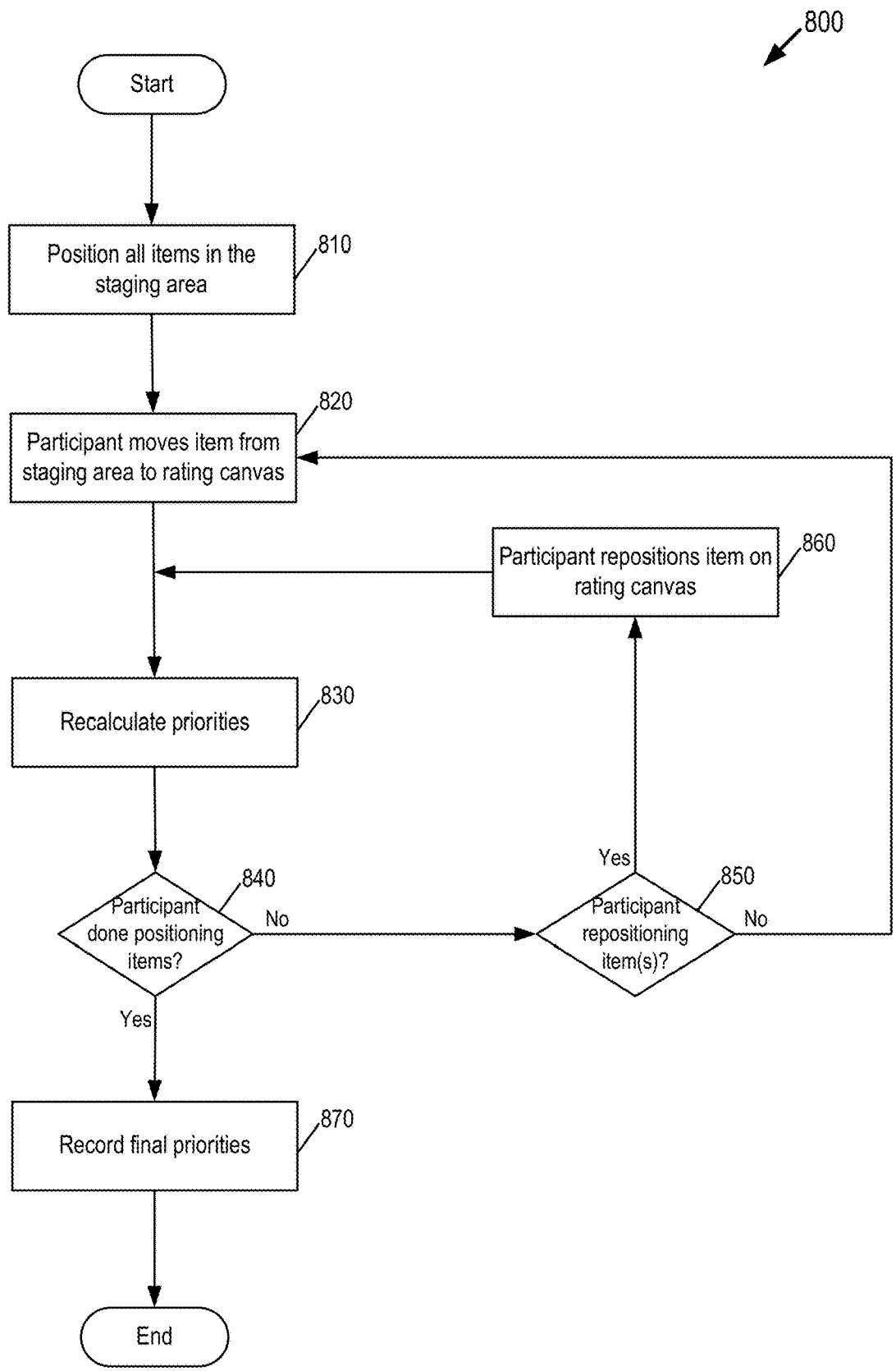
FIG. 8 is a third flow diagram of receiving and evaluating user input for determining user priorities.

FIG. 1D is an illustration 150 of a display of a first example that includes the rating canvas 110 with 1-axis rating, which includes each of the plurality of icons 120, 122, 124 placed therein by a user, the staging area 115, and notations for indicating interpretation (such as numeric interpretation) of user preferences based on the user placement of the icons in the rating canvas. FIG. 8 is an example summary of the process of a participant positioning icons, as discussed further below.

As discussed above, user preferences may be measured or indicated in one of several ways. In one way, the user preferences may be indicated by the placement of icons relative to one another. This is illustrated, for example, in FIG. 1D where icon A (120) is placed a distance (as indicated by arrow 140) from icon B (122) and is placed a distance (as indicated by arrow 144) from icon C (124). Likewise, icon B (122) is placed a distance (as indicated by arrow 142) from icon C (124). Alternatively, or in addition, user preferences may be indicated by the placement of the icons relative to a predetermined scale. This is illustrated, for example, in FIG. 1D where the placement of icon A (120) in rating canvas indicates a position of $I_A$ on the associated scale, icon B (122) in rating canvas indicates a position of $I_B$ on the associated scale, and icon C (124) in rating canvas indicates a position of $I_C$ on the associated scale. FIG. 1D further illustrates $I_{MAX}$ (indicating the maximum rating on the scale) and $I_{MIN}$ (indicating the minimum rating on the scale). In one or some embodiments, the placement of $I_{MAX}$ and $I_{MIN}$ are such that a respective icon, when positioned at the respective position (whether $I_{MAX}$ and $I_{MIN}$) is intersects the middle of the respective icon while still within the rating canvas 110.

Thus, the rating canvas 110 may integrate a criterion (whose relative preference is also established by a rating canvas 110, as described above), and the icons associated with the items on the canvas may represent options under consideration for the purpose of a decision. In one or some embodiments, the absolute position of each item on the canvas determines its quality with respect to the criterion in question.

Figure 1E:
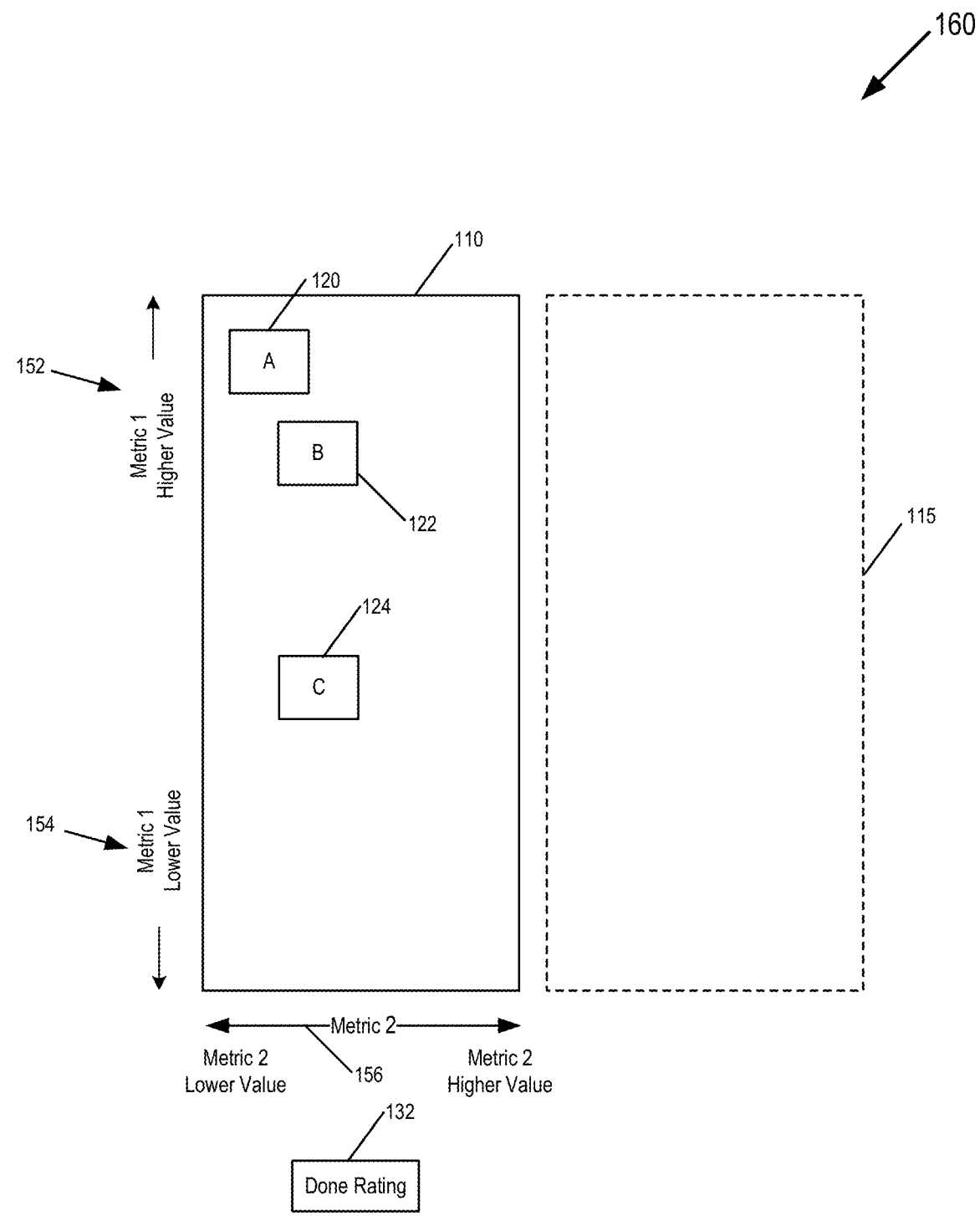
FIG. 1E is an illustration of a display of a second example that includes the rating canvas with 2-axis rating, which includes each of the plurality of icons placed therein by a user and the staging area.

FIG. 1E is an illustration 160 of a display of a second example that includes the rating canvas with 2-axis rating, which includes each of the plurality of icons placed therein by a user and the staging area. As shown, two separate axes for rating two separate metrics are shown with the y-axis of rating canvas 110 for metric 1 (showing "Metric 1 Higher Value" 152 and "Metric 1 Lower Value" 154) and for metric 2 156 (showing "Metric 2 Higher Value" and "Metric 2 Lower Value" for metric 2). Thus, FIG. 1E illustrates an example of using multiple associated scales. In this way, use of additional axes may be used to describe additional attributes of items being prioritized.

In one or some embodiments, different metrics may be used for 2-D or 3-D electronically presented spaces. As one example, the different metrics may comprise different criteria. As another example, the different metrics may be at least partly dependent on one another. In particular, metric 1 may comprise a specific criterion and metric 2 may be dependent on the specific criterion, such as a measure of sureness or certainty of the user in ranking the specific criterion. In either instance, the user may place the icons 120, 122, 124 using the rating canvas 110 to provide multi-dimensional ranking.

Figure 1F:
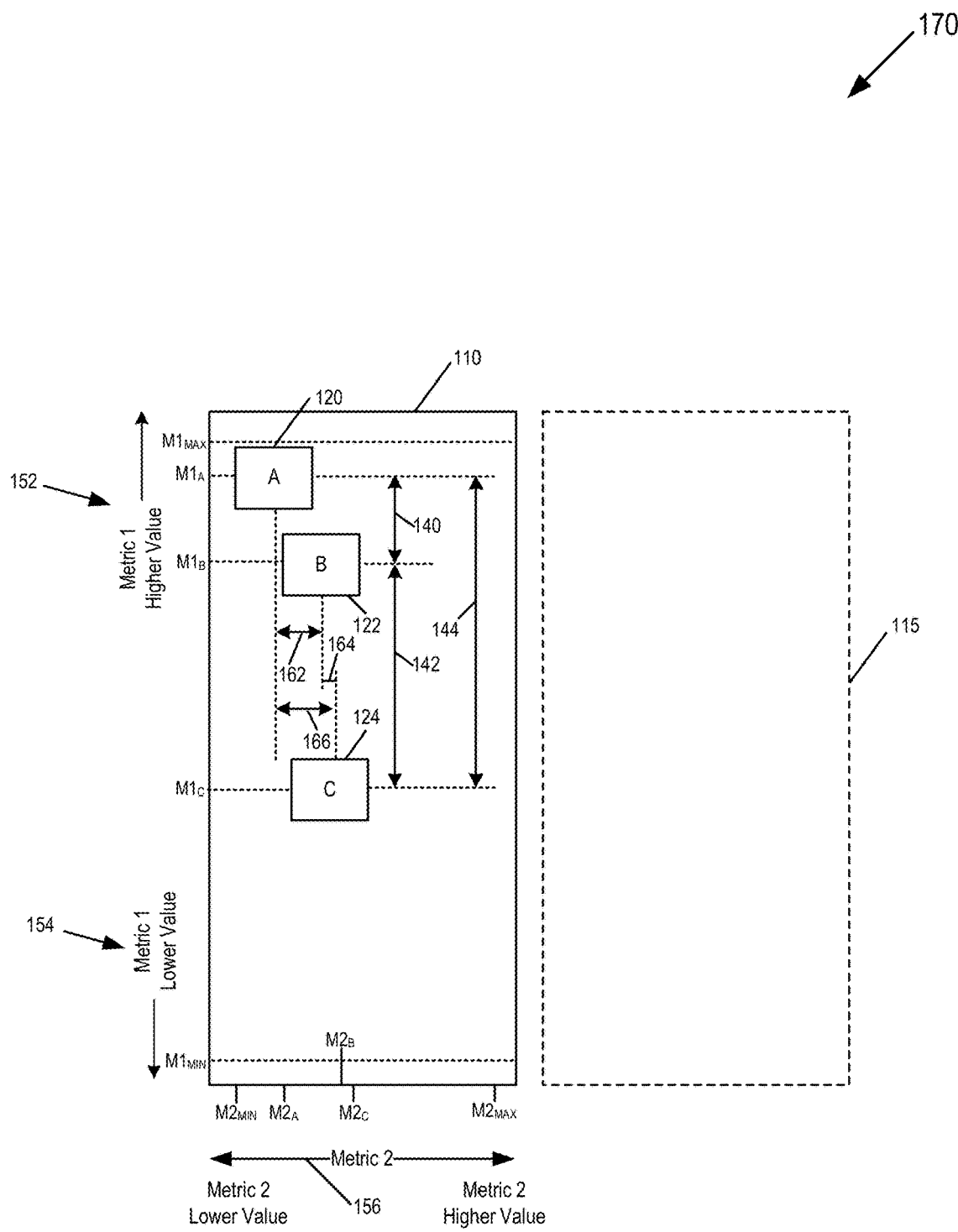
FIG. 1F is an illustration of a display of a second example that includes the rating canvas with 2-axis rating, which includes each of the plurality of icons placed therein by a user, the staging area, and notations for indicating user preferences based on the placement of the icons in the 2-axis rating canvas.

FIG. 1F is an illustration 170 of a display of a second example that includes the rating canvas with 2-axis rating, which includes each of the plurality of icons 120, 122, 124 placed therein by a user, the staging area 115, and notations for indicating user preferences based on the placement of the icons 120, 122, 124 in the rating canvas 110 that has 2-axis rating. As shown in FIG. 1F, the placement of each of icons 120, 122, 124 may be translated into one or both of an absolute rating or a relative rating. For example, as discussed above, in the y-axis, in absolute terms (between $M1_{MIN}$ and $M1_{MAX}$), icon A 120 has an absolute position of $M1_A$, icon B 122 has an absolute position of $M1_B$, and icon C 124 has an absolute position of $M1_C$. In relative terms, icon A 120 has a relative position with regard to icon B 122 of 140 and a relative position with regard to icon C 124 of 144. Likewise, icon B 122 has a relative position with regard to icon C 124 of 142. In the x-axis, in absolute terms (between M2$_{MIN}$ and M2$_{MAX}$), icon A 120 has an absolute position of M2$_A$, icon B 122 has an absolute position of M2$_B$, and icon C 124 has an absolute position of M2$_C$. In relative terms, icon A 120 has a relative position with regard to icon B 122 of 162 and a relative position with regard to icon C 124 of 166. Likewise, icon B 122 has a relative position with regard to icon C 124 of 164.

Figure 1G:
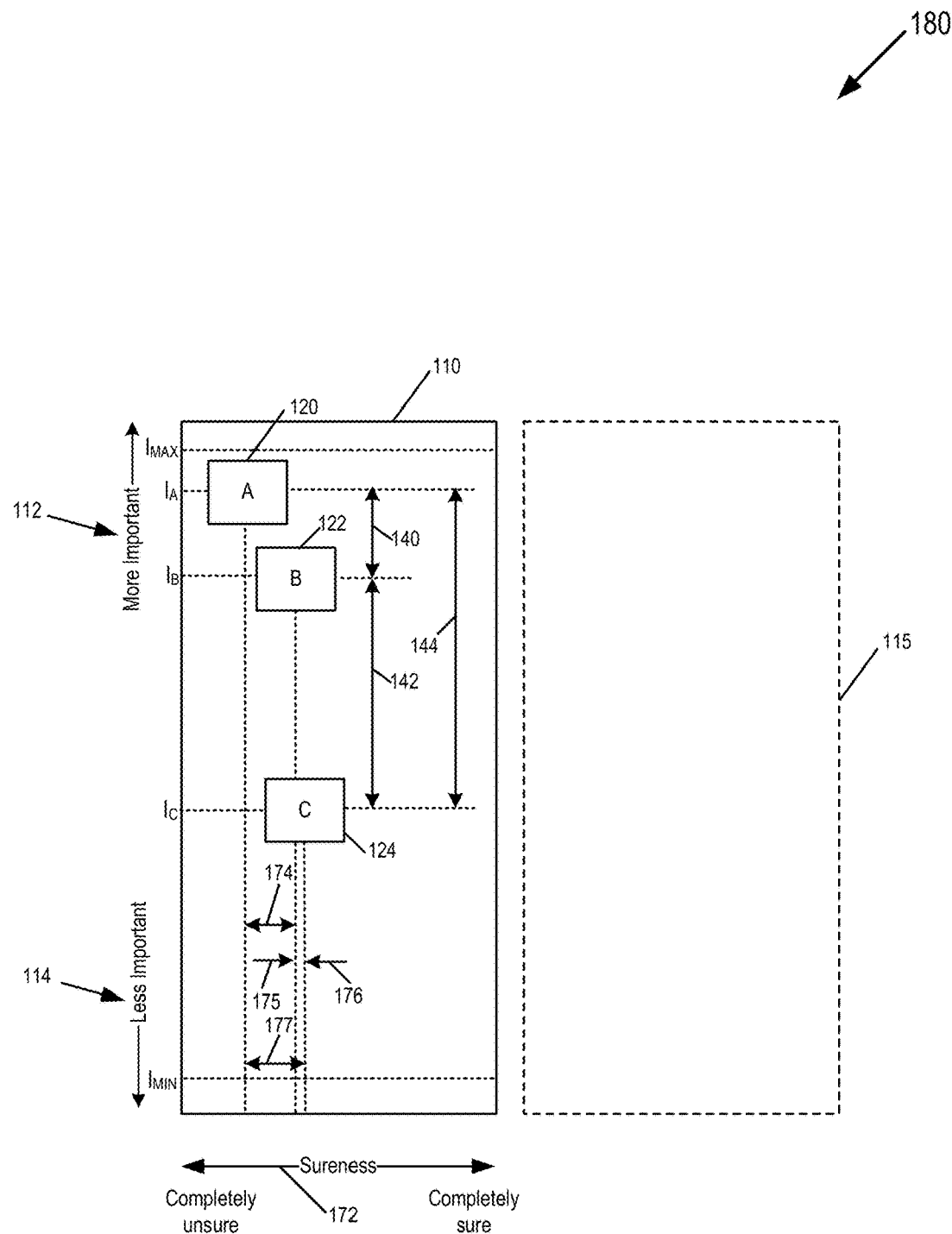
FIG. 1G is an illustration of a display of a third example that includes the rating canvas with 2-axis rating, which includes each of the plurality of icons placed therein by a user, the staging area, and notations for indicating user preferences based on the placement of the icons in the 2-axis rating canvas.

FIG. 1G is an illustration 180 of a display of a third example that includes the rating canvas 110 with 2-axis rating, which includes each of the plurality of icons 120, 122, 124 placed therein by a user, the staging area 115, and notations for indicating user preferences based on the placement of the icons in the rating canvas 110 with 2-axis rating. As shown, the rating metric in the x-direction and the rating metric in the y-direction are related, with the rating in the x-direction being an indication of sureness of the ranking of the rating metric in the y-direction, as illustrated in scale 172. As shown, the sureness metric may be indicative of absolute distances or relative distances (e.g., relative distance 174 indicative of sureness between icon A 120 and icon B 122; relative distance between arrows 175, 176 indicative of sureness between icon B 122 and icon C 124; or relative distance 177 indicative of sureness between icon A 120 and icon C 124). In this regard, FIG. 1G is a specific implementation of FIG. 1F (e.g., illustrating a 2-axis rating with respect to importance and sureness).

Figure 1H:
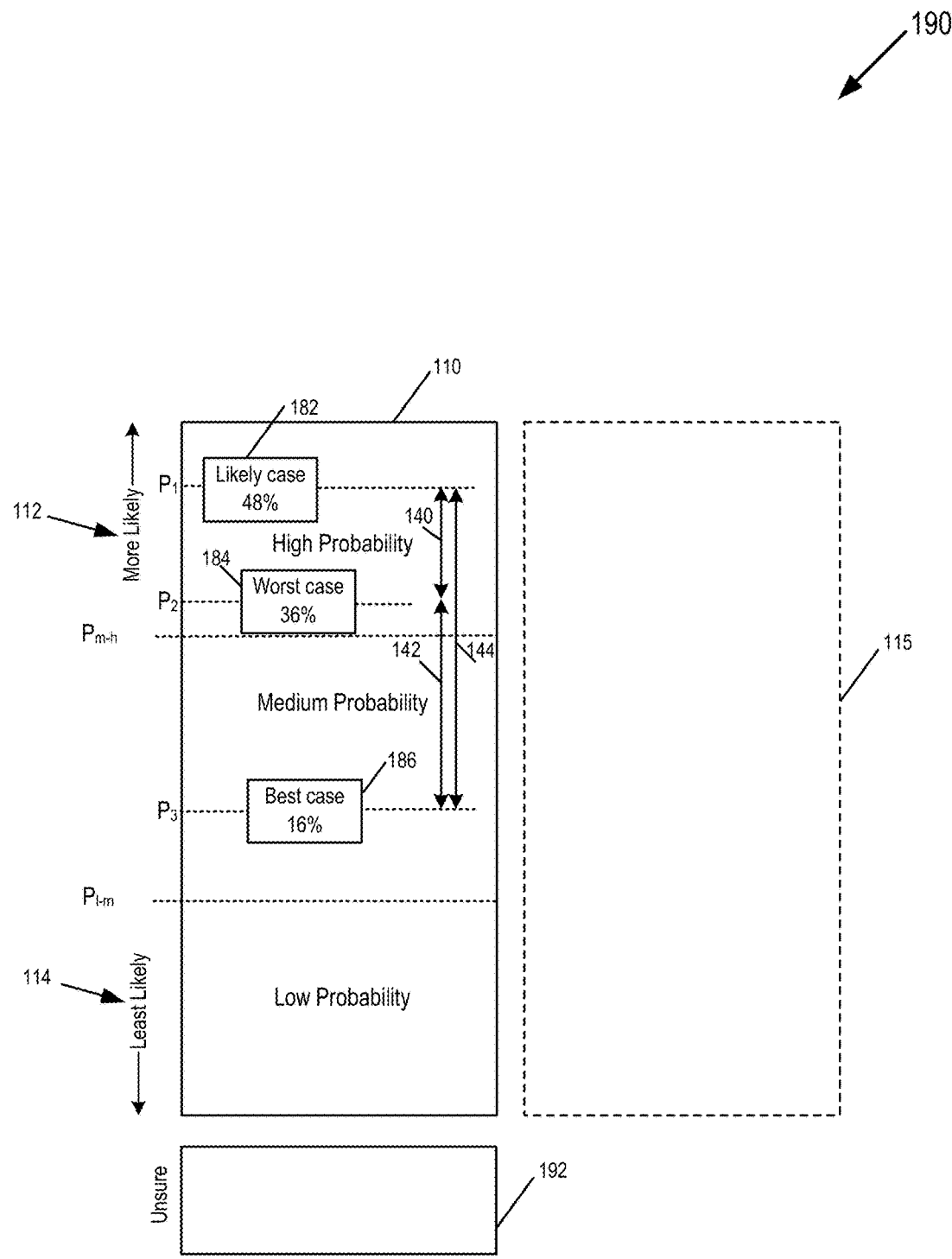
FIG. 1H is an illustration of a display of a fourth example that includes the rating canvas with 1-axis rating, which includes each of the plurality of icons indicative of a probability of outcome placed therein by a user, the staging area, an unsure area, and notations for indicating user preferences based on the placement of the icons in the 2-axis rating canvas.

FIG. 1H is an illustration 190 of a display of a fourth example that includes the rating canvas 110 with 1-axis rating, which includes each of the plurality of icons indicative of a probability of outcome placed therein by a user, the staging area 115, an "Unsure" area 192, and notations for indicating user preferences based on the placement of the icons in the 1-axis rating canvas 110. By way of example, the user may drag a respective icon into the "Unsure" area 192 to indicate that the user is unsure regarding the respective icon. In this way, the rating canvas 110 may be used to assign probabilities to outcomes, though there is no absolute scale. In one or some embodiments, the items on the rating canvas 110 may represent the totality of possible outcomes, and only their positions relative to each other may be relevant. In this implementation, the rating canvas 110 may be used to establish probability, instead of relative preference. In effect, the rating canvas 110 may use icons to represent future outcomes, with the user's positioning of an item in relation to the other items on the rating canvas 110 expressing their prediction of the probability of that potential future outcome.

Further, as discussed above, various types of ratings are contemplated. As one example, the probability of outcomes may comprise a type of rating. For example, FIG. 1H shows the ranking for the likely case (as shown by icon 182), the worst case (as shown by icon 184), and the best case (as shown by icon 186). Further, the rating canvas may show associated probabilities P$_1$ (for icon 182), P$_2$ (for icon 184), and P$_3$ (for icon 186), and one or more associated probability ranges (e.g., high probability greater than P$_{m-h}$, medium probability between P$_{m-h}$ and P$_{l-m}$, and low probability less than P$_{l-m}$). Further, illustration includes an "Unsure" area in which one or more icons may be placed when the person is unsure as to the rating. In this regard, the participants' assessment of the likelihood of each outcome may then be factored into the analysis that is presented to the user. By way of example, the "lowest performing" option might be the suggested decision, because all the other options have a high probability of having an unfavorable outcome. Merely by way of example, one scenario may comprise being offered a choice between a 1% chance of winning a million dollars, and a 99% chance of winning $20,000 dollars. The option of winning a million dollars may "perform" better than winning $20 k but (unless you are already so wealthy that $20 k does not mean anything to you), you will likely take the 99% bet. As such, there are four possible outcomes: $1M win: very high performance; $1M lose: very low performance; $20 k win: moderate performance; and $20 k lose: very low performance. In this regard, a low-performance but high-probability option may win out against a high-performance but low-probability option or the like.

Figures 2A, 2B, 2C:
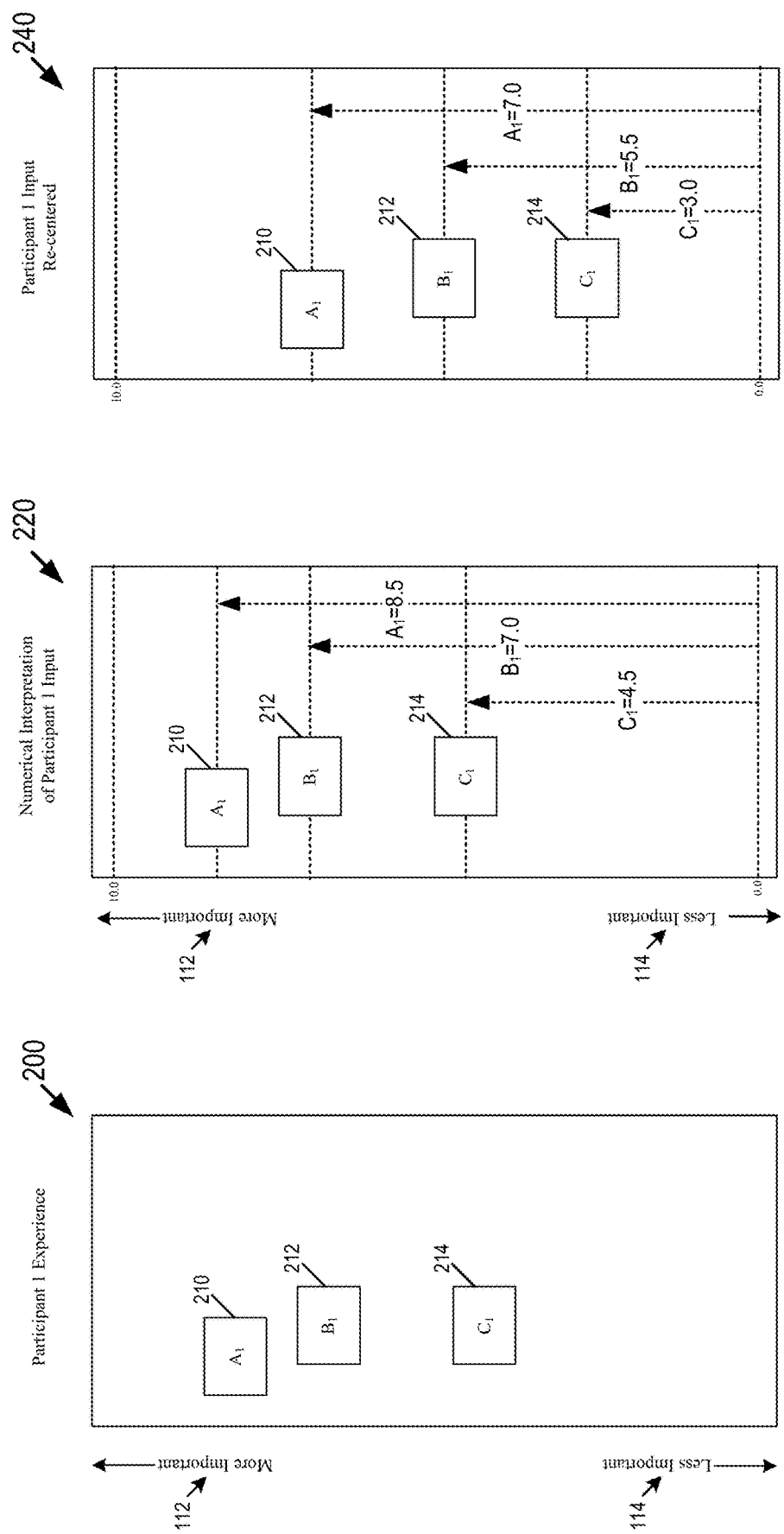
FIGS. 2A-C are illustrations of a display for a first participant, including FIG. 2A of a display showing placement of icons by the first participant, FIG. 2B of a display showing numeric interpretations of the placement of icons by the first participant, and FIG. 2C of a display showing re-centering of the icons previously placed by the first participant.

FIGS. 2A-C are illustrations 200, 220, 240 of a display for a first participant, including FIG. 2A of a display showing placement of icons A$_1$ 210, B$_1$ 212, C$_1$ 214 by the first participant, FIG. 2B of a display showing numeric interpretations of the placement of icons A$_1$ 210, B$_1$ 212, C$_1$ 214 by the first participant (see A$_1$=8.5 for icon 210; B$_1$=7.0 for icon 212; C$_1$=4.5 for icon 214), and FIG. 2C of a display showing re-centering of the icons 210, 212, 214 previously placed by the first participant (see A$_1$=7.0 for icon 210; B$_1$=5.5 for icon 212; C$_1$=3.0 for icon 214).

In particular, once a participant indicates they have finished placing all items in their final positions, such as by clicking on icon 132 (see, for example, FIGS. 1B-D), the relative priority of each item may be calculated. In one or some embodiments, the position of each item (as indicated by the position of its associated icon) may be measured. For example, the vertical position of each item may be measured from the bottom of the rating canvas. See FIG. 2B. Then, these measurements may be used to modify in one or more ways, such as by re-centering the cluster of items in the center of the canvas.

In the instance of recentering, the following are given:
H: vertical height of the rating canvas
Y: vertical positions of some number of items (from 0 to H)
min(Y): the minimum vertical position among the items
max(Y): the maximum vertical position among the items In one or some embodiments, the icons associated with the items may be re-centered by subtracting (min(Y)+(max(Y)−min(Y))/2−H/2 from each item's original vertical position. For example, FIG. 2B illustrates an example where H=10 and Y=[8.5, 7.0, 4.5]. The re-centered items have vertical positions of [7.0, 5.5, 3.0], as shown in FIG. 2C. In one or some embodiments, re-centering may be performed in order to meaningfully aggregate the preferences of multiple participants.

FIGS. 3A-C are illustrations 300, 320, 340 of a display for a second participant (different from the first participant), including FIG. 3A of a display showing placement of icons A$_2$ 310, B$_2$ 312, C$_2$ 314 by the second participant, FIG. 3B of a display showing numeric interpretations of the placement of icons A$_2$ 310, B$_2$ 312, C$_2$ 314 by the second participant (see A$_2$=5.5 for icon 310; B$_2$=4.0 for icon 312; C$_2$=1.5 for icon 314), and FIG. 3C of a display showing re-centering of the icons A$_2$ 310, B$_2$ 312, C$_2$ 314 previously placed by the second participant (see A$_2$=7.0 for icon 310; B$_2$=5.5 for icon 312; C$_2$=3.0 for icon 314).

FIG. 3A illustrates user input from a second participant (different from the participant in FIGS. 2A-C). As shown in FIG. 3B, the second participant positioned their items towards the bottom of the canvas, but still expressed the same relative preference between the three items as the participant from FIGS. 2A-C. When the second participant's items are re-centered (see FIG. 3C), they have the same values as the participant from FIG. 2C (after recentering), demonstrating the effectiveness of re-centering.

Figures 4A, 4B, 4C:
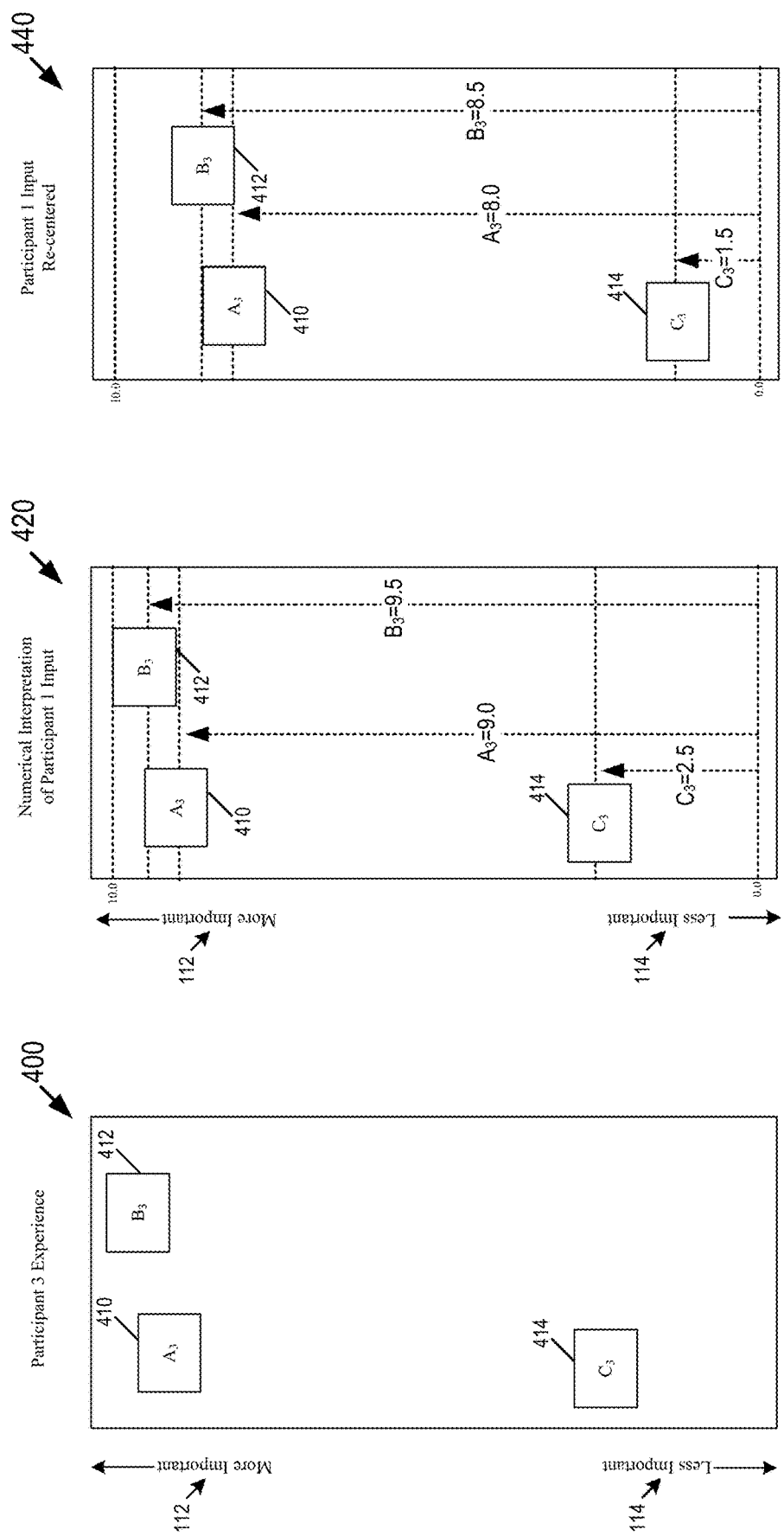
FIGS. 4A-C are illustrations of a display for a third participant (different from the first participant and second participant), including FIG. 4A of a display showing placement of icons by the third participant, FIG. 4B of a display showing numeric interpretations of the placement of icons by the third participant, and FIG. 4C of a display showing re-centering of the icons previously placed by the third participant.
Figure 6A:
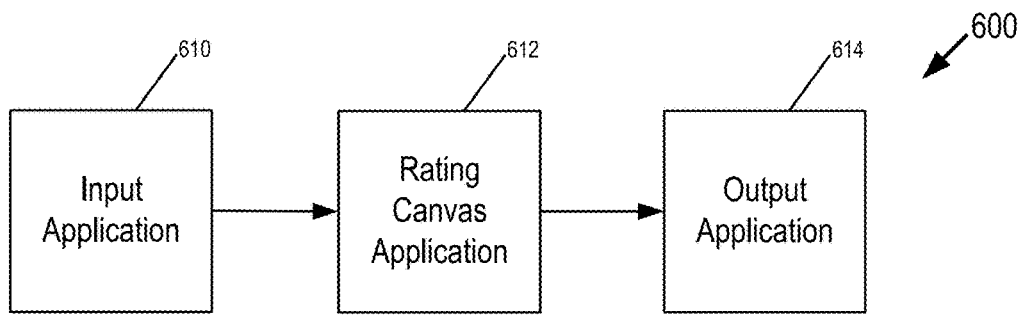
FIGS. 6A-C illustrate different block diagrams of the rating canvas application integrated with one or more other applications.
Figure 6B:
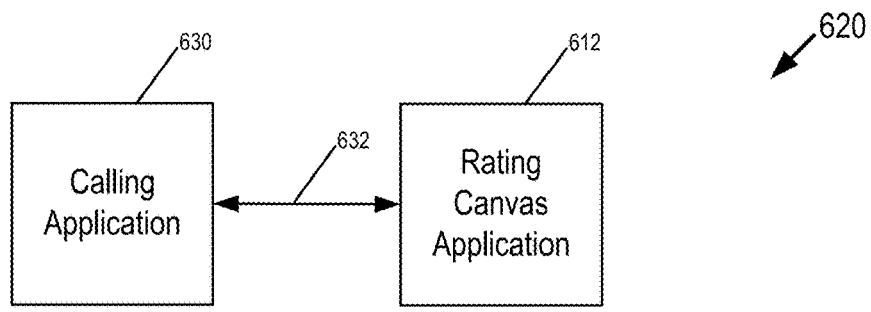
Figure 6C:
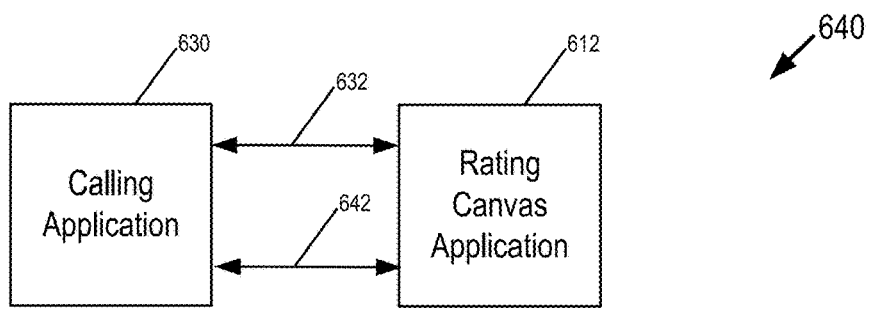

FIGS. 4A-C are illustrations 400, 420, 440 of a display for a third participant (different from the first participant and second participant), including FIG. 4A of a display showing placement of icons $A_3$ 410, $B_3$ 412, $C_3$ 414 by the third participant, FIG. 4B of a display showing numeric interpretations of the placement of icons $A_3$ 410, $B_3$ 412, $C_3$ 414 by the third participant (see $A_3$=9.0 for icon 410; $B_3$=9.5 for icon 412; $C_3$=2.5 for icon 414), and FIG. 4C of a display showing re-centering of the icons $A_3$ 410, $B_3$ 412, $C_3$ 414 previously placed by the third participant (see $A_3$=8.0 for icon 410; $B_3$=8.5 for icon 412; $C_3$=1.5 for icon 414). In this regard, FIGS. 6A-C show a third participant whose judgements differ than the first and second participants from FIGS. 2A-C and 3A-C.

Figure 9:
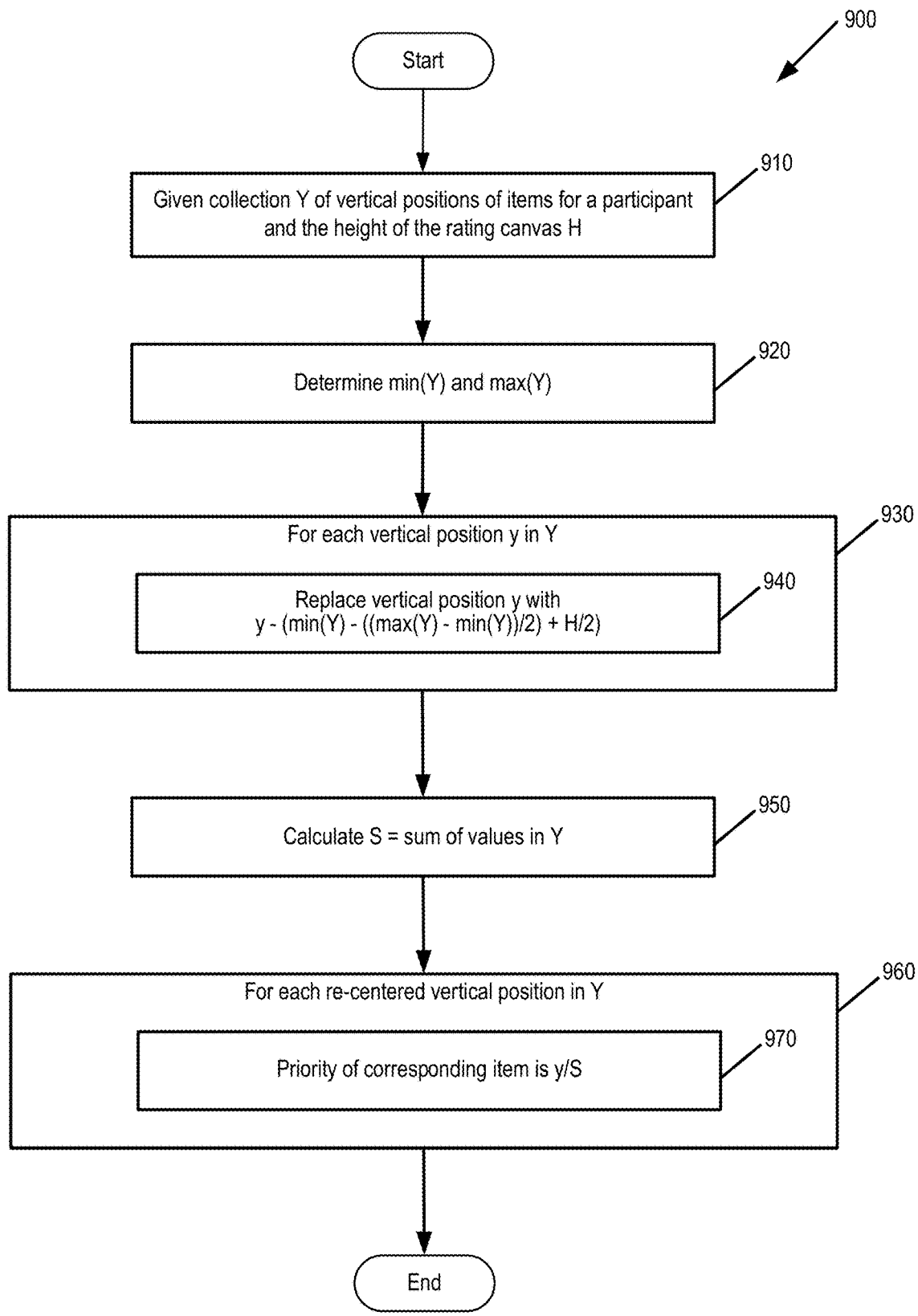
FIG. 9 is a flow diagram describing the conversion of participant positioning of items on the rating canvas to priorities.

The prioritization may be represented in one of several ways. In one or some embodiments, prioritization may be represented as percentages (e.g., each participant's re-centered vertical positions (as indicated by the recentered icons on the rating canvas 110) are normalized to yield percentages). That is, if Y represents the re-centered vertical positions of a particular participant, then the priority of each item in Y is the vertical position of the icon associated with the item divided by the sum of all the vertical positions in Y. FIG. 9, discussed below, is an example summary of the process of converting participant positioning of items to priorities suitable for display and analysis.

In one or some embodiments, the aggregate priorities for a set of items that were prioritized by multiple participants comprises the arithmetic mean of each item's priority. Because the numeric ratings are re-centered (see FIGS. 2C, 3C, 4C), participant ratings are not distorted based on what portion of the rating canvas was used.

Figure 4D:
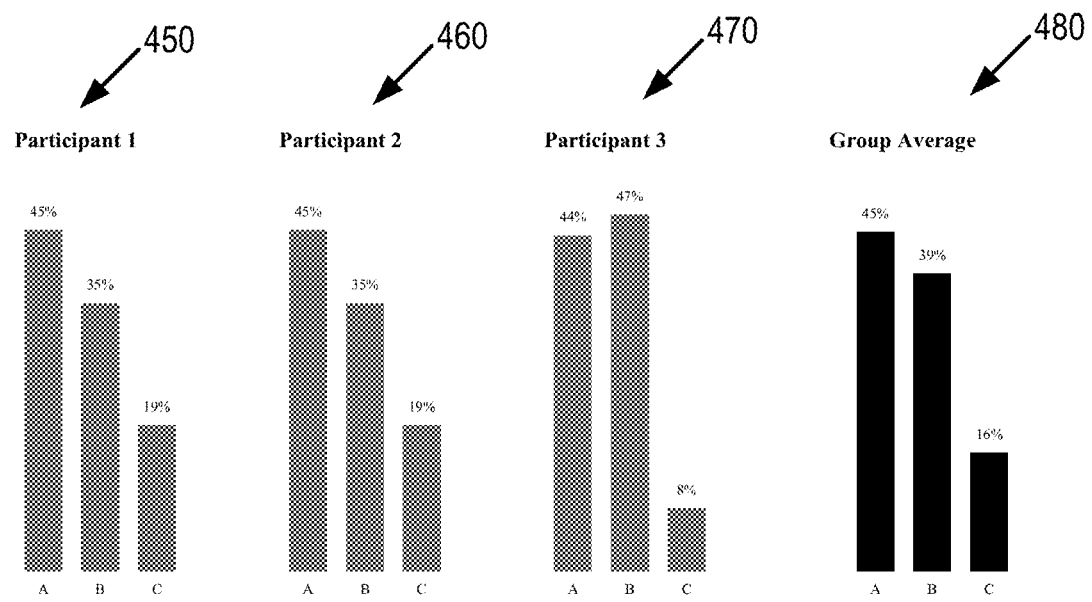
FIG. 4D is an illustration of a display summarizing the prioritization results based on an analysis of the inputs of the first, second, and third participants as shown in FIGS. 2A-C, 3A-C, and 4A-C, and an aggregation of the first, second, and third participants' priorities.

Further, as discussed above, the methodology may generate an output based on the analysis and/or sending the analysis to another application for further use. As one example, the output may comprise displaying individual and aggregated priorities in a chart, such as illustrated in FIG. 4D. Specifically, FIG. 4D is an illustration of a display summarizing the prioritization results based on an analysis of the inputs of the first participant 450, second participant 460, and third participant 470 as shown in FIGS. 2A-C, 3A-C, and 4A-C, respectively and an aggregation 480 of the first, second, and third participants' priorities.

In one or some embodiments, the criteria may be organized in a hierarchy, such as a multi-tier hierarchy. This is illustrated in FIG. 5A as table 500, shown as a three-tier hierarchy. As shown, the highest tier comprises "Performance", with the second-highest tier including: "Mainline operations"; "Maintainability"; "Construction impacts"; "Local operations"; "Environmental impacts"; "Active transportation"; and "Equity & Inclusion". Example third-tier includes "West-Side impacts" and "East-Side impacts" under "Local operations", and "Groundwater contamination", "Noise pollution", "Habitat loss", and "Air pollution" under "Environmental impacts".

Figure 5B:
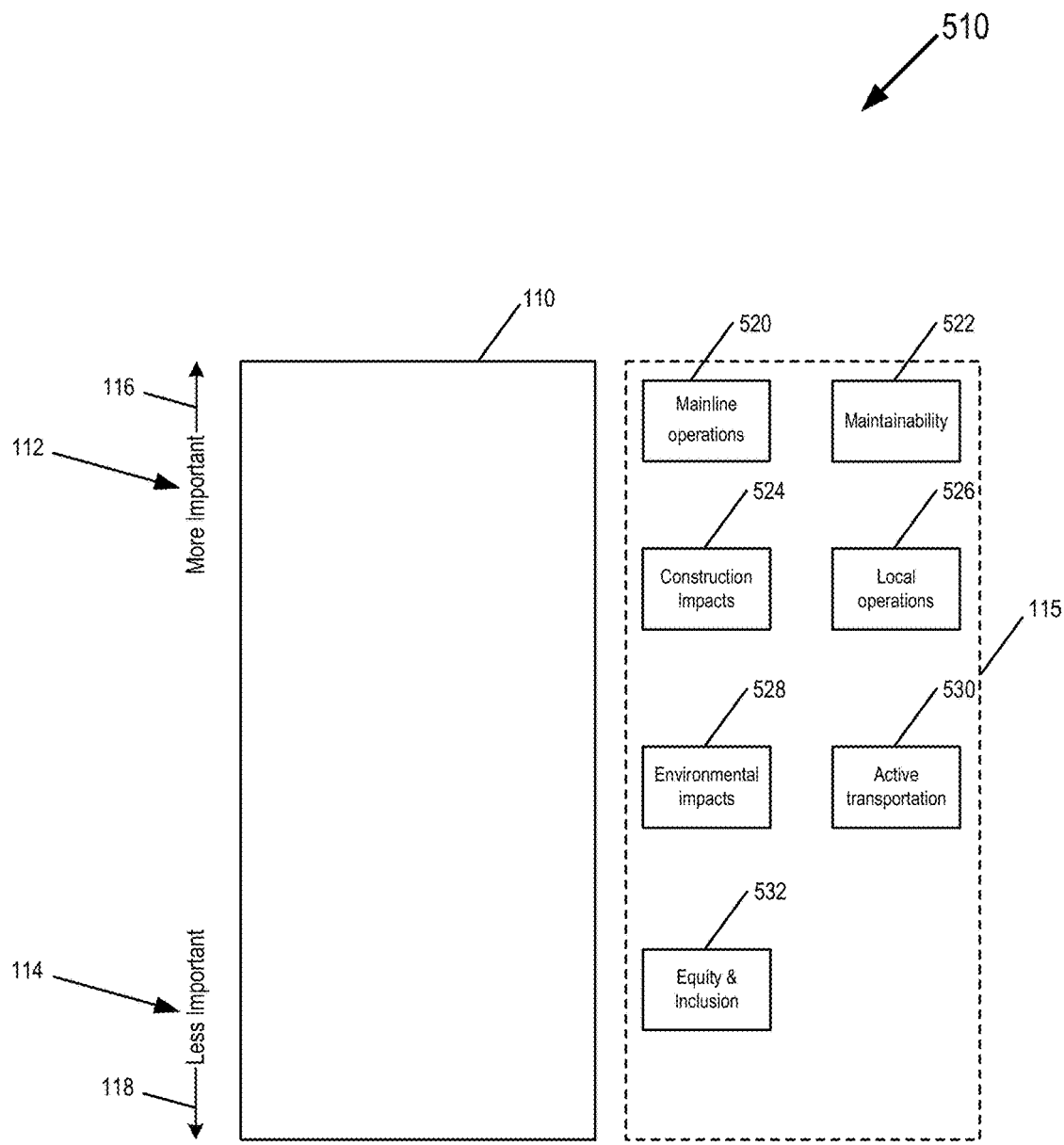
FIG. 5B is an illustration of an example of prioritizing criteria in the second tier of the hierarchy using the rating canvas with 1-axis rating and using a staging area that includes each of the plurality of icons associated with each of the criteria in the second tier of the hierarchy.
Figure 5C:
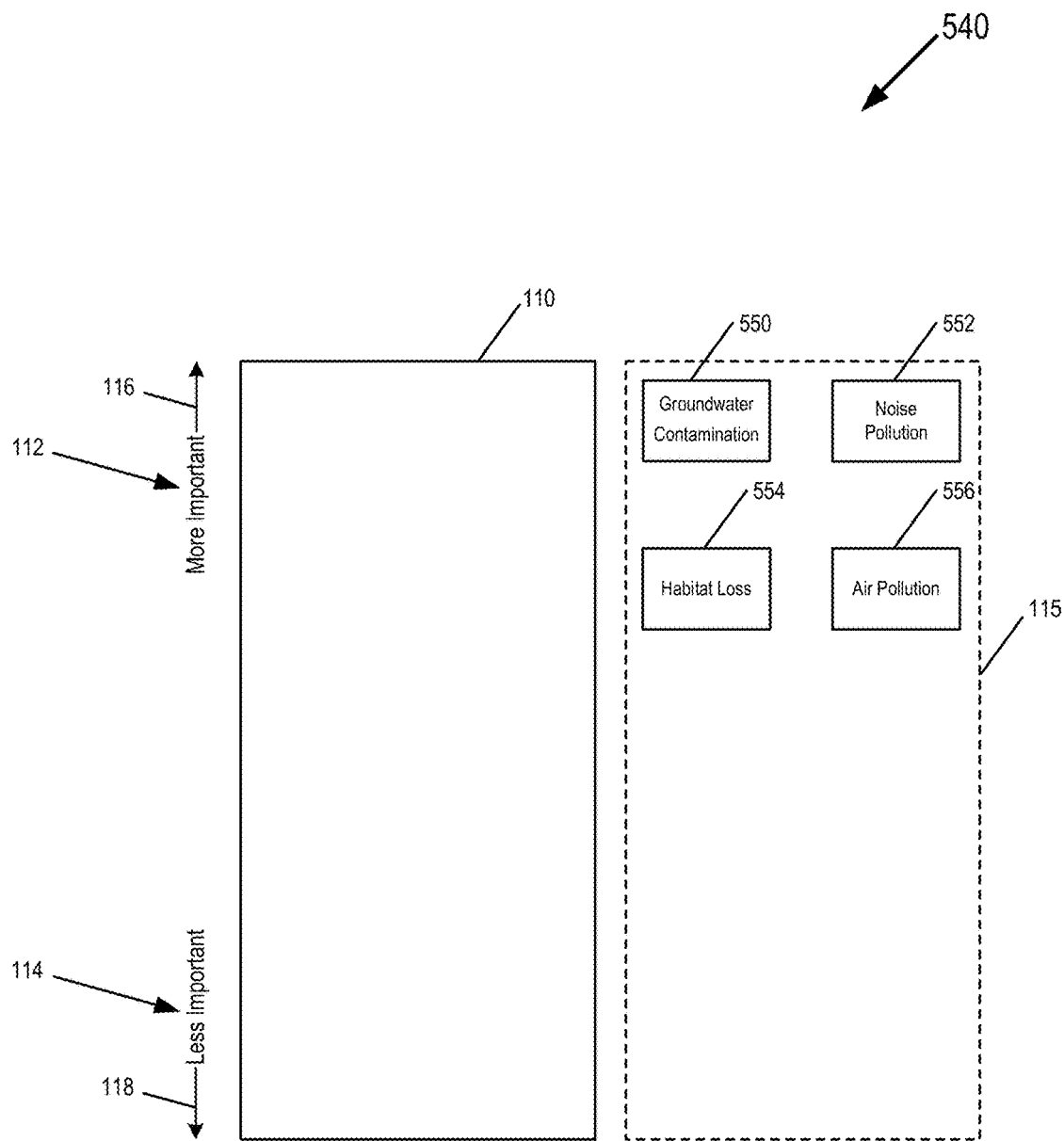
FIG. 5C is an illustration of an example of prioritizing criteria in the third tier of the hierarchy using the rating canvas with 1-axis rating and using a staging area that includes each of the plurality of icons associated with each of the criteria in the third tier of the hierarchy.

The rating canvas 110 may be used to prioritize the criteria in the multi-tier hierarchy. For example, FIG. 5B is an illustration 510 of an example of prioritizing criteria in the second tier of the hierarchy using the rating canvas 110 with 1-axis rating and using a staging area 115 that includes each of the plurality of icons associated with each of the criteria in the second tier of the hierarchy (see icons 520, 522, 524, 526, 528, 530, 532, respectively, for "Mainline operations"; "Maintainability"; "Construction impacts"; "Local operations"; "Environmental impacts"; "Active transportation"; and "Equity & Inclusion"). FIG. 5C is an illustration 540 of an example of prioritizing criteria in the third tier associated with "Environmental impacts" using the rating canvas 110 with 1-axis rating and using a staging area 115 that includes each of the plurality of icons associated with each of the criteria in the third tier of the hierarchy (see icons 550, 552, 554, 556, respectively, for "Groundwater contamination", "Noise pollution", "Habitat loss", and "Air pollution"). It is noted that FIG. 5C is merely one example of the third tier hierarchy and other examples of third tiers, including other third tier criteria or other combinations of third tier criteria, are contemplated.

In practice, one, some or all criteria in a higher tier may be prioritized, such as the second tier as illustrated in FIG. 5B, prior to prioritizing a lower tier, such as the third tier as illustrated in FIG. 5C. Alternatively, one, some or all criteria in a lower tier may be prioritized, such as the third tier as illustrated in FIG. 5C, prior to prioritizing a higher tier, such as the second tier as illustrated in FIG. 5B. In either instance, the prioritization of the higher tier may be imputed to the lower tier. By way of example, the criterion "Environmental impacts" may be assigned a priority (amongst the 5 criteria in the second tier) of 40%. Further, by way of example, "Groundwater contamination", "Noise pollution", "Habitat loss", and "Air pollution" may be assigned priorities, respectively, of 15%, 25%, 40%, and 20%. Given that "Environmental impacts" are assigned 40%, the sub-criteria may likewise be assigned a percentage portion thereof (e.g., "Noise pollution" may be assigned 25% of the 40% to be 10% of the overall priority). In this way, the hierarchical nature of the criteria may form the context in which to prioritize the criteria within the hierarchy. Further, separate from the ability to change the criteria (thereby affecting the outcome, as discussed herein, without necessitating re-rating the items against the criteria), the hierarchy of the criteria may likewise be modified without necessitating re-rating the items against the criteria.

FIGS. 6A-C illustrate different block diagrams 600, 620, 640 of the rating canvas application integrated with one or more other applications, such as one or more calling applications. As discussed above, the rating canvas application 612 may be integrated in a variety of contexts. For example, FIG. 6A illustrates a sequential process in which an input application 610, which is an example of a calling application and provides input to the rating canvas application 612. Alternatively, the calling application 630 may call the rating canvas application 612, with the rating canvas application 612 returning its results, such as illustrated in FIG. 6B (with the communication back-and-forth indicated by arrow 632). Still alternatively, the calling application 630 may iteratively call the rating canvas application 612 (with the communication back-and-forth for each iteration indicated by arrows 632, 642). As discussed above, the rating canvas application may be used iteratively for any one, any combination, or all of: (1) enumerating criterion/criteria; (2) prioritizing the criteria; or (3) determining items for inputting user preference. As such, the rating canvas application 612 may be iteratively called in order to perform the various tasks.

The input may comprise any one, any combination, or all of: enumerating criterion/criteria subject to prioritizing; prioritizing the criteria (to the extent that the criteria are prioritized); or determining the items for inputting user preference. As discussed above, the rating canvas may be used as part of the rating canvas application in order to perform various functions. By way of example, the rating canvas application may determine the criteria to use, such as: (i) the criteria being predefined; (ii) the criteria being supplied by the calling application and acknowledged or confirmed by the rating canvas application as the criteria;

(iii) the rating canvas application providing the user interface (which in one embodiment may be the rating canvas later used for rating) in order for the user to select the criteria; or (iv) the rating canvas performing an automatic analysis, such as based on the history of the specific person or the history of similar people to determine the relevant criteria. In this regard, the rating canvas application may perform multiple functions described herein, such as selecting criteria, prioritizing criteria, or rating items. Alternatively, separate applications may perform different functions (e.g., the calling application may define the criteria and the rating canvas application may prioritize the criteria). Still alternatively, more than one application may perform the same function (e.g., both the calling application and the rating canvas application may define the criteria).

After the user inputs the user input indicative of user preference, the rating canvas application 612 may analyze the user input indicative of user preference and generate an output for transmission to the output application 614. The output generated by the rating canvas application may take one or more forms, including an output similar to FIG. 4D and/or a graphic indicative of the analysis of the user input. In one or some embodiments, the output application 614 may use the output in one or more ways including one or both of providing the output on a display or the like (e.g., outputting on a display the information in FIG. 4D) or using the output for further analysis.

Figure 6D:
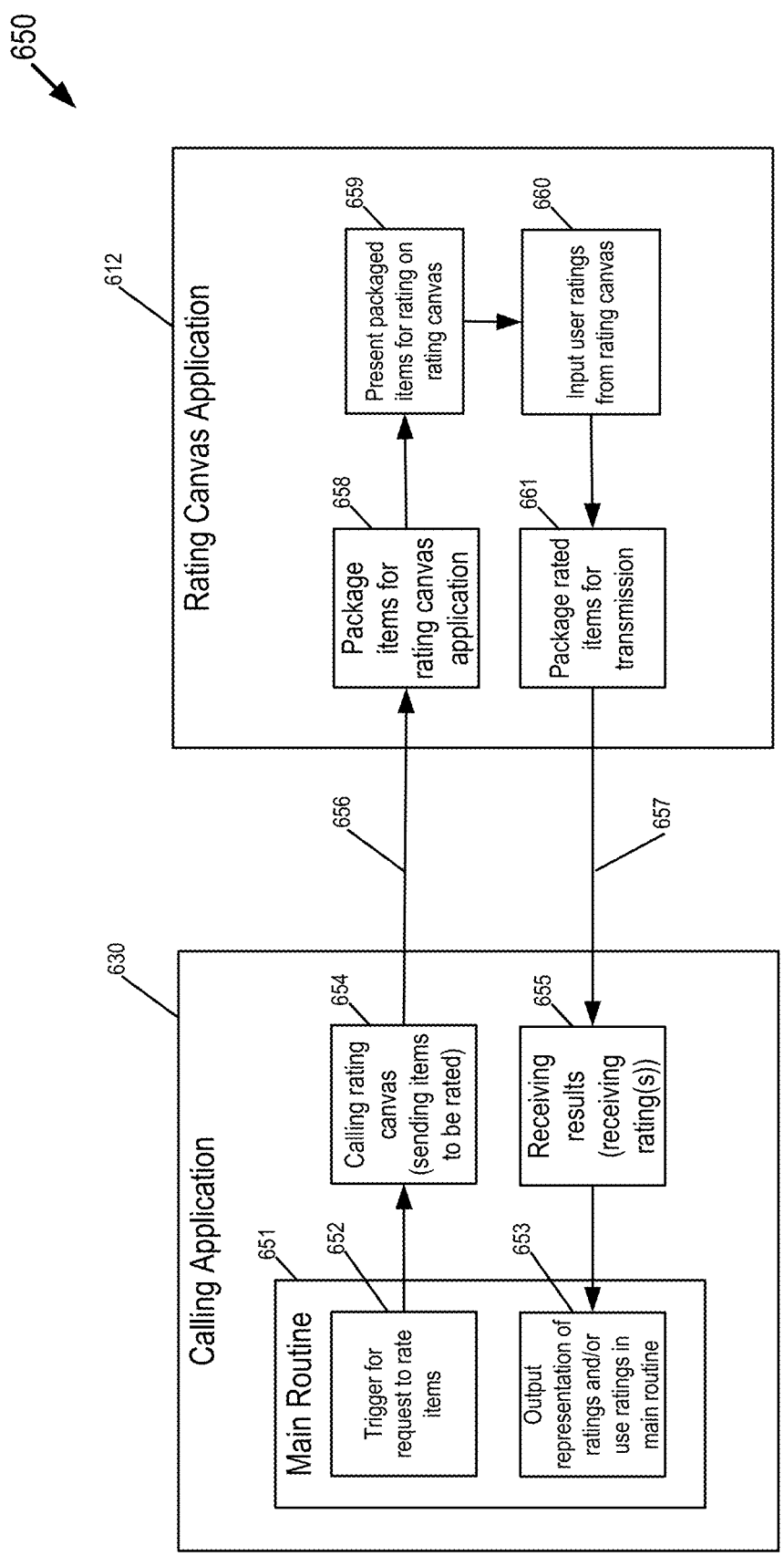
FIG. 6D is a first example block diagram expanding on the calling application 630 and the rating canvas application illustrated in FIG. 6B or FIG. 6C.

As discussed above, various calling applications are contemplated, including a calling application in a back-and-forth process. See FIGS. 6B-C. Further, as discussed above, the calling application may use the rating canvas for any one, any combination, or all of selecting the criteria; prioritizing the criteria; or prioritizing the items. FIG. 6D is a first example block diagram 650 expanding on the calling application 630 and the rating canvas application 612 illustrated in FIG. 6B or FIG. 6C.

As discussed above, the calling application 630 may call the rating canvas application 612 one or more times. As one example, the calling application 630 may call the rating canvas application 612 in order to input user priorities for a plurality of items. This is illustrated in FIG. 6D, in which calling application 630 includes a main routine 651 (which includes trigger for request to rate items 652 and output of representation and/or use ratings in main routine 653), calling rating canvas 654 and receiving results 655. As shown in FIG. 6D, rating canvas application 612 includes package items for rating canvas application 658, present packaged items for rating on rating canvas 659, input user ratings from rating canvas 660 and package rated items for transmission 661.

In practice, rating items may be responsive to detecting one or more triggers. See trigger for request to rate items 652. In one or some embodiments, the trigger may be entirely automatic, may be at least partly based on user input, or may be entirely based on user input. As one example, in one or some embodiments, the user may perform an action, such as executing a search that generates a list of items or executing an evaluation of a project. In any instance, the trigger results in calling the rating canvas (see 654), with the call via communication 656. The rating canvas application 612 receives the call from the calling application 630 and packages the items for the rating canvas application (see 658). Various ways of packaging the items are contemplated. In one way, the items may be packaged by generating icons associated with each of the items for rating (e.g., prioritizing). Other ways of packaging the items for the rating canvas are contemplated. After which, the packaged items are presented on the rating canvas for rating. Again, there are various ways in which to present the packaged items for rating on the rating canvas. See 659. In one way, the packaged items (e.g., the icons) may be presented in a staging area (e.g., one-by-one, some at a time, or all at once). In another way, the packaged items may be presented within the electronically-presented space of the rating canvas (e.g., within 110). After which, the user inputs the ratings via the rating canvas. See 660. As discussed above, there are various ways in which a user may input the ratings. After which, the rated items may be packaged for transmission (see 661) via 657 and use by the calling application. After which, the calling application receives the results (see 655) and uses the results (e.g., outputting or using the user ratings at 653).

In one or some embodiments, separate steps of selecting the items for rating and rating the items are performed. In particular, the selection of the items to rate and the rating of the selected items are two separate and distinct processes. In a first embodiment, the rating canvas is not used to perform the selection of the items but is used to rate the selected items. By way of example, the user may be presented with a list of potential items and may tag items (such as by clicking on specific items) to indicate selection of particular items within the list of potential items. Specifically, the list of potential items may comprise, for example, a list of refrigerators that resulted from a search performed, with the user clicking on specific refrigerators within the list refrigerators. In turn, respective icons may be generated for each of the specific refrigerators that the user clicked on, and output for the user to place the respective icons on the rating canvas.

Alternatively, a single step may be performed to both select the items for rating and rating the items. Again using the refrigerator example, a list of refrigerators that resulted from the search performed may be output on the screen, with each refrigerator in the list having an associated icon. The user may select (such as click on) a respective icon within the list of refrigerators in order to drag and place the respective icon onto the rating canvas. In this way, the user may both select items to rate and rate the selected items. In a particular example, a search may generate 15 potential refrigerators to rate. The user may click-and-drag 5 icons (representing 5 specific refrigerators) to place them at respective positions on the rating canvas, with the respective positions indicating the rating.

In one or some embodiments, the calling application 630 may call the rating canvas application 612 multiple times, as discussed above. As one example, the calling application 630 may call the rating canvas application 612 in order to prioritize the criteria and in order to input user ratings for a plurality of items. This is illustrated in FIG. 6E, in which calling application 630 includes a main routine 665 (which includes trigger requesting prioritizing criteria 666 and output representation of ratings for prioritizing criteria and/or user ratings in main routine 667 and includes trigger for request to rate items 652 and output of representation and/or use ratings in main routine 653 from FIG. 6D or 6E), calling rating canvas (sending criteria for prioritization) 668, receiving results for prioritizing criteria (receiving rating(s)) 669, as well as calling rating canvas 654 and receiving results 655 from FIG. 6D.

Figure 6E:
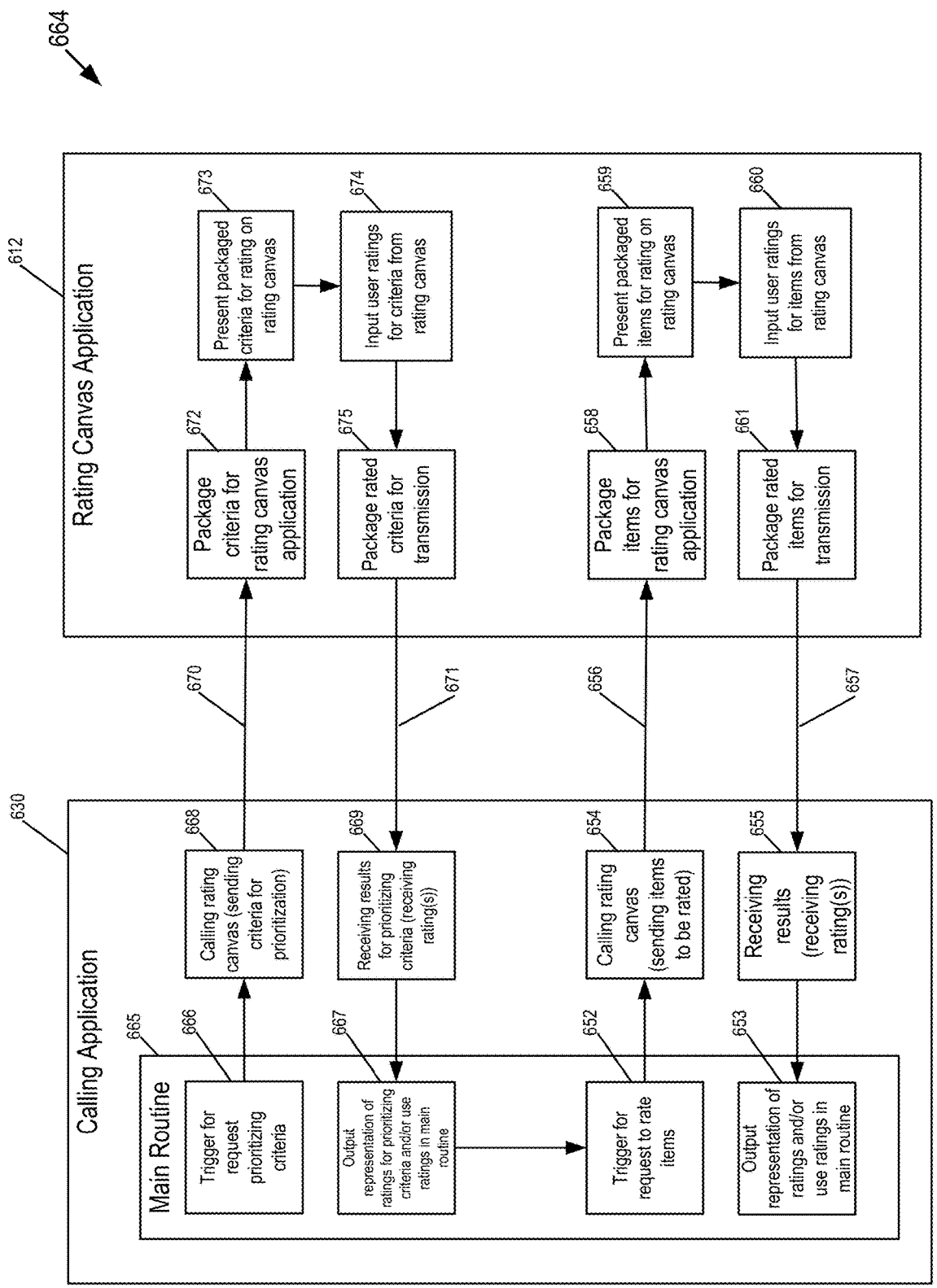
FIG. 6E is a second example block diagram expanding on the calling application and the rating canvas application illustrated in FIG. 6B or FIG. 6C.

As shown in FIG. 6E, rating canvas application 612 includes package criteria for rating canvas application 672, present packaged criteria for rating on rating canvas 673, input user ratings for criteria from rating canvas 674 and package rated criteria for transmission 675. Moreover, rating canvas application 612 may further include package items for rating canvas application 658, present packaged items for rating on rating canvas 659, input user ratings from rating canvas 660 and package rated items for transmission 661 from FIG. 6D.

In practice, one or more triggers may begin the process in trigger for request prioritizing criteria 666. In one or some embodiments, the trigger may be entirely automatic, may be at least partly based on user input, or may be entirely based on user input. As one example, in one or some embodiments, the user may perform an action, such as executing a search that generates a list of items or executing an evaluation of a project. In response, the system may determine whether prioritizing criteria is needed. If so, the system may trigger prioritizing criteria in 666. In any instance, the trigger results in calling the rating canvas (see 668), with the call via communication 670. The rating canvas application 612 receives the call from the calling application 630 and packages the criteria for the rating canvas application (see 672). Various ways of packaging the criteria are contemplated. In one way, the criteria, similar to the items, may be packaged by generating icons associated with each of the criteria for prioritizing. Other ways of packaging the criteria for the rating canvas are contemplated. After which, the packaged criteria are presented on the rating canvas for rating. Again, there are various ways in which to present the packaged criteria for rating on the rating canvas. See 673. In one way, the packaged criteria (e.g., the icons) may be presented in a staging area (e.g., one-by-one, some at a time, or all at once). In another way, the packaged criteria may be presented within the electronically-presented space of the rating canvas (e.g., within 110). After which, the user inputs the ratings via the rating canvas. See 674. As discussed above, there are various ways in which a user may input the ratings. After which, the prioritized rated criteria may be packaged for transmission (see 675) via 671 and use by the calling application. After which, the calling application receives the results (see 669) and uses the results (e.g., outputting or using the user ratings at 667).

Figure 6F:
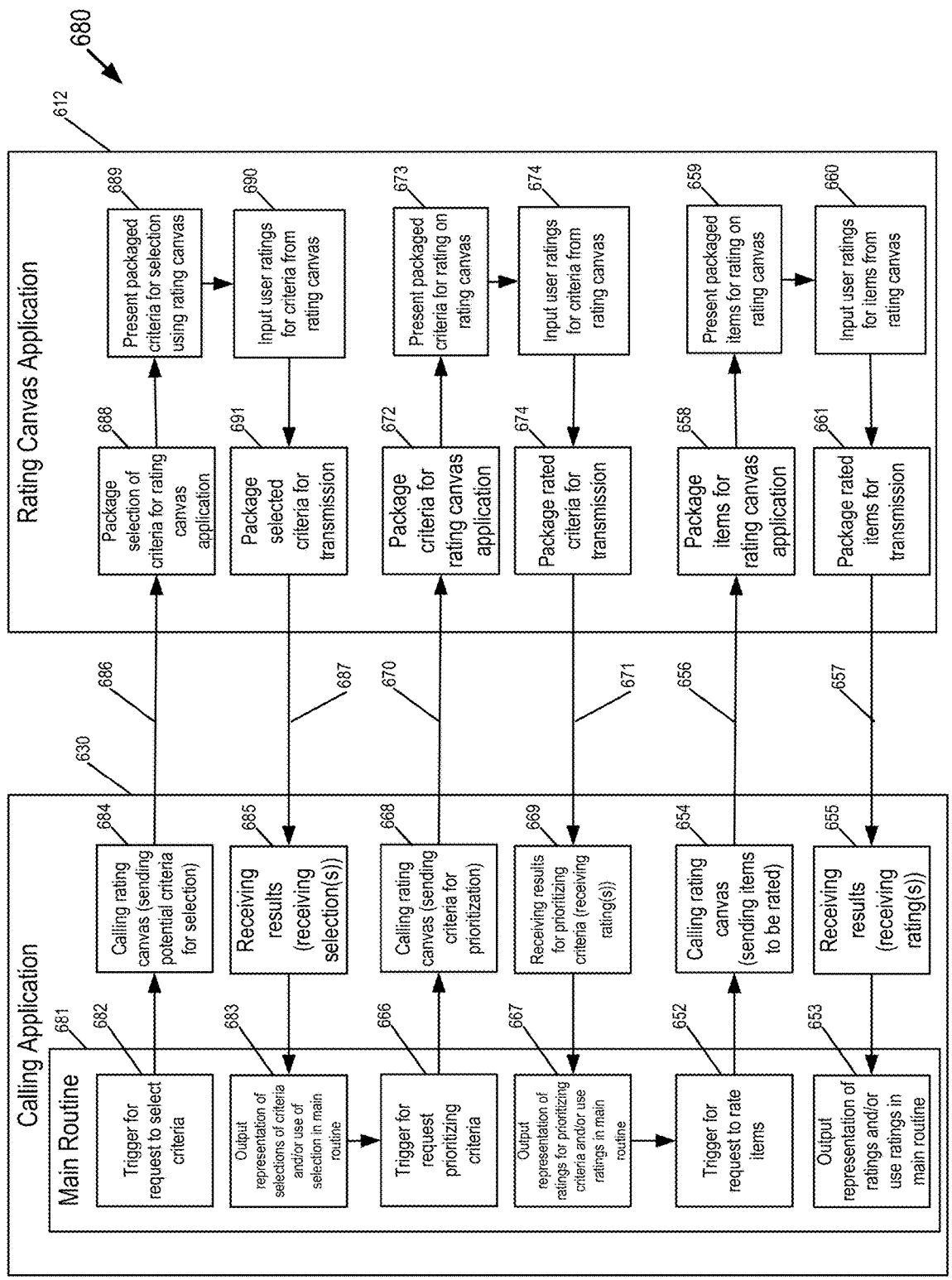
FIG. 6F is a third example block diagram expanding on the calling application 630 and the rating canvas application illustrated in FIG. 6B or FIG. 6C.

FIG. 6F is a third example block diagram 680 expanding on the calling application 630 and the rating canvas application 612 illustrated in FIG. 6B or FIG. 6C. As discussed above, the criteria used for ranking may be selected as well. In one or some embodiments, the rating canvas may be used for selecting the criterion/criteria, such as illustrated in FIG. 6F (separate from, or in addition to, prioritizing criteria and/or rating items). Calling application 630 includes a main routine 681 (which includes trigger for request to select criteria 682 and output of representation of selections of criteria and/or use of selection in main routine 683), calling rating canvas 684 (including sending potential criteria for selection) and receiving results 685 (including receiving selections of criterion/criteria). As shown in FIG. 6F, rating canvas application 612 include package selections of criteria for rating canvas application 688, present packaged criteria for rating on rating canvas 689, input user ratings from rating canvas 690 and package selected criteria for transmission 691.

In practice, one or more triggers may begin the process in trigger for request to select criteria 682. In one or some embodiments, the trigger may be entirely automatic, may be at least partly based on user input, or may be entirely based on user input. As one example, in one or some embodiments, the user may perform an action, such as executing a search that generates a list of items or executing an evaluation of a project. In response, the system may determine whether the criterion/criteria is predetermined. If not, the system may trigger the selection of the criteria. In any instance, the trigger results in calling the rating canvas (see 684), with the call via communication 686. The rating canvas application 612 receives the call from the calling application 630 and packages the potential criteria for the rating canvas application (see 688). Various ways of packaging the potential criteria are contemplated. In one way, the potential criteria may be packaged by generating icons associated with each of the potential criteria. Other ways of packaging the potential criteria for the rating canvas are contemplated. After which, the packaged potential criteria are presented on the rating canvas for rating. Again, there are various ways in which to present the packaged potential criteria for rating on the rating canvas. See 689. In one way, the packaged potential criteria (e.g., the icons) may be presented in a staging area (e.g., one-by-one, some at a time, or all at once). In another way, the packaged items may be presented within the electronically-presented space of the rating canvas (e.g., within 110). After which, the user inputs the ratings via the rating canvas. See 690. As discussed above, there are various ways in which a user may input the ratings. After which, the rated items may be packaged for transmission (see 691) via 687 and use by the calling application. After which, the calling application receives the results (see 685) and uses the results (e.g., outputting or using the user ratings at 683).

As shown in FIGS. 6E-F, the different processes, including the selection of the criteria and/or the prioritization of the criteria, may flow to the next process. For example, after block 683, main routine 681 may flow to 666. Thus, in one embodiment, the completion of the selection process for the criteria may trigger the process for prioritizing criteria. Alternatively, or in addition, after block 667, main routine 681 may flow to 652. Thus, in one embodiment, the completion of the prioritization of the criteria may trigger the process for rating items.

Further, though FIG. 6F illustrates separate processes to select criteria and to prioritize the criteria, a single process may both select criteria and prioritize the selected criteria (e.g., prioritization of criteria is included in selection of criteria). By way of example, the potential criteria for selection may be displayed on the screen (e.g., adjacent to the rating canvas or within the rating canvas). The user may select icons indicative of potential criteria to place them on the rating canvas, with the placement on the rating canvas indicating priority. In this regard, a single movement of placing an icon indicative of a particular criterion on the rating canvas may indicate both selection of the particular criterion (since the user selected the icon associated with the particular criterion) and the priority (since the user placement of the icon on the rating canvas indicates priority). In one particular example, in the event that the icons for five potential criteria are output on the screen, the user may position only icons for three of the five potential criteria in the rating canvas, indicating both selection and priority.

Figure 7A:
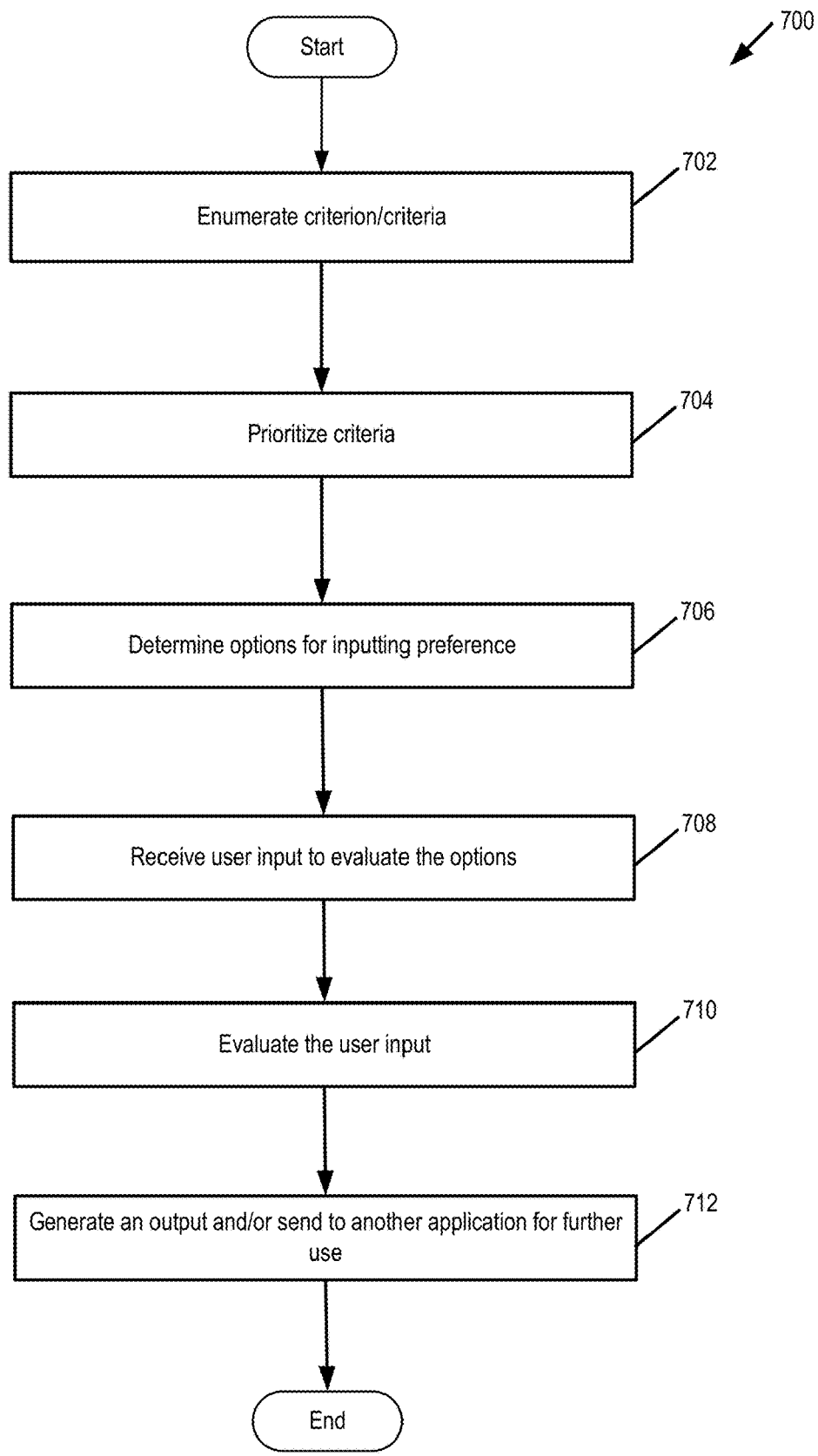
FIG. 7A is a first flow diagram of receiving and evaluating user input for determining user priorities.

FIG. 7A is a first flow diagram 700 of receiving and evaluating user input for determining user priorities. At 702, the criterion/criteria are enumerated. In one embodiment, the criteria are selected without user input. For example, the criterion/criteria may be predetermined and independent of the user and/or the specific items for ranking. Alternatively, the criterion/criteria may be dependent on one or both of the user or the items subject to ranking.

At 704, the criteria may be prioritized. Specifically, in one or some embodiments, the criteria may be prioritized, such as automatically or via user input (e.g., using the rating canvas). Alternatively, the criteria are not prioritized so that all criteria are weighted equally. At 706, the options are determined for inputting preference. As discussed above, example options include the items subject to inputting preference. Further, in one or some embodiments, the options may be generated automatically. Alternatively, the options may be generated based on user input (e.g., based on user search results). At 708, the system (such as the rating canvas) receives user input to evaluate the options. In one or some embodiments, the user input may comprise user positioning input, such as manipulating one or more icons in 2-D or in 3-D electronically-presented space.

At 710, the user input is evaluated. At 712, based on the evaluation, the results of the evaluation are output (e.g., see FIG. 4D) and/or used by another application. As discussed above, the evaluation of the user input may be performed in one of several ways. Merely by way of example, one technique for factoring outcome probabilities into recommendations is to use "expected value," which may comprise the value of an outcome multiplied by its probability.

Figure 7B:
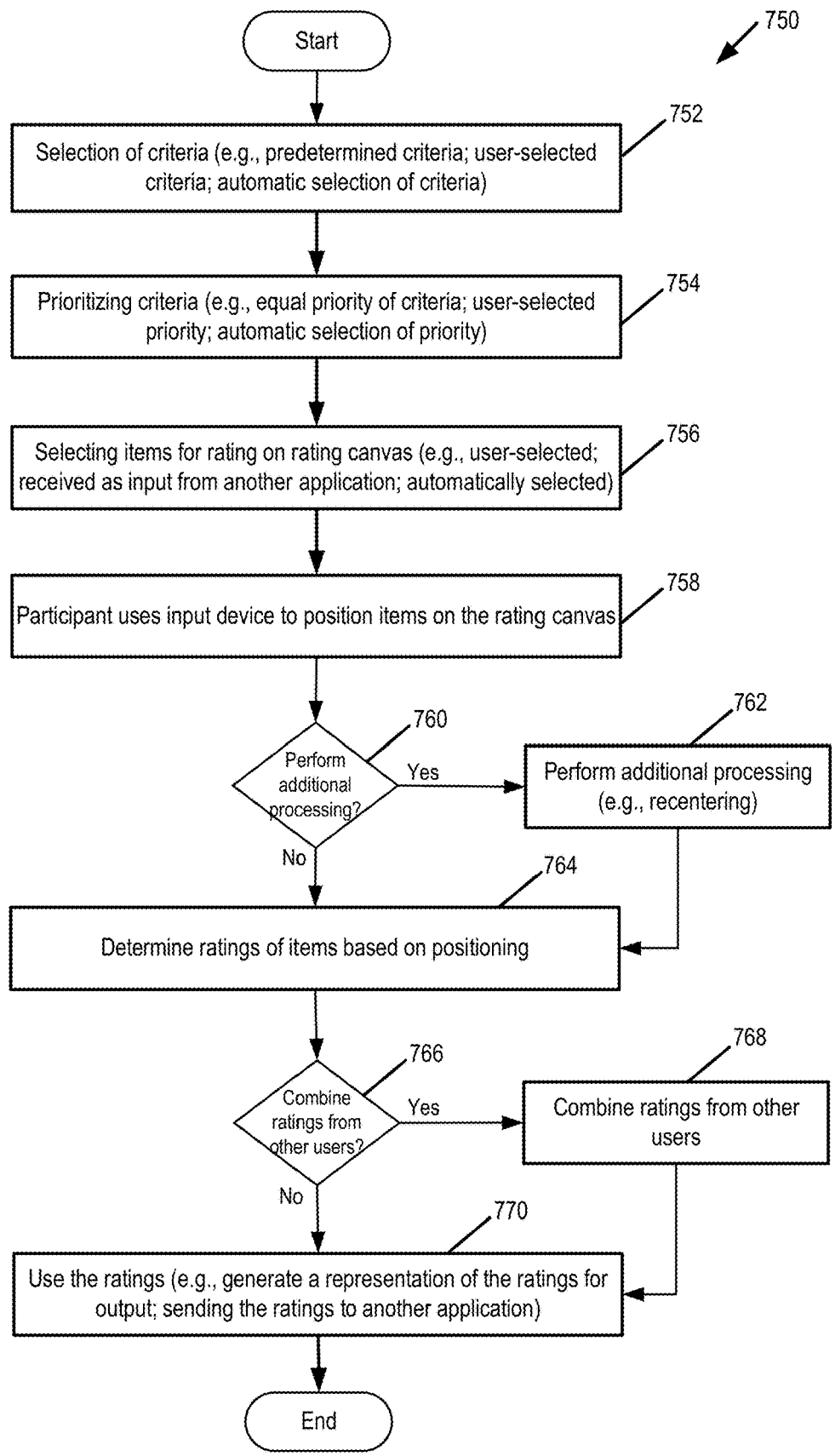
FIG. 7B is a second flow diagram of receiving and evaluating user input for determining user priorities.

FIG. 7B is a second flow diagram 750 of receiving and evaluating user input for determining user priorities. At 752, criterion/criteria are selected (e.g., predetermined criteria; user-selected criteria; automatic selection of criteria). At 754, criteria are prioritized (e.g., equal priority of criteria; user-selected priority; automatic selection of priority). At 756, the items are selected for rating on rating canvas (e.g., user-selected; received as input from another application; automatically selected). At 758, the participant(s) use an input device to provide input, such as position items on the rating canvas. At 760, it is determined whether to perform additional processing. If so, flow diagram 750 goes to 762 to perform additional processing (e.g., recentering). If not, flow diagram 750 goes directly to 764 to determine the ratings of the items based on the positioning.

As discussed above, various post-processing steps are contemplated, including one or both of: normalizing (e.g., recentering) or inferring user sentiment. Merely by way of example, user sentiment may be inferred in one of several ways including by analyzing one or more aspects of the user input including any one, any combination, or all of: the time it took for the user to place a respective icon; the speed at which the user placed the respective icon; whether the user adjusted the placement of the respective icon (e.g., the user initially placed the respective item on the rating canvas at an initial position and thereafter moved the respective icon from the initial position to another position); or the number of times the user adjusted the placement of the respective icon. In one or some embodiments, user sentiment may be used in post-processing, such as by making an inference regarding an underlying criterion. By way of example, an underlying criterion may comprise aesthetics. The user sentiment may be used to make an inference, such as a level of sureness, confidence, or conviction in the user's input associated with the aesthetics criterion, At 766, it is determined whether to combine the ratings with other users. If so, flow diagram 750 goes to 768 to combine ratings from other users. Optionally, the additional processing (e.g., 762) may be between 766 and 768. If not, flow diagram 750 goes directly to 770 to using the ratings (e.g., generate a representation of the ratings for output; sending the ratings to another application).

FIG. 8 is a third flow diagram 800 of receiving and evaluating user input for determining user priorities. At 810, all items (such as the icons for all items) are positioned in the staging area. At 820, the participant moves the item (such as the icon representing the item) from the staging area to the rating canvas. At 830, the priorities are recalculated based on the positioning. At 840, the system determines whether the participant is done positioning of the items. In one embodiment, the determination is based on explicit input from the user, such as clicking on "Done Rating" icon 132. Alternatively, the determination may be automatically performed, such as based on the system determining that all icons from the staging area have been placed in the rating canvas (and optionally that the position for the icons has not changed for at least a predetermined amount of time). If not, flow diagram 800 goes to 850 to determine whether participant is repositioning one or more items. If yes, flow diagram 800 goes to 860 where the participant repositions one or more items on the rating canvas. If not, flow diagram 800 goes back to 820. If the participant is done positioning the items, at 870, the final priorities are recorded.

FIG. 9 is a flow diagram 900 describing the conversion of participant positioning of items on the rating canvas to priorities. At 910, Given collection Y of vertical positions of items for a participant and the height of the rating canvas H. At 920, min(Y) and max(Y) are determined. At 930, for each vertical position y in Y, at 940, the vertical position y is replaced with: y−(min(Y)−((max(Y)−min(Y))/2)−H/2). At 950, S=sum of values in Y is calculated. At 960, for each re-centered vertical position in Y, at 970, the priority of corresponding item is y/S.

Figure 10:
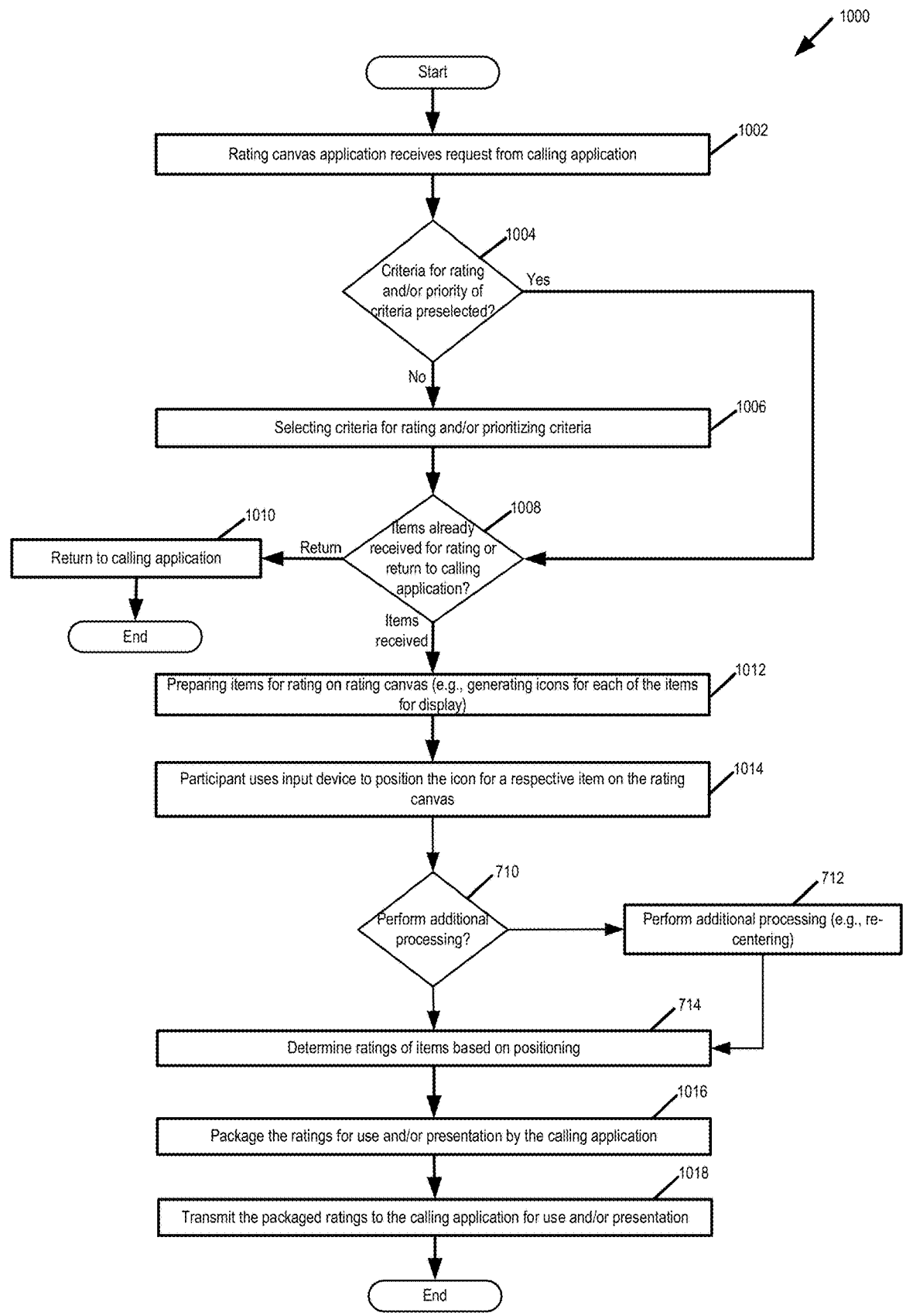
FIG. 10 is a flow diagram of the rating canvas integrated into a calling application.

FIG. 10 is a flow diagram 1000 of the rating canvas integrated into a calling application. At 1002, the rating canvas application receives a request from calling application. At 1004, it is determined whether the criterion/criteria for rating and/or the priority of the criterion/criteria are preselected. If not, flow diagram 1000 moves to 1006 to perform one or both of selecting criterion/criteria for rating and/or prioritizing criteria. If so, flow diagram 1000 moves to 1008 to determine whether the items have already been received for rating or to return to the calling application. If it is determined to return, flow diagram 1000 moves to 1010 to return to the calling application. If the items are received, flow diagram 1000 moves to 1012 to prepare items for rating on rating canvas (e.g., generating icons for each of the items for display). At 1014, the participant uses an input device to position the icon for a respective item on the rating canvas. Blocks 710, 712, and 714 are as previously described with regard to FIG. 7. At 1016, the ratings are packaged for use and/or for presentation by the calling application. At 1018, the packaged ratings are transmitted to the calling application for use and/or presentation. Alternatively, the rating canvas may use and/or present the ratings.

As discussed above, the rating canvas application may be integrated in a variety of ways. In one way, the rating canvas may be integrated into consumer purchases, such as shopping. Merely by way of example, a website vendor may wish to integrate the rating canvas when selling a specific product, such as refrigerators. The vendor may construct a list of potential criteria consumers might use when making such a purchasing decision. Example criteria may include any one, any combination, or all of: capacity; refrigerator/freezer orientation; "smart" features; ice/water dispenser; etc.

When the system determines that a user is deciding on whether to purchase a refrigerator (such as either through categorical navigation or search results), in one or some embodiments, the system may present the user with a rating canvas with the pre-established criteria (e.g., input into the application). The user may then position the icons associated with the criteria, which may result in a prioritization of those criteria (e.g., the processing of the application). Once that consumer prioritization profile is established, each refrigerator may be scored using that prioritization, and the list of results may be presented to the user in order of prioritization score, thereby representing an example output of the application.

In another way, the rating canvas may be integrated into consumer purchases, such as ratings and reviews. In one or some embodiments, rating and review websites may use the rating canvas to tailor recommendations to specific consumer priorities. In one or some embodiments, the methodology for ratings and reviews is similar to the consumer purchase example described above. One difference is that the reviewers (e.g., public reviewers or professional reviewers) may also use the rating canvas to rate specific options against the pre-established criteria (e.g., input into the application), thereby establishing criterion scores for options (e.g., the processing of the application), allowing specific options to be scored according to a user's criteria prioritization and presented in order of prioritization score (e.g., application output).

Still another application is for qualitative evaluation, such as human resource (HR) software for using the rating canvas to assist in making hiring decisions. In one or some embodiments, HR personnel may establish hiring criteria (e.g., experience, technical skills, soft skills, and education). Then, for each open position, the hiring manager may rate these criteria on the rating canvas (e.g., as application input), thereby establishing the criteria prioritization for that specific position (e.g., as application processing). HR personnel may then see a visual graph of the prioritization (as an example application output). For example, in an entry-level position, education or soft skills may be weighted much higher than experience, but a senior position might predominately weight experience.

Thereafter, the interviewers may use the rating canvas to rate each applicant against each criterion (application input), enabling each applicant to be scored according to the specific position's criteria prioritization (application processing). The hiring manager may then review each candidate along with their score, with the candidates ordered by score (application output).

Still another is project management (PM) for prioritizing projects and/or features. For example, a product manager may establish criteria for new features (e.g., any one, any combination, or all of: retain users; grow market share; reduce maintenance costs; enter new market). Responsive to a trigger of a predefined planning interval (e.g., 2 weeks, 3 years, etc.), the criteria may be prioritized on a rating canvas to account for current market conditions and strategic goals (application input). Each pending project or feature may then be rated on a rating canvas (application input), which may establish a score for each project/feature (application processing), allowing a prioritized list of project/features to be presented to the product manager (application output), who may then make informed decisions about which project/feature to pursue next. Thus, the rating canvas may contribute to the ability to re-prioritize criteria spontaneously (which may shuffle the overall plan), thereby assisting competitive businesses. Thus, in one or some embodiments, criteria may be selected/prioritized. Further, items may then be ranked using the selected/prioritized criteria. Thereafter, in the event that the prioritization of the criteria is changed in any way (e.g., revised criteria prioritization), re-rating of items against criteria need not occur. Merely by way of example, for a specific project, three criteria may be ranked in order of highest to lowest priority: cost; quality; recyclability. After which, items may be rated using the rating canvas (e.g., an expert may rate each item using the rating canvas). Thereafter, in the event that recyclability is given a higher priority (e.g., higher than quality), the items need not be rated again using the rating canvas (e.g., the expert need not rate each item again using the rating canvas). Rather, the rating canvas application may simply reinterpret the previously input ratings using the rating canvas with the revised priorities.

Though specific applications are provided above, in one or some embodiments, the rating canvas may be written as agnostic as to what type of decision is being considered. In one or some embodiments, the rating canvas may be used for any of the scenarios described above. Thus, in one embodiment, the rating canvas may be tailored to the specific applications. For example, with regard to the HR market, template criteria may be established for companies of different sizes and industries. In practice, the criteria may be established by providing the user with a wizard-like experience "making an HR decision?"->"what's the size of your company?"->"what industry are you in?"->"here are some suggested criteria that you can tailor to suit your needs."

Figure 11A:
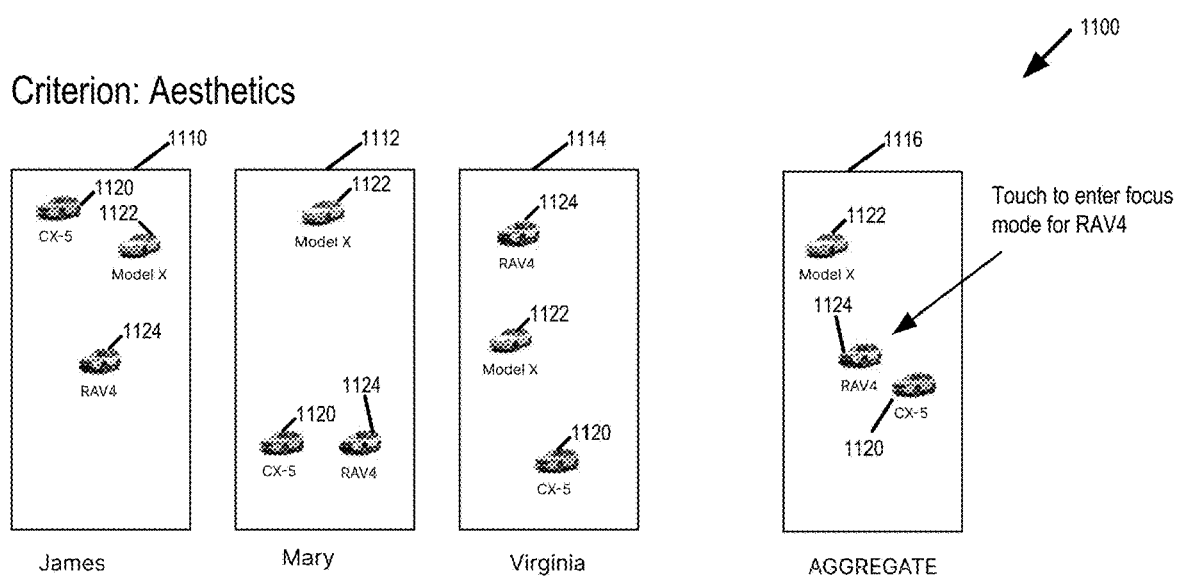
FIG. 11A are illustrations of displays from multiple participants in prioritizing multiple items for one criterion (aesthetics) and the aggregation.

Further, various outputs are contemplated. As one example, in one or some embodiments, a "focus mode" may comprise an example of results visualization. For example, when displaying results, it may be difficult to visually parse the way ratings are aggregated. "Focus Mode" may allow the user to focus on a single option. FIG. 11A are illustrations 1100 of displays 1110, 1112, 1114 from three participants in prioritizing multiple items of three mid-size SUVs (see icons 1120, 1122, 1124 associated with different SUVs) for one criterion (aesthetics) and the aggregation 1116. When a user touches on any of the options, the system may enter focus mode (see "Touch the icon associated with RAV4 to enter focus mode for RAV4" in FIG. 11A), resulting in illustrations of FIG. 11B.

Figure 11B:
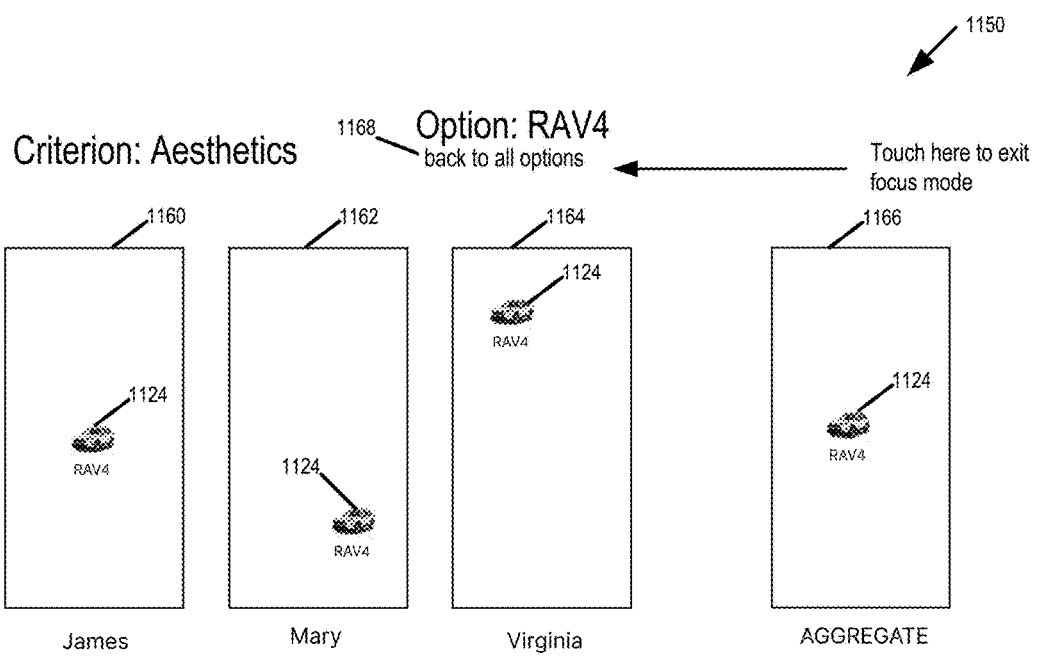
FIG. 11B are illustrations of displays from multiple participants in focusing on the prioritizing of one item (RAV4) for one criterion (aesthetics) and the aggregation.

In particular, FIG. 11B are illustrations 1150 of displays 1160, 1162, 1164 from three participants in focusing on the prioritizing of one item (RAV4) for one criterion (aesthetics) and the aggregation 1166. Exiting focus mode (element 1168) may likewise be achieved as illustrated in FIG. 11B.

Figures 12A, 12B:
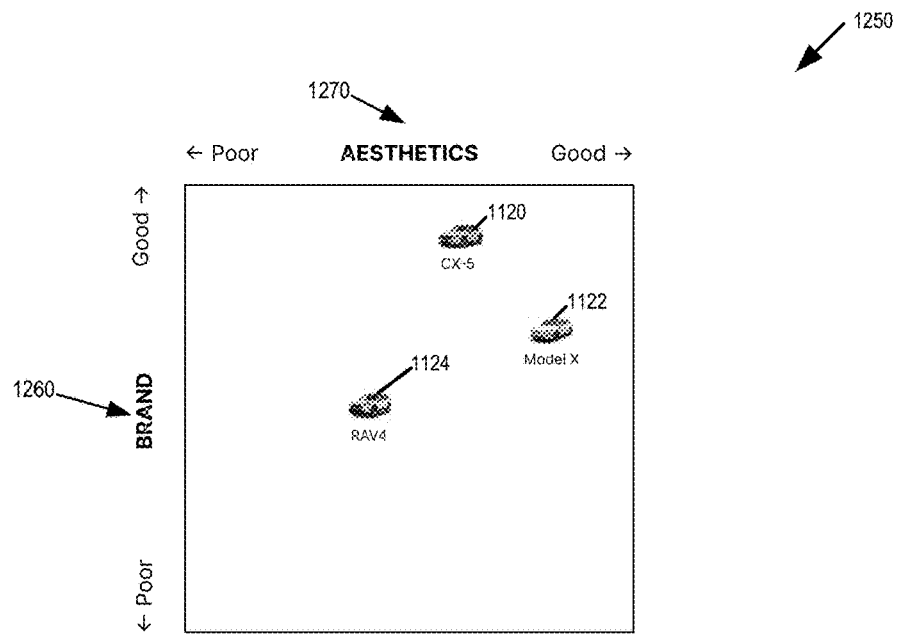
FIG. 12A is an illustration of a matrix of four criteria, with links within different cells of the matrix enabling a user to view an illustration of the aggregate results of two criteria.
FIG. 12B is an illustration of a display showing the aggregate results of two criteria, brand versus aesthetics, with the illustration resulting from the user clicking on the respective link in the matrix shown in FIG. 12A.

Another example output is a criterion pair as a results visualization. In one or some embodiments, one axis, such as the horizontal axis, on the rating canvas may only be used for the participant to arrange items. See FIGS. 1A-D. In this regard, the aggregate results of two criteria may be compared on a square grid. This is shown in FIG. 12A, is an illustration 1200 of a matrix of two criteria, with links within different cells of the matrix enabling a user to view an illustration of the aggregate results of two criteria. For example, for a car-buying decision, a matrix of comparisons may be used. FIG. 12A illustrates that one may compare brand versus aesthetics ratings by clicking on that shown, resulting in the illustration in FIG. 12B, which is a display showing the aggregate results of brand 1260 versus aesthetics 1270. In one or some embodiments, the matrix may be combined with focus mode. In particular, if a user clicks on an option, the user may be presented with square grids for all participants to see where that option fell on this comparison for each participant.

Figure 13A:
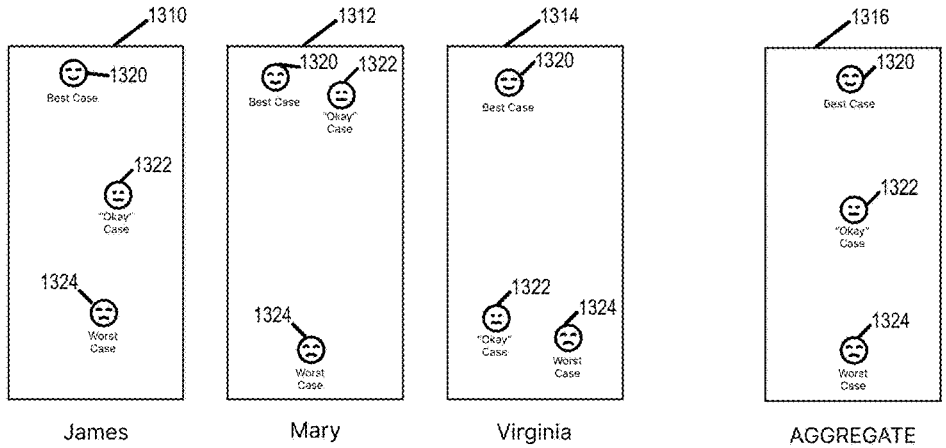
FIGS. 13A-D are illustrations regarding outcome-informed decisions, with FIG. 13A being an illustration of display of users' rating the impact of possible outcomes on the performance of a designated option and an aggregate of the users' ratings, with FIG. 13B being an illustration of display of users' rating the probability of the possible outcomes and an aggregate of the users' ratings, with FIG. 13C being a first example illustration, using criterion-pair visualization, of impact and probability together, and with FIG. 13D being a second example illustration, using criterion-pair visualization, of impact and probability together.

Still another example output is related to outcome-informed decisions. With outcome-informed decisions, participants may be asked to go a step further with each option and imagine the future outcomes of choosing that option. The participants may then be asked to rate the impact of that outcome on the performance of the option, and then the probability of that outcome happening. For example, consider a decision about opening a new retail location in Los Angeles. The "Best Case" would be that the economy remains strong, labor remains affordable, and the store does exceptionally well in Los Angeles. The worst case would be a suffering economy, skyrocketing labor forces, and the store is unpopular in Los Angeles. The "Okay Case" would be somewhere in the middle. Participants may then rate the impact of these possible outcomes on the performance of the option, such as illustrated in FIG. 13A, which is an illustration 1300 of displays 1310, 1312, 1314 of users' rating the impact of possible outcomes on the performance (best case 1320, "okay" case 1322, worst case 1324) of a designated option and an aggregate of the users' ratings 1316. In particular, FIG. 13A shows that Mary in 1312 thinks the best case and the "okay" case are both pretty good, whereas Virginia in 1314 sees the "okay" case almost as bad as the worst case. Further, the aggregate in 1316 outcome is fairly evenly distributed.

Figure 13B:
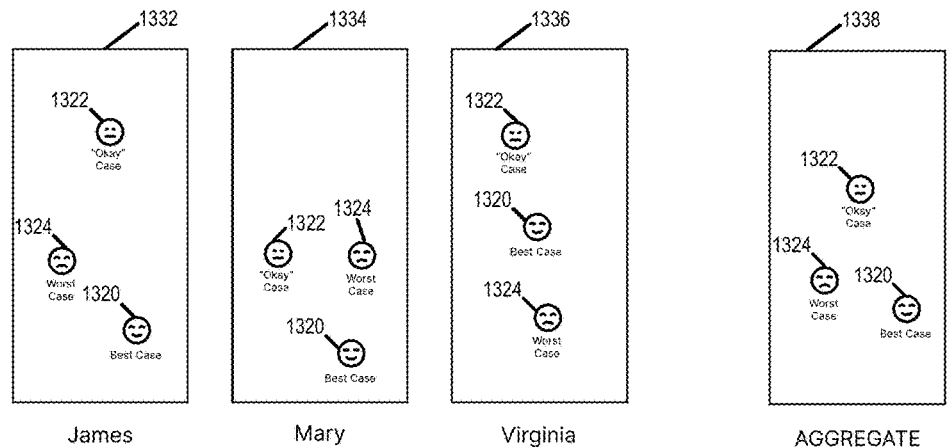

Then, the participants may estimate the probability of each of these outcomes, which is shown in FIG. 13B being an illustration 1330 of displays 1332, 1334, 1336 of users' rating the probability of the possible outcomes and an aggregate 1338 of the users' ratings. As shown in FIG. 13B, Mary in 1334 may be perceived as a pessimist, rating the "okay" and worst case as equally probable, with a very low probability for the best case. Virginia in 1336 may be perceived as the most optimistic here, rating the "okay" case and the best case as most likely.

Figure 13C:
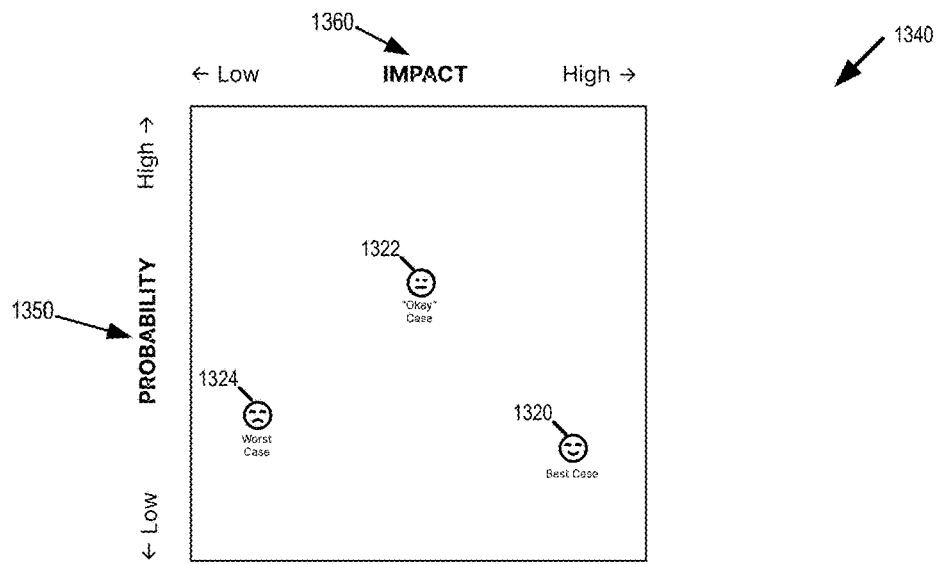
Figure 13D:
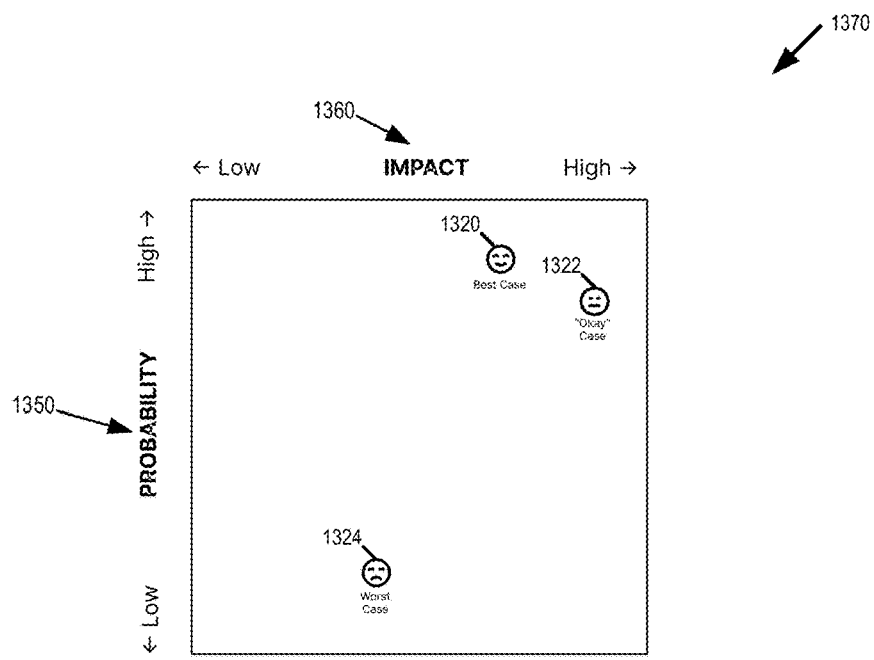

Further, criterion-pair visualization (see FIG. 12B) may be used, such as shown in FIG. 13C, which is an illustration 1340 visualizing impact 1360 and probability 1350 together. Reviewing FIG. 13C, this decision may carry a fair amount of risk. Specifically, the "okay" case is the most probable, but not by very much, and its impact is only moderate. Contrast with an obvious "go" decision, which is illustrated in FIG. 13D, including an illustration 1370 of impact 1360 and probability 1350 together. In one or some embodiments, the criterion-pair visualization may be combined with focus mode to better understand how people voted.

Figure 14A:
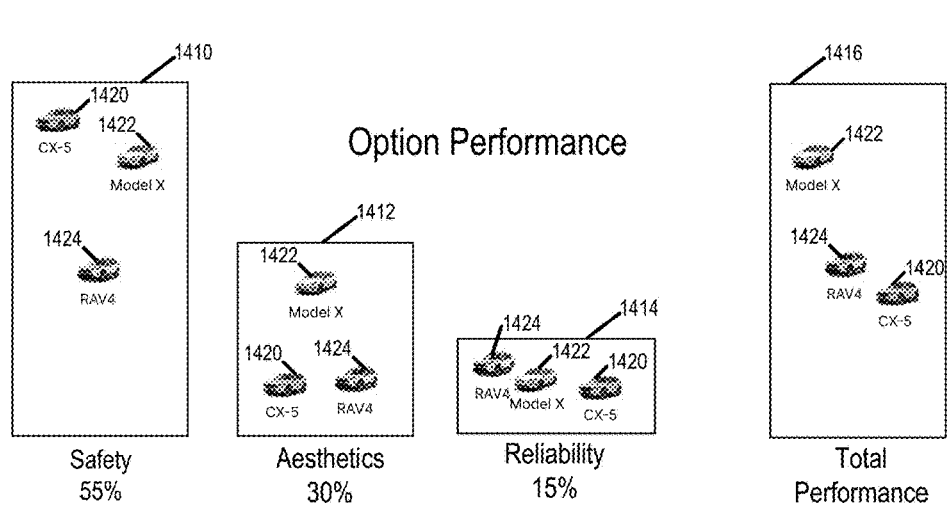
FIG. 14A is a first example illustration of weighted criteria for a single participant or multiple participants.

Yet another example output is weighted performance visualization. In one or some embodiments, participants may rate each option on a standard 0-10 scale for each criterion, but each criterion may be prioritized (e.g., weighted), so a rating of 10 in an important criterion will contribute more than a rating of 10 in an unimportant criterion (e.g., even low ratings may end up contributing more to performance than large rating based on criterion weighting). This may be visualized in the language of the rating canvas by scaling criteria rating canvases by their priority. For example, in the context of a car buying decision, safety may be the most important factor (e.g., 55%), followed by aesthetics (e.g., 30%), followed by reliability (e.g., 15%). This is shown in FIG. 14A, which includes an illustration 1400 of weighted criteria for safety 1410, aesthetics 1412, reliability 1414, and total performance 1416 for SUVs 1420, 1422, 1424. The visualization shown in FIG. 14A may be for a single participant or the aggregate of multiple participants. Further, in one or some embodiments, focus mode may also be used. Indeed, focus mode may be very beneficial in this instance because of how busy "short" criteria may get.

Figure 14B:
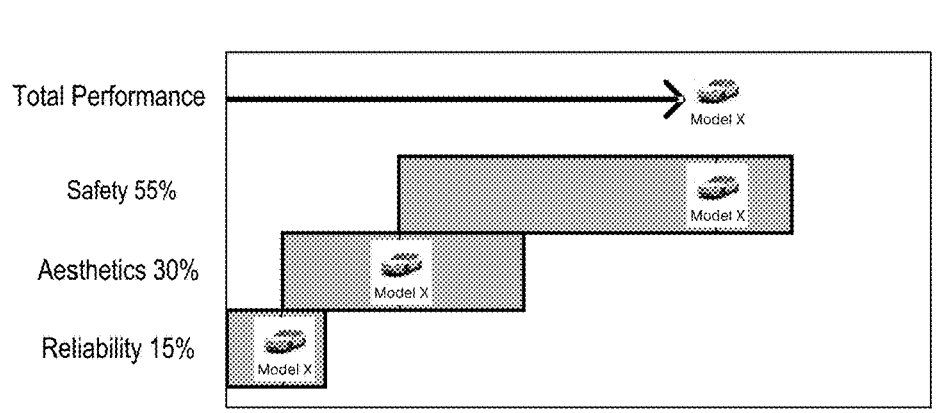
FIG. 14B is a second example illustration of weighted criteria for the example in FIG. 14A depicted as a staggered stacked bar. Each attribute is scaled to represent its weighted contribution, and offset to illustrate how each criterion contributes to performance.
Figure 14C:
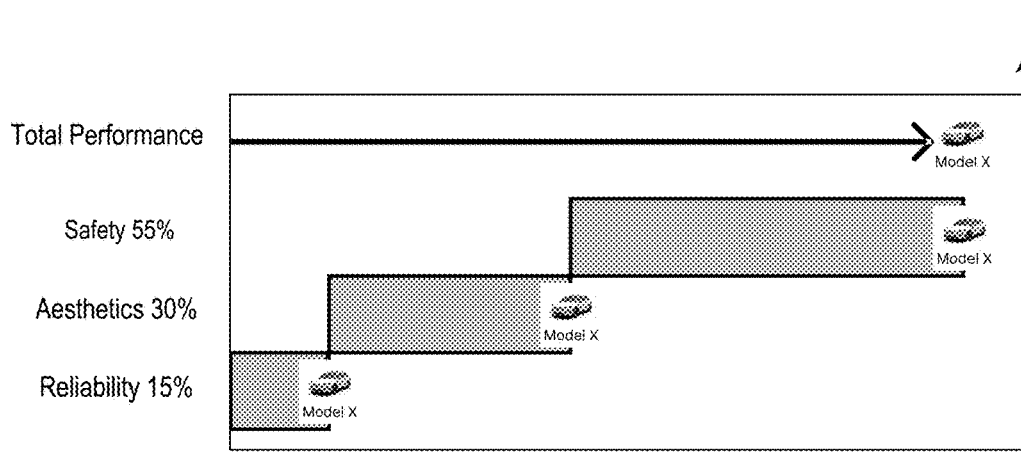
FIG. 14C is a third example illustration of weighted criteria for an example identical to FIG. 14A except all ratings for "Model X" are maximal, illustrating how maximal ratings create a staggered stacked bar that aligns with total performance.

In one or some embodiments, the output may comprise more stylized presentations, such as a "staggered stacked bar" that illustrates how each criterion additively contributes to performance, as well as the weighting of each criterion. This is shown in FIG. 14B, which is an illustration 1430 of weighted criteria for the example in FIG. 14A depicted as a staggered stacked bar, where the Safety, Aesthetics, and Reliability rating canvases have been turned on their side, scaled to represent their weighted contribution, and offset to illustrate how they contribute to performance. Illustration 1450 in FIG. 14C shows another example in which the ratings are maximal for each item, in which case the criterion bars may be stacked perfectly. Thus, FIG. 14B illustrates a typical example in which ratings are not maximal, causing the bars to be staggered. In the event all of the ratings are maximal (e.g., all 10s), the staggered bar may appear as depicted in FIG. 14C. In this regard, FIGS. 14B and 14C are the same type of visualization for different data.

Figure 15A:
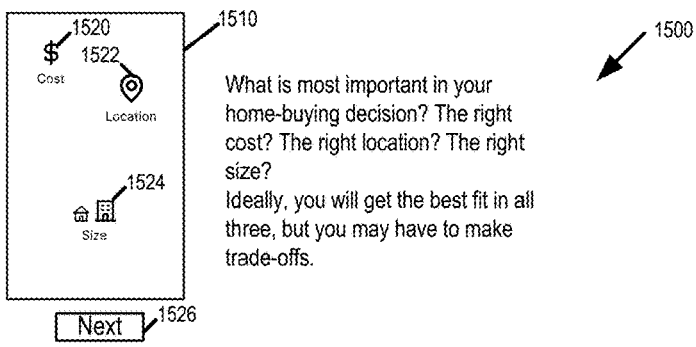
FIGS. 15A-C are illustrations related to home-buying decisions.
Figure 15B:
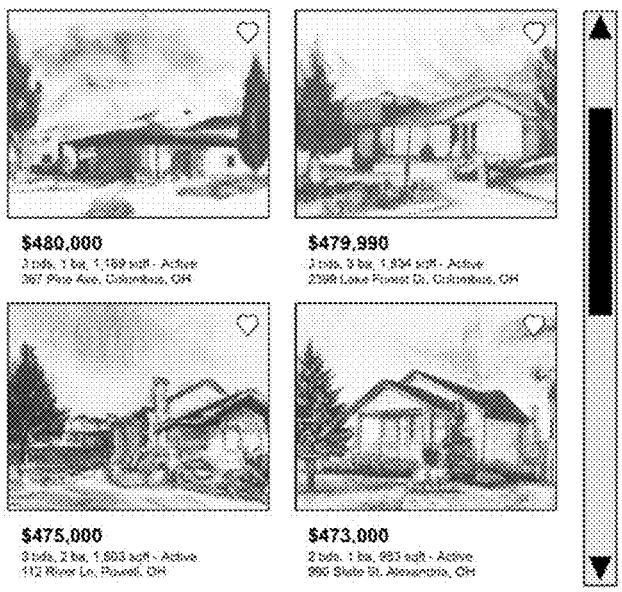
Figure 15C:
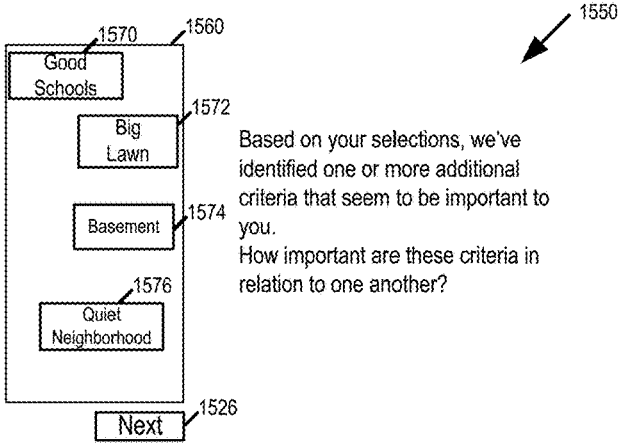

Further, in one or some embodiments, criteria prioritization may be integrated with option selection in order to refine the criteria. For example, in the context of a home-buying decision, the participant may be asked to prioritize some basic or universal criteria to start with. This is shown in the illustration 1500 in FIG. 15A, which may prioritize cost 1520, location 1522, and size 1524, with a "Next" button 1526 instructing the system to present a list of homes that are optimized to this criteria prioritization. See the illustration 1530 in FIG. 15B, where the participant may choose the homes they like. After the user has selected some number of homes they like, the choices may be analyzed for attributes they have in common, which may allow for a refinement of their criteria. This is illustrated in FIG. 15C, which is an illustration 1550 of a display 1560 identifying criteria, such as good schools 1570, big lawn 1572, basement 1574, and quiet neighborhood 1576. Thereafter, the results list may be further sorted based on these refined criteria.

Figure 16:
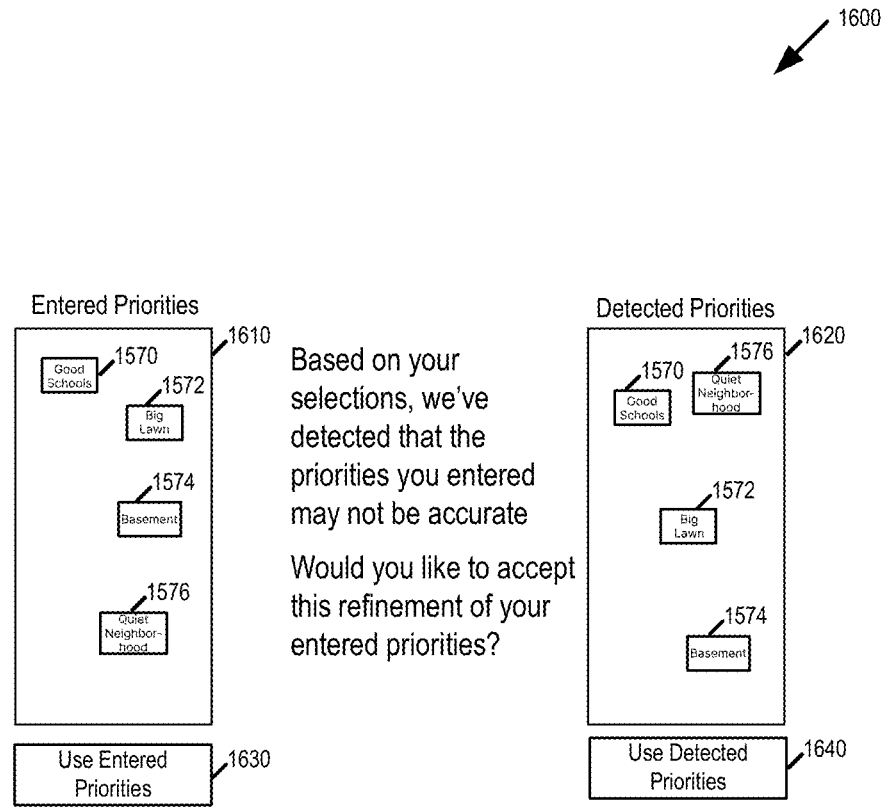
FIG. 16 is an illustration of entered priorities and detected priorities.

In one or some embodiments, prioritization refinement may be performed. Specifically, as users pick and/or rate options, the actual properties of the options they are choosing may be compared against the priorities they previously entered. If there is a significant discrepancy in the option choices a participant is making, the software may detect this and enable the user to refine their priorities. This is shown in illustration 1600 in FIG. 16 whereby entered priorities 1610 may be compared with detected priorities 1620, further allowing the user to use the entered priorities 1630 or to use the refined detected priorities 1640. In this way "hidden" priorities can be uncovered.

Yet another application for the rating canvas comprises consumer decisions. By way of example, the rating canvas may be used in the car buying context. One specific car-buying decision is a new "buy or don't buy", which may be suited to outcome-informed decision-making, as illustrated in table 1700 in FIG. 17.

As discussed above, multiple users may contribute to a common decision, such as a common consumer decision. One such decision comprises college choice, which may comprise a decision that involves multiple participants (e.g., one or more parents, the student, grandparent(s), a school guidance counselor, siblings, etc.), as illustrated in table 1800 in FIG. 18.

Another such decision comprises vacation decisions, which may impact multiple people who may have varied definitions of what constitutes a "good" vacation (e.g., relaxation and downtime; excitement and adventure; etc.). For example, within a family, there may be a mix of desired experiences, with the rating canvas providing the common forum in which to review various preferences that may be discussed as part of the decision-making process, such as illustrated in the table 1900 in FIG. 19.

Still another decision comprises choosing an event location, such as for a family reunion. This decision may be complicated, with many stakeholders. The rating canvas again may provide the common forum in which to enable each family member to contribute to the rating experience, such as illustrated in the table 2000 in FIG. 20.

Yet another decision comprises political advice. By way of example, a voting advocacy organization may establish criteria (e.g., select criteria) for local elections and/or ballot measures. Then, other organizations, such as newspapers, nonprofits, etc., may use the rating canvas in order to rate candidates and ballot measures against the criteria (as well as provide narrative content). Thereafter, voters could prioritize their criteria, either with or without the rating canvas, thereby creating a personalized "voter profile" for a respective voter, and then choose which organization(s) ratings the respective voter may wish to trust. In one or some embodiments, the respective voter may then receive a prioritized list of candidates, and recommendations for ballot measure votes that could inform their voting. This is, essentially, a more nuanced, personalized version of the voter's guide that many organizations publish.

Figure 21A:
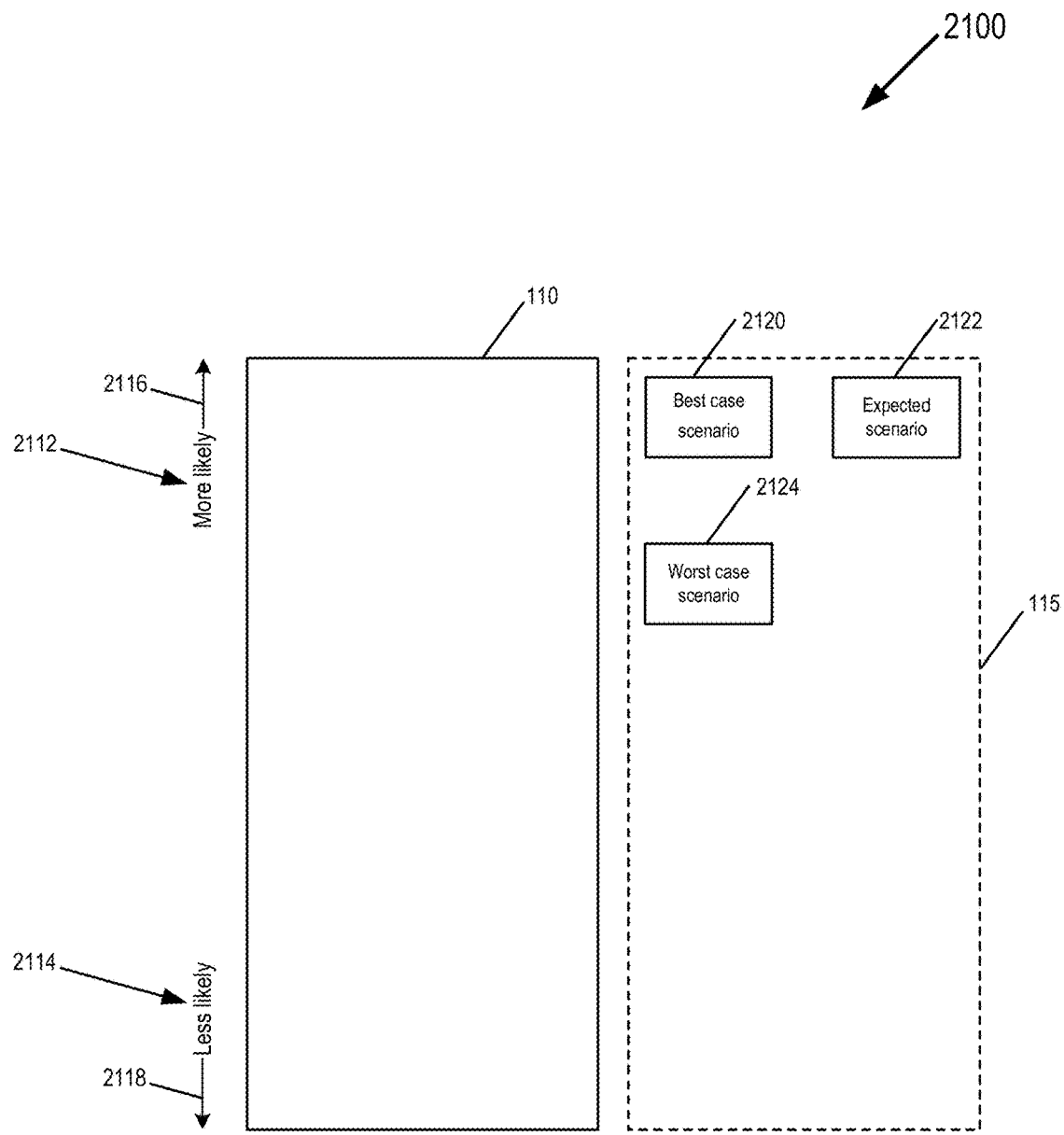
FIGS. 21A-B are illustrations of an outcome-informed decision using the rating canvas.
Figure 21B:
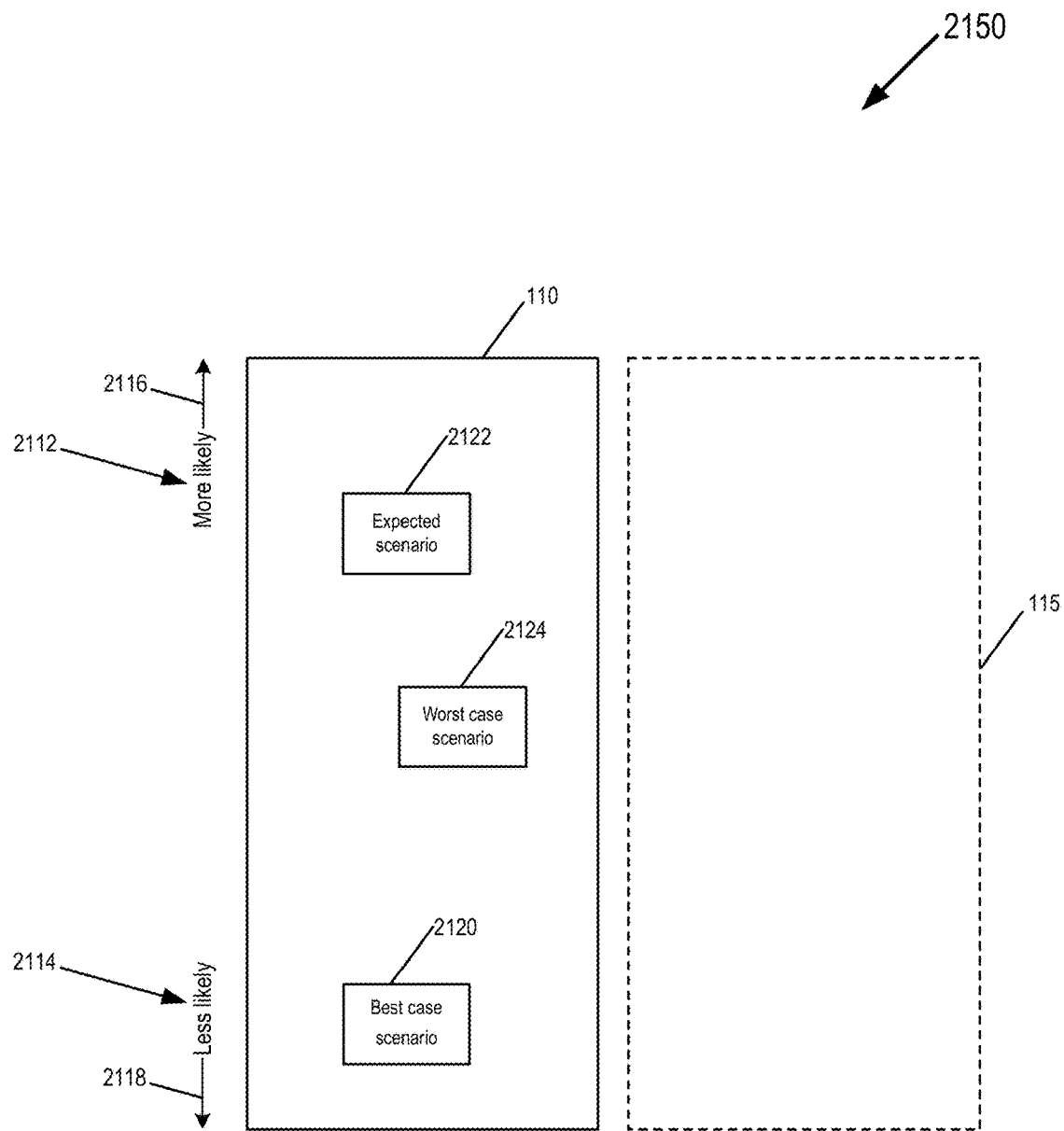

FIGS. 21A-B are illustrations 2100, 2150 of an outcome-informed decision using the rating canvas 110. By way of example, in determining whether to begin a tech startup company, the different options may be evaluated using the rating canvas 110 in order to perform an outcome-informed decision. The options may include: (1) committing to creating a tech startup company; or (2) get a traditional 9-5 job. Further, the different options may be assigned different expected outcomes, including a best case scenario 2120 (e.g., the tech startup company is a rousing success), an expected scenario 2122 (e.g., the tech startup company is able to generate modestly better income than with a traditional job), and a worst case scenario 2124 (e.g., the tech startup company is a failure and results in significant debts incurred). In one or some embodiments, the rating canvas 110 may be used to establish the different possibilities. Further, in one or some embodiments, the various scenarios may be determined in one of several ways, such as by multiplying the probability of the respective outcome by the performance (e.g., the amount of money made), thereby resulting in the value, which may be performed for each of the different scenarios. In this way, the rating canvas 110 may be used to assist in an outcome-informed decision.

Figure 22A:
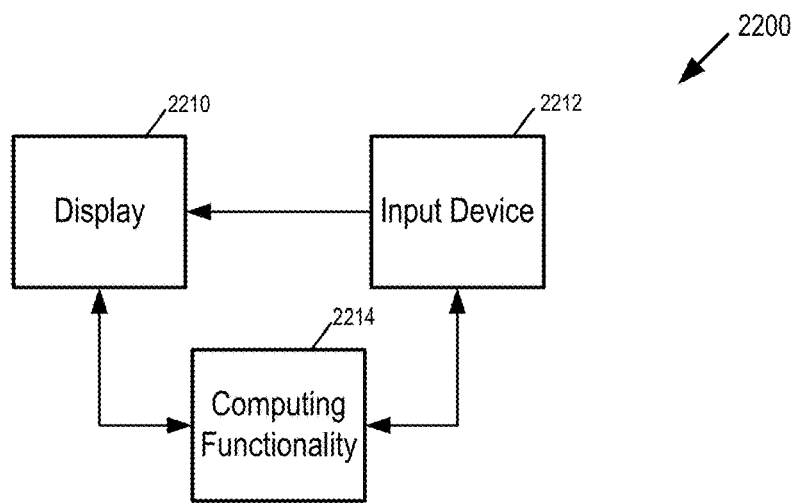
FIG. 22A is a block diagram of an example layout for a 2-D electronically presented space.
Figure 23:
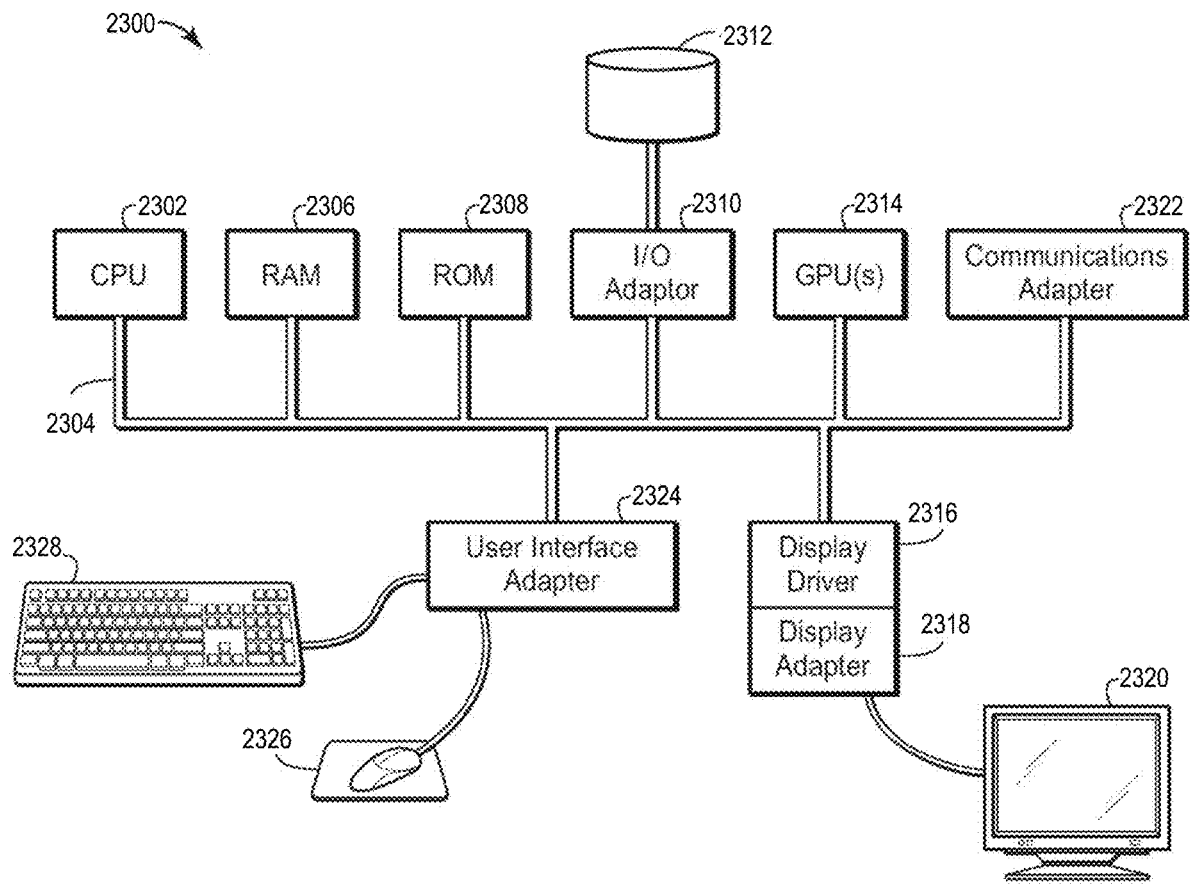
FIG. 23 is a diagram of an exemplary computer system that may be utilized to implement the methods described herein.

As discussed above, the electronically-presented space may comprise a 2-D electronically presented space or a 3-D electronically presented space. FIG. 22A is a block diagram 2200 of an example layout for a 2-D electronically presented space, which includes a display 2210, an input device 2212, and computing functionality 2214. The display may comprise an example of hardware that is configured to generate the electronically-presented space. The display may include a display monitor, a computer screen, computer monitor, or other type of output device that is configured to visually display the rating canvas. In one or some embodiments, the rating canvas may be located in a subsection of the display, such as illustrated as rating canvas 110 in FIG. 1A. Alternatively, the rating canvas may be displayed on an entirety of the display. In practice, a user may provide input data, via the input device 2212, to position one or more icons in or on the rating canvas. Various input devices 2212 are contemplated. In one embodiment, the input device 2212 may comprise a mouse or other type of hand-held pointing device that may detect two-dimensional motion relative to a surface in order to move the one or more icons in or on the rating canvas. Alternatively, or in addition, the input device may comprise a touchscreen where the user may physically touch the touchscreen in order to position the one or more icons in or on the rating canvas. In such an instance of the touchscreen, display 2210 and input device 2212 are housed within the same electronic device. Still alternatively, the input device 2212 may comprise a device that translates vocal commands into a position indication. Responsive to the input, the computing functionality 2214, an example of which is illustrated in FIG. 23 and which may include at least one processor and at least one memory, is configured to perform the various functions described herein. The computing functionality 2214 may further include software in a computer-readable tangible medium that includes executable instructions that are configured to perform the various functions described herein. Merely by way of example, the computing functionality may be configured to perform any one, any combination, or all of: command the display to generate the rating canvas; command the display to the one or more icons (e.g., in staging area 115); receive input from input device 2212 and modify the display 2210 to reflect positioning of icon(s); rating (e.g., absolute or relative) of the icons based on the positioning; aggregate the positioning; normalizing (e.g., recentering); determine when and/or how to present the plurality of icons and control the display 2210 accordingly; command the input device 2212 to present one or more visual cues; control selecting and/or prioritizing criteria; rate a plurality of items using the selected and/or prioritized criteria; or iteratively perform any of the listed steps.

Figure 22B:
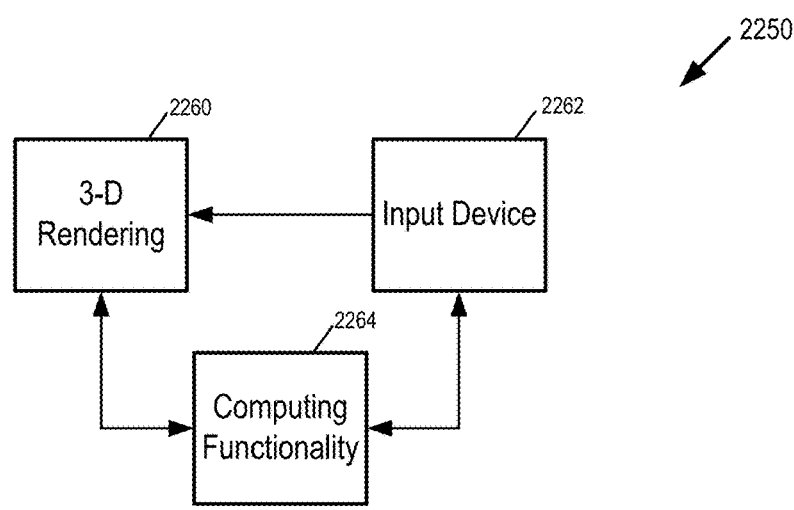
FIG. 22B is a block diagram of an example layout for a 3-D electronically presented space.

FIG. 22B is a block diagram 2250 of an example layout for a 3-D electronically presented space that may include a 3-D rendering 2260, an input device 2262, and computing functionality 2264. Various 3-D renderings 2260 are contemplated. In one or some embodiments, the 3-D electronically presented space may comprise a virtual reality (VR), augmented reality (AR), or a holographic projection (e.g., based on holography). In the context of VR or AR, pose tracking and 3D near-eye displays (e.g., using VR headsets, AR headsets, smartglasses, or the like) or multi-projected environments may be used to simulate the 3-D rendered experience. In this regard, hardware configured to generate the 3-D rendering may comprise another example of hardware that is configured to generate the electronically-presented space. In the VR context, a user may provide input via any one, any combination, or all of: handheld controllers (e.g., button-operated handsets); optical tracking sensors; movement tracking devices (e.g., camera-tracking); or the like. Similar to the computing functionality 2214, the computing functionality 2264 may perform any one, any combination, or all of the functions listed above, including those listed for the computing functionality 2214.

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as one or both of the calling application or the rating canvas application, etc. Merely by way of example, FIG. 23 is a diagram of an exemplary computer system 2300 that may be utilized to implement methods, including the flow diagrams, described herein. A central processing unit (CPU) 2302 is coupled to system bus 2304. The CPU 2302 may be any general-purpose CPU, although other types of architectures of CPU 2302 (or other components of exemplary computer system 2300) may be used as long as CPU 2302 (and other components of computer system 2300) supports the operations as described herein. Those of ordinary skill in the art will appreciate that, while only a single CPU 2302 is shown in FIG. 23, additional CPUs may be present. Moreover, the computer system 2300 may comprise a networked, multi-processor computer system that may include a hybrid parallel CPU/GPU system. The CPU 2302 may execute the various logical instructions according to various teachings disclosed herein. For example, the CPU 2302 may execute machine-level instructions for performing processing according to the operational flow described herein.

The computer system 2300 may also include computer components such as non-transitory, computer-readable media. Examples of computer-readable media include computer-readable non-transitory storage media, such as a random-access memory (RAM) 2306, which may be SRAM, DRAM, SDRAM, or the like. The computer system 2300 may also include additional non-transitory, computer-readable storage media such as a read-only memory (ROM) 2308, which may be PROM, EPROM, EEPROM, or the like. RAM 2306 and ROM 2308 hold user and system data and programs, as is known in the art. In this regard, computer-readable media may comprise executable instructions to perform any one, any combination, or all of the blocks in the flow charts in FIGS. 7A-10. The computer system 2300 may also include an input/output (I/O) adapter 2310, a graphics processing unit (GPU) 2314, a communications adapter 2322, a user interface adapter 2324, a display driver 2316, and a display adapter 2318.

The I/O adapter 2310 may connect additional non-transitory, computer-readable media such as storage device(s) 2312, including, for example, a hard drive, a compact disc (CD) drive, a floppy disk drive, a tape drive, and the like to computer system 2300. The storage device(s) may be used when RAM 2306 is insufficient for the memory requirements associated with storing data for operations of the present techniques. The data storage of the computer system 2300 may be used for storing information and/or other data used or generated as disclosed herein. For example, storage device(s) 2312 may be used to store configuration information or additional plug-ins in accordance with the present techniques. Further, user interface adapter 2324 couples user input devices, such as a keyboard 2328, a pointing device 2326 and/or output devices to the computer system 2300. The display adapter 2318 is driven by the CPU 2302 to control the display on a display device 2320 to, for example, present information to the user such as images generated according to methods described herein.

The architecture of computer system 2300 may be varied as desired. For example, any suitable processor-based device may be used, including without limitation personal computers, laptop computers, tablets, smartphones, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2300 may include various plug-ins and library files. Input data may additionally include configuration information.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

The following example embodiments of the invention are also disclosed:

Embodiment 1

A method for inputting a user rating in an electronically-presented space, the method comprising:
  accessing a plurality of icons, a respective icon of the plurality of icons indicative of a respective item for rating;
  electronically presenting the plurality of icons and electronically presenting a space that enables a user to at least partly position the plurality of icons within or relative to the space;
  responsive to the user at least partly positioning the plurality of icons within the space, receiving one or more indications of the positioning of the plurality of icons within the space; and
  rating the plurality of icons based on the one or more indication of the positioning of the plurality of icons within the space.

Embodiment 2

The method of embodiment 1:
  wherein a respective item comprises a respective criterion for rating;
  wherein a respective criterion icon is representative of the respective criterion for rating; and
  wherein the positioning of criteria icons within the space is indicative of rating of criteria.

Embodiment 3

The method of embodiments 1 or 2:
  wherein in a first iteration, a first iteration electronically presented space is used to position the criteria icons in order to rate the criteria; and
  wherein in a second iteration, one or more second iteration electronically presented spaces are used to rate non-criteria icons for one or more of the criteria previously rated using the first iteration electronically presented space.

Embodiment 4

The method of embodiments 1-3:
  wherein a respective item comprises a respective physical item or a respective concept for rating;
  wherein a respective icon is representative of the respective physical item or the respective concept for rating according to at least one criterion; and
  wherein the positioning of icons within the space is indicative of rating physical items or concepts.

Embodiment 5

The method of embodiments 1-4:
  wherein the space comprises a rating canvas that is electronically presented;
  wherein the user manually positions the respective icon within the rating canvas; and wherein the one or more indications of the position of the respective icon is based on the position of the respective icon within the rating canvas.

Embodiment 6

The method of embodiments 1-5:
wherein the rating canvas comprises a 2-axis rating canvas presented on a display;
wherein the user manually positions the plurality of icons at respective positions within the 2-axis rating canvas on the display; and
wherein the respective positions within the 2-axis rating canvas are used for rating the items associated with the plurality of icons.

Embodiment 7

The method of embodiments 1-6:
wherein the rating comprises relative rating; and
wherein the rating of the items is based on the respective positions of the plurality of icons relative to one another.

Embodiment 8

The method of embodiments 1-7:
wherein the space has an absolute rating scale;
wherein the rating comprises absolute rating; and
wherein the rating of the items is based on the respective positions of the plurality of icons relative to an absolute scale for the rating canvas.

Embodiment 9

The method of embodiments 1-8:
wherein the absolute scale is electronically presented along with the rating canvas.

Embodiment 10

The method of embodiments 1-9:
wherein the rating canvas comprises a 2-axis rating canvas presented on a display;
wherein placement of the plurality of icons using the 2-axis rating canvas is for prioritizing, assigning importance, or assigning preference according to at least two criteria;
wherein a first criterion scale is associated with a first criterion and presented as a first axis of the 2-axis rating canvas on the display, the placement of a respective icon in the 2-axis rating canvas is indicative of priority, importance, or preference of the respective icon for the first criterion based on: (i) comparing the placement of the respective icon relative to the first criterion scale; or (ii) calculating a distance in the first axis from the respective icon to another icon;
wherein a second criterion scale is associated with a second criterion and presented as a second axis of the 2-axis rating canvas on the display, the second axis being perpendicular to the first axis, the placement of the respective icon in the 2-axis rating canvas is indicative of priority, importance, or preference of the respective icon for the second criterion based on: (i) comparing the placement of the respective icon relative to the second criterion scale; or (ii) calculating a distance in the second axis from the respective icon to the another icon; and
using the placement of the respective icon in the 2-axis rating canvas for prioritizing, assigning importance, or assigning preference for a respective item associated with the respective icon.

Embodiment 11

The method of embodiments 1-10:
where the second criterion is independent of the first criterion.

Embodiment 12

The method of embodiments 1-11:
wherein the second criterion is dependent on the first criterion; and
where the second criterion scale is associated with a second dimension or property of the first criterion.

Embodiment 13

The method of embodiments 1-12:
wherein the second criterion scale is an indication of certainty of the user with regard to the first criterion.

Embodiment 14

The method of embodiments 1-13:
wherein the rating canvas comprises a 3-D rating canvas presented on in 3-D space;
wherein the user manually positions the plurality of icons at respective positions within the 3-D rating canvas; and
wherein the respective positions within the 3-D rating canvas are used for rating the items associated with the plurality of icons.

Embodiment 15

The method of embodiments 1-14:
wherein the 3-D rating canvas has multiple associated criterion scales that are associated with different axes of the 3-D space.

Embodiment 16

The method of embodiments 1-15:
wherein a plurality of users at least partly manually position the plurality of icons within the space; and
further comprising aggregating the at least partly manually positioning by the plurality of users.

Embodiment 17

The method of embodiments 1-16:
further comprising, prior to aggregating, normalizing the at least partly manually positioning by the plurality of users.

Embodiment 18

The method of embodiments 1-17:
  wherein normalizing comprises recentering the at least partly manual positioning prior to aggregation.

Embodiment 19

The method of embodiments 1-18:
  wherein the plurality of icons not yet rated are presented in a staging area for subsequent manual placement in the space.

Embodiment 20

The method of embodiments 1-19:
  wherein the plurality of icons are presented one-by-one in the staging area for the subsequent manual placement in the space.

Embodiment 21

The method of embodiments 1-20:
  wherein the icons are randomly presented in the staging area.

Embodiment 22

The method of embodiments 1-21:
  wherein one or more visual cues are generated to indicate to the user to position the plurality of the icons with the space; and
  wherein the one or more visual cues comprises positioning or movement of the plurality of icons; or one or more aspects of the plurality of icons.

Embodiment 23

The method of embodiments 1-22:
  further comprising iteratively using the space for both: one or both of selecting or prioritizing one or more criteria; and rating a plurality of items using the selected or prioritized criteria.

Embodiment 24

The method of embodiments 1-23:
  wherein in an initial iteration, the space is for enabling the user to select or assign priorities to the one or more criteria; and
  wherein in a subsequent iteration, the space is for enabling the user to rate the plurality of items using the selected or prioritized criteria.

Embodiment 25

The method of embodiments 1-24:
  wherein the space comprises a rating canvas;
  wherein a calling application calls a rating canvas application that uses the rating canvas;
  wherein the calling application determines a plurality of items to be rated; and
  wherein at least one of the calling application or the rating canvas application generates respective icons for the plurality of items to be prioritized in order for the user to position the respective icons on the rating canvas.

Embodiment 26

An apparatus configured to input a user rating in an electronically-presented space, the apparatus comprising:
  hardware configured to generate the electronically-presented space;
  one or more input devices; and
  at least one processor in communication with the hardware configured to generate the electronically-presented space and the one or more input devices, the at least one processor configured to:
    access a plurality of icons, a respective icon of the plurality of icons indicative of a respective item for rating;
    electronically present, via the hardware, the plurality of icons and electronically present, via the hardware, a space that enables a user to at least partly position the plurality of icons within or relative to the space;
    responsive to the user at least partly positioning the plurality of icons within the space, receive one or more indications of the positioning of the plurality of icons within the space; and
    rate the plurality of icons based on the one or more indication of the positioning of the plurality of icons within the space.

Embodiment 27

The apparatus of embodiment 26:
  wherein a respective item comprises a respective criterion for rating;
  wherein a respective criterion icon is representative of the respective criterion for rating; and
  wherein the at least one processor is configured to use the positioning of criteria icons within the space for rating of criteria.

Embodiment 28

The apparatus of embodiments 26 or 27:
  wherein the at least one processor is configured to:
    in a first iteration, use a first iteration electronically presented space to position the criteria icons in order to rate the criteria; and
    in a second iteration, use one or more second iteration electronically presented spaces to rate non-criteria icons for one or more of the criteria previously rated using the first iteration electronically presented space.

Embodiment 29

The apparatus of embodiments 26-28:
  wherein a respective item comprises a respective physical item or a respective concept for rating;
  wherein a respective icon is representative of the respective physical item or the respective concept for rating according to at least one criterion; and
  wherein the at least one processor is configured to interpret the positioning of icons within the space as indicative of rating physical items or concepts.

Embodiment 30

The apparatus of embodiments 26-29:
  wherein the space comprises a rating canvas that is electronically presented;
  wherein the user manually positions the respective icon within the rating canvas; and
  wherein the one or more indications of the position of the respective icon is based on the position of the respective icon within the rating canvas.

Embodiment 31

The apparatus of embodiments 26-30:
  wherein the hardware configured to generate the electronically-presented space comprises a display;
  wherein the display is configured to present the rating canvas as a 2-axis rating canvas;
  wherein the one or more input devices are configured to receive manual positions of the plurality of icons at respective positions within the 2-axis rating canvas on the display; and
  wherein the at least one processor is configured to use the respective positions within the 2-axis rating canvas for rating the items associated with the plurality of icons.

Embodiment 32

The apparatus of embodiments 26-31:
  wherein the rating comprises relative rating; and
  wherein the at least one processor is configured to rate the items based on the respective positions of the plurality of icons relative to one another.

Embodiment 33

The apparatus of embodiments 26-32:
  wherein the space has an absolute rating scale;
  wherein the rating comprises absolute rating; and
  wherein the at least one processor is configured to rate the items based on the respective positions of the plurality of icons relative to an absolute scale for the rating canvas.

Embodiment 34

The apparatus of embodiments 26-33:
  wherein the at least one processor is configured to command the absolute scale to be electronically presented along with the rating canvas.

Embodiment 35

The apparatus of embodiments 26-34:
  wherein the hardware configured to generate the electronically-presented space comprises a display;
  wherein the display is configured to present the rating canvas as a 2-axis rating canvas;
  wherein the at least one processor is configured to prioritize, assign importance, or assign preference according to at least two criteria based on placement of the plurality of icons using the 2-axis rating canvas;
  wherein a first criterion scale is associated with a first criterion and presented as a first axis of the 2-axis rating canvas on the display, the placement of a respective icon in the 2-axis rating canvas is indicative of priority, importance, or preference of the respective icon for the first criterion based on: (i) comparing the placement of the respective icon relative to the first criterion scale; or (ii) calculating a distance in the first axis from the respective icon to another icon;
  wherein a second criterion scale is associated with a second criterion and presented as a second axis of the 2-axis rating canvas on the display, the second axis being perpendicular to the first axis, the placement of the respective icon in the 2-axis rating canvas is indicative of priority, importance, or preference of the respective icon for the second criterion based on: (i) comparing the placement of the respective icon relative to the second criterion scale; or (ii) calculating a distance in the second axis from the respective icon to the another icon; and
  wherein the at least one processor is configured to use the placement of the respective icon in the 2-axis rating canvas for prioritizing, assigning importance, or assigning preference for a respective item associated with the respective icon.

Embodiment 36

The apparatus of embodiments 26-35:
  where the second criterion is independent of the first criterion.

Embodiment 37

The apparatus of embodiments 26-36:
  wherein the second criterion is dependent on the first criterion; and
  where the second criterion scale is associated with a second dimension or property of the first criterion.

Embodiment 38

The apparatus of embodiments 26-37:
  wherein the second criterion scale is an indication of certainty of the user with regard to the first criterion.

Embodiment 39

The apparatus of embodiments 26-38:
  wherein the rating canvas comprises a 3-D rating canvas presented on in 3-D space;
  wherein the at least one processor is configured to receive user-placed manual positions for the plurality of icons at respective positions within the 3-D rating canvas; and
  wherein the at least one processor is configured to rate the items associated with the plurality of icons based on the respective positions within the 3-D rating canvas.

Embodiment 40

The apparatus of embodiments 26-39:
  wherein the 3-D rating canvas has multiple associated criterion scales that are associated with different axes of the 3-D space.

Embodiment 41

The apparatus of embodiments 26-40:
  wherein the at least one processor is configured to receive user-placed manual positions within the space from a plurality of users for the plurality of icons; and wherein the at least one processor is further configured to aggregate the at least partly manually positioning by the plurality of users.

Embodiment 42

The apparatus of embodiments 26-41:
wherein the at least one processor is further configured to, prior to aggregating, normalize the at least partly manual positioning by the plurality of users.

Embodiment 43

The apparatus of embodiments 26-42:
wherein the at least one processor is configured to normalize by recentering the at least partly manual positioning prior to aggregation.

Embodiment 44

The apparatus of embodiments 26-43:
wherein the at least one processor is configured to control presentation of the plurality of icons not yet rated in a staging area of a display for subsequent manual placement in the space.

Embodiment 45

The apparatus of embodiments 26-44:
wherein the at least one processor is configured to control presentation of the plurality of icons one-by-one in the staging area of the display for the subsequent manual placement in the space.

Embodiment 46

The apparatus of embodiments 26-45:
wherein the at least one processor is configured to control presentation of the plurality of icons to randomly present the plurality of icons in the staging area.

Embodiment 47

The apparatus of embodiments 26-46:
wherein the at least one processor is configured to control presentation of one or more visual cues on a display to indicate to the user to position the plurality of the icons with the space; and
wherein the one or more visual cues comprises positioning or movement of the plurality of icons; or one or more aspects of the plurality of icons.

Embodiment 48

The apparatus of embodiments 26-47:
wherein the at least one processor is configured to control a display to iteratively use the space for both:
one or both of selecting or prioritizing one or more criteria; or
rating a plurality of items using the selected or prioritized criteria.

Embodiment 49

The apparatus of embodiments 26-48:
wherein the at least one processor is configured to control the display whereby:
in an initial iteration, the space is for enabling the user to select or assign priorities to the one or more criteria; and
wherein in a subsequent iteration, the space is for enabling the user to rate the plurality of items using the selected or prioritized criteria.

Embodiment 50

The apparatus of embodiments 26-49:
wherein the space comprises a rating canvas;
wherein the at least one processor, executing a rating canvas application, is configured to receive a call from a calling application indicative of a request to use the rating canvas;
wherein the call is indicative of a plurality of items to be rated; and
wherein at least one of the calling application or the rating canvas application is configured to generate respective icons for the plurality of items to be prioritized in order for the user to position the respective icons on the rating canvas.

Embodiment 51

A system comprising:
a processor; and
a non-transitory machine-readable medium comprising instructions that, when executed by the processor, cause a computing system to perform a method according to any of embodiments 1-25.

Embodiment 52

A non-transitory machine-readable medium comprising instructions that, when executed by a processor, cause a computing system to perform a method according to any of embodiments 1-25.

What is claimed is:

1. A method for inputting a user rating in an electronically-presented space, the method comprising:
accessing a plurality of icons, a respective icon of the plurality of icons indicative of a respective item for rating;
electronically presenting the plurality of icons and electronically presenting a space that enables a user to at least partly position the plurality of icons within or relative to the space, wherein the space comprises a rating canvas that is electronically presented and that is at least a 2-axis rating canvas;
responsive to the user at least partly positioning the plurality of icons within the space, receiving one or more indications of the positioning of the plurality of icons within the space, wherein the user manually positions the respective icon within the rating canvas, wherein the one or more indications of the position of the respective icon is based on the position of the respective icon within the rating canvas, wherein placement of the plurality of icons using the rating canvas is for prioritizing, assigning importance, or assigning preference according to at least two criteria, wherein a first criterion scale is associated with a first criterion and with a first axis, the placement of a respective icon in the rating canvas is indicative of priority, importance, or preference of the respective icon for the first criterion based on: (i) comparing the placement of the respective icon relative to the first criterion scale; or (ii)

calculating a distance in the first axis from the respective icon to another icon, wherein a second criterion scale is associated with a second criterion and with a second axis, the second axis being perpendicular to the first axis, the placement of the respective icon in the rating canvas is indicative of priority, importance, or preference of the respective icon for the second criterion based on: (i) comparing the placement of the respective icon relative to the second criterion scale; or (ii) calculating a distance in the second axis from the respective icon to the another icon; and rating the plurality of icons based on the one or more indication of the positioning of the plurality of icons within the space, wherein, based on the user at least partly positioning at least one icon within the space, determining a certainty with respect to placement of the at least one icon within the rating canvas.

2. The method of claim 1, wherein a respective item comprises a respective criterion for rating;
wherein a respective criterion icon is representative of the respective criterion for rating; and
wherein the positioning of criteria icons within the space is indicative of rating of criteria.

3. The method of claim 1, wherein the space has an absolute rating scale;
wherein the rating comprises absolute rating; and
wherein the rating of the items is based on the respective positions of the plurality of icons relative to an absolute scale for the rating canvas.

4. The method of claim 3, wherein the rating canvas is presented on a display;
wherein the first criterion scale is presented as a first axis of the 2 axis rating canvas on the display; and
wherein the second criterion scale is presented as a second axis of the rating canvas on the display, the second axis being perpendicular to the first axis.

5. The method of claim 4, where the second criterion is independent of the first criterion.

6. The method of claim 4, wherein the second criterion is dependent on the first criterion;
where the second criterion scale is associated with a second dimension or property of the first criterion; and
wherein the placement of the at least one icon in the second criterion scale is an indication of certainty of the user with regard to the first criterion.

7. The method of claim 1, wherein a plurality of users at least partly manually position the plurality of icons within the space; and
further comprising:
recentering the at least partly manual positioning by the plurality of users; and
after recentering, aggregating the at least partly manually positioning by the plurality of users.

8. The method of claim 1, wherein the plurality of icons not yet rated are presented in a staging area for subsequent manual placement in the space; and
wherein the plurality of icons are presented one-by-one in the staging area for the subsequent manual placement in the space.

9. The method of claim 1, wherein one or more visual cues are generated to indicate to the user to position the plurality of the icons with the space; and
wherein the one or more visual cues comprises positioning or movement of the plurality of icons; or one or more aspects of the plurality of icons.

10. The method of claim 1, further comprising iteratively using the space for both: one or both of selecting or prioritizing one or more criteria; and rating a plurality of items using the selected or prioritized criteria;
wherein in an initial iteration, the space is for enabling the user to select or assign priorities to the one or more criteria; and
wherein in a subsequent iteration, the space is for enabling the user to rate the plurality of items using the selected or prioritized criteria.

11. The method of claim 1,
wherein a calling application calls a rating canvas application that uses the rating canvas;
wherein the calling application determines a plurality of items to be rated; and
wherein at least one of the calling application or the rating canvas application generates respective icons for the plurality of items to be prioritized in order for the user to position the respective icons on the rating canvas.

12. The method of claim 1, wherein determining the certainty with respect to the placement of at least one icon is based on at least one of: time for the user to place the at least one icon; speed at which the user placed the at least one icon; whether the user adjusted the placement of the at least one icon; or a number of times the user adjusted the placement of the at least one icon.

13. The method of claim 1, wherein determining the certainty with respect to the placement of at least one icon is based on a number of times the user adjusted the placement of the at least one icon.

14. The method of claim 1, wherein the certainty is an indication of the user with regard to at least one criterion of the rating canvas.

15. An apparatus configured to input a user rating in an electronically-presented space, the apparatus comprising:
hardware configured to generate the electronically-presented space and to at least partly position a plurality of icons within or relative to the space, wherein the space comprises a rating canvas that is electronically presented and that is at least a 2-axis rating canvas;
at least one processor in communication with the hardware configured to generate the electronically-presented space and to at least partly position the plurality of icons within or relative to the space, the at least one processor configured to:
access the plurality of icons, a respective icon of the plurality of icons indicative of a respective item for rating;
electronically present, via the hardware, the plurality of icons and electronically present, via the hardware, the space that enables a user to at least partly position the plurality of icons within or relative to the space, wherein the space comprises a rating canvas that is electronically presented and that is at least a 2-axis rating canvas;
responsive to the user at least partly positioning the plurality of icons within the space, receive one or more indications of the positioning of the plurality of icons within the space, wherein the hardware is configured for the user to manually position the respective icon within the rating canvas, wherein the one or more indications of the position of the respective icon is based on the position of the respective icon within the rating canvas, wherein placement of the plurality of icons using the rating canvas is for prioritizing, assigning importance, or assigning preference according to at least two criteria, wherein a first criterion scale is associated with a first criterion and with a first axis, the placement of a respective icon in the rating canvas is indicative of priority, importance, or preference of the respective icon for the first criterion based on: (i) comparing the placement of the respective icon relative to the first criterion scale; or (ii) calculating a distance in the first axis from the respective icon to another icon, wherein a second criterion scale is associated with a second criterion and with a second axis, the second axis being perpendicular to the first axis, the placement of the respective icon in the rating canvas is indicative of priority, importance, or preference of the respective icon for the second criterion based on: (i) comparing the placement of the respective icon relative to the second criterion scale; or (ii) calculating a distance in the second axis from the respective icon to the another icon; and rate the plurality of icons based on the one or more indication of the positioning of the plurality of icons within the space, wherein, based on the user at least partly positioning at least one icon within the space, the at least one processor configured to determine a certainty with respect to placement of the at least one icon within the rating canvas.

16. The apparatus of claim 15, wherein a respective item comprises a respective criterion for rating;

wherein a respective criterion icon is representative of the respective criterion for rating; and wherein the at least one processor is configured to use the positioning of criteria icons within the space for rating of criteria.

17. The apparatus of claim 16, wherein the at least one processor is configured to:

in a first iteration, use a first iteration electronically presented space to position the criteria icons in order to rate the criteria; and in a second iteration, use one or more second iteration electronically presented spaces to rate non-criteria icons for one or more of the criteria previously rated using the first iteration electronically presented space.

18. The apparatus of claim 15, wherein the space has an absolute rating scale;

wherein the rating comprises absolute rating; and wherein the at least one processor is configured to rate the items based on the respective positions of the plurality of icons relative to an absolute scale for the rating canvas.

19. The apparatus of claim 18, wherein the at least one processor is configured to command the absolute scale to be electronically presented along with the rating canvas.

20. The apparatus of claim 19, wherein the hardware configured to generate the electronically-presented space comprises a display;

wherein the first criterion scale is presented as a first axis of the rating canvas on the display;

wherein the second criterion scale is presented as a second axis of the rating canvas on the display, the second axis being perpendicular to the first axis.

21. The apparatus of claim 20, wherein the second criterion is dependent on the first criterion;

where the second criterion scale is associated with a second dimension or property of the first criterion; and wherein the at least one processor is configured to interpret the placement of the at least one icon in the second criterion scale as an indication of certainty of the user with regard to the first criterion.

22. The apparatus of claim 15, wherein the at least one processor is configured to receive user-placed manual positions within the space from a plurality of users for the plurality of icons; and wherein the at least one processor is further configured to:

recenter at least some of the manual positions by the plurality of users; and after recentering, aggregate the at least partly manually positioning by the plurality of users.

23. The apparatus of claim 15, wherein the at least one processor is configured to control presentation of one or more visual cues on a display to indicate to the user to position the plurality of the icons with the space; and wherein the one or more visual cues comprises positioning or movement of the plurality of icons; or one or more aspects of the plurality of icons.

24. The apparatus of claim 15, wherein the at least one processor is configured to control a display whereby:

in an initial iteration, the space is for enabling the user to select or assign priorities to one or more criteria; and wherein in a subsequent iteration, the space is for enabling the user to rate a plurality of items using the selected or prioritized criteria.

25. The apparatus of claim 15, wherein the at least one processor, executing a rating canvas application, is configured to receive a call from a calling application indicative of a request to use the rating canvas;

wherein the call is indicative of a plurality of items to be rated; and wherein at least one of the calling application or the rating canvas application is configured to generate respective icons for the plurality of items to be prioritized in order for the user to position the respective icons on the rating canvas.

26. The apparatus of claim 15, wherein the at least one processor is configured to determine the certainty with respect to the placement of at least one icon based on at least one of: time for the user to place the at least one icon; speed at which the user placed the at least one icon; whether the user adjusted the placement of the at least one icon; or a number of times the user adjusted the placement of the at least one icon.

27. The apparatus of claim 15, wherein the at least one processor is configured to determine the certainty with respect to the placement of at least one icon based on a number of times the user adjusted the placement of the at least one icon.

* * * * *